United States Patent [19]

Martz et al.

[11] 3,955,358

[45] May 11, 1976

[54] COMBINED CYCLE ELECTRIC POWER PLANT AND A HEAT RECOVERY STEAM GENERATOR WITH IMPROVED FLUID LEVEL CONTROL THEREFOR

[75] Inventors: Lyle F. Martz, Verona, Pa.; Richard J. Plotnick, Cherry Hill, N.J.

[73] Assignee: Westinghouse Electric Corporation, Pittsburgh, Pa.

[22] Filed: Aug. 8, 1974

[21] Appl. No.: 495,738

[52] U.S. Cl. ............................. 60/39.18 B; 60/667; 122/451 S
[51] Int. Cl.² ......................................... F01K 23/06
[58] Field of Search .................... 122/451 S, 451 R; 60/660–667, 646, 39.18 B Primary Examiner—Allen M. Ostrager
Attorney, Agent, or Firm—E. F. Possessky

[57] ABSTRACT

A combined cycle electric power plant includes gas and steam turbines and a steam generator for recovering the heat in the exhaust gases exited from the gas turbine and for using the recovered heat to produce and supply steam to the steam turbine. A condenser receives the spent steam from the steam turbine for converting it into condensate. The steam generator includes a deaerator for receiving the condensate flow from the condenser and for storing it in a storage portion, a feedwater pump for directing the stored condensate through a first heat exchange tube whereby heat is transferred from the gas turbine exhaust gases to the fluid, a main drum for receiving and storing the heated fluid and a second heat exchange tube for heating the fluid by the gas turbine exhaust gases into superheated steam to be supplied to the steam turbine. A water make-up system is associated with the condenser and includes a water make-up storage tank, a return valve for extracting condensate from that supplied to the deaerator for storage in the water make-up storage tank, and a make-up valve for returning water from the water make-up storage tank into the condenser. Fluid level control is provided for maintaining the fluid level within a hotwell storage portion of the condenser, and within the storage portion of the deaerator, by controlling the position of the condensate valve. In particular, the fluid level control is responsive primarily to a measurement of the superheated steam as supplied to said steam turbine and in particular to a difference signal between the flow of superheated steam to said steam turbine and the condensate flow to said deaerator for the control of the position of the condensate valve, and secondarily, to measurements of the fluid level within the deaerator storage portion and the hotwell storage portion to trim the effect of the aforementioned difference signal upon the position of the condensate valve.

32 Claims, 45 Drawing Figures

COMBINED CYCLE ELECTRIC POWER PLANT AND A HEAT RECOVERY STEAM GENERATOR WITH IMPROVED FLUID LEVEL CONTROL THEREFOR

CROSS-REFERENCE TO RELATED APPLICATION

Reference is made to application Ser. No. 495,765, filed concurrently herewith by Lyle F. Martz and Richard J. Plotnick, entitled "Combined Cycle Electric Power Plant Having A Control System Which Enables Drive Steam Generator Operation During Gas Turbine Operation", and assigned to the present assignee and related cases referred to therein, said designated case and said referred-to cases being incorporated herein by reference.

BACKGROUND OF THE INVENTION

1. Field Of The Invention

The present invention relates to a combined cycle electric power plant and more particularly to improved fluid level control for heat recovery steam generators and condensers associated therewith, as particularly adapted for use in combined cycle electric power plants.

2. Description Of The Prior Art

In the design of modern electric power plants, it is a significant object to achieve the greatest efficiency possible in the generation of electricity. To this end, steam generators are designed to extract heat efficiently from and to use the extracted heat to convert a fluid such as water into superheated steam at a relatively high pressure. Further, such a steam generator has been incorporated into combined cycle electric power plants including both gas and steam turbines wherein the exhaust gases of the gas turbine are used to heat water into steam then to be transferred to the steam turbine. Further, a condenser is associated with the steam turbine for receiving the spent steam and converting it into a condensate to be supplied to the steam generator.

Typically, a steam generator comprises a deaerator for receiving the condensate from the condenser and includes a storage portion, a feedwater pump for directing the fluid stored inthe storage portion to a first or economizer heat exchanger, a high pressure evaporator, and finally a superheater tube, whereby water is gradually heated while increasing levels of pressure are applied thereto to provide from the superheater tube, superheated steam to be supplied to the steam turbine. The steam generator also includes a main drum for receiving and storing the heated fluid before being directed therefrom to be further heated by one of the heat exchange tubes. The heated exhaust gases derived from the gas turbine are used to heat the fluid passing through the heat exchange tubes of the heat recovery steam generator. In this manner, a significant reduction in the fuel required to heat the steam is achieved and the heat contained in the gas turbine exhaust gases is effectively utilized.

A problem occurring in the prior art relates to the possible damage of the feedwater pump used to direct fluid from the deaerato to the first heat exchange tube. In particular, as the relatively cold condensate is introduced into the deaerator and in particular to its storage portion, the pressure therein tends to drop rapidly, whereby the pressure exerted upon the feedwater pump may be sharply reduced. If the pressure is suddenly removed from the feedwater pump, it may begin to cavitate with possible damage occurring thereto.

This problem is especially significant where it is not feasible to dispose the deaerator and in particular its storage tank, a sufficient level above the feedwater pump so as to establish a head of fluid thereon, whereby pressure would normally be exerted upon the feed pump. This situation arises in the electric plant as described in the above-identified application entitled "Combined Cycle Electric Power Plant Having A Control System Which Enables Dry Steam Generator Operation During Gas Turbine Operation", which may be constructed in a modular fashion whereby each element of the entire system is disposed within a housing and shipped to the plant site, whereat it is assembled upon concrete slabs. As a result of the modular construction, it is not feasible to space the deaerator and its storage portion a significant distance above the feedwater pump. As a result, if there is experienced a significant reduction in the pressure within the storage portion, the pressure would be rapidly removed from the feedwater pump with possible damage resulting thereto.

In the steam generators of the prior art, it is typical to use a three-element control whereby the storage level within the storage portion of the deaerator is maintained at a normal preset value. The measured parameters are the condensate flow to the deaerator, the feedwater flow from the storage portion and into the main drum, and the fluid level within the storage of the deaerator. By the use of such control, the condensate flow into the storage portion of the deaerator is made to follow the feedwater flow out. This causes a particular problem when there is a sudden drop in the demand for superheated steam, whereby the flow of steam from the main drum is reduced sharply. However, the feedwater into the main drum and out of the storage portion of the deaerator is maintained at a relatively high level. Thus, in the prior art, a high rate of condensate flow is maintained into the deaerator storage portion as by regulation of the condensate valve, whereby a relatively high mass of cold fluid is introduced with a subsequent drop in pressure within the deaerator storage portion. As mentioned above, this may cause significant damage to the coupled feedwater pump.

The description of prior art herein is made on good faith and no representation that any prior art considered is the best pertaining prior art nor that the interpretation placed on its is unrebuttable.

SUMMARY OF THE INVENTION

It is therefore an object of this invention to provide improved fluid level control within a steam generator and condenser hotwell of a combined cycle electric power plant.

It is a more particular object of this invention to provide a new and improved fluid level control with a deaerator storage portion or tank whereby the pressure is maintained within such limits so as to avoid possible damage to a feedwater pump coupled therewith.

These and other objects are accomplished in accordance with the teachings of this invention by providing a combined cycle electric power plant including a gas turbine, a steam turbine, means for generating electric power under the driving power of the turbines, and steam generating means for receiving the exhaust gases of the steam turbine and for using heat therein to convert a transfer fluid such as water into steam to be supplied to the steam turbine. A condenser is associated with the steam turbine for converting the spent steam therefrom into a condensate to be supplied by way of a condensate valve to the steam generator. The steam generator includes a deaerator for receiving the condensate flow by way of the condensate valve and for storing it in a storage tank or portion thereof, a feedwater pump for directing the stored condensate through a first heat exchange tube to a main drum, and a second or superheater heat exchange tube for heating the fluid into superheater steam to be supplied to the gas turbine. Further, a make-up water system is provided including a return valve for extracting condensate fluid into a make-up water storage tank, and a make-up valve for returning water by way of the condenser into the condensate superheated steam loop through the steam generator. The fluid level control of this invention serves to maintain the fluid levels within the hotwell of the condenser and the deaerator storage portion, by regulating the position of the condensate valve. In particular, the fluid level control responds to the difference of the measured values of steam flow from and condensate flow to the steam generator for controlling primarily the position of the condensate valve. Trim or secondary control action is taken by measuring the fluid levels of the deaerator storage portion and the hotwell to alter the control action of the steam condensate difference signal to adjust thereby the fluid levels of the deaerator storage portion and the hotwell storage portion.

BRIEF DESCRIPTION OF THE DRAWINGS

These and other objects and advantages of the present invention will become more apparent by referring to the following detailed description and accompanying drawings in which:

FIG. 5G shows the manner in which FIGS. 5A to 5F are arranged;

DESCRIPTION OF THE PREFERRED EMBODIMENT

A. General Plant Description

Figure 1:
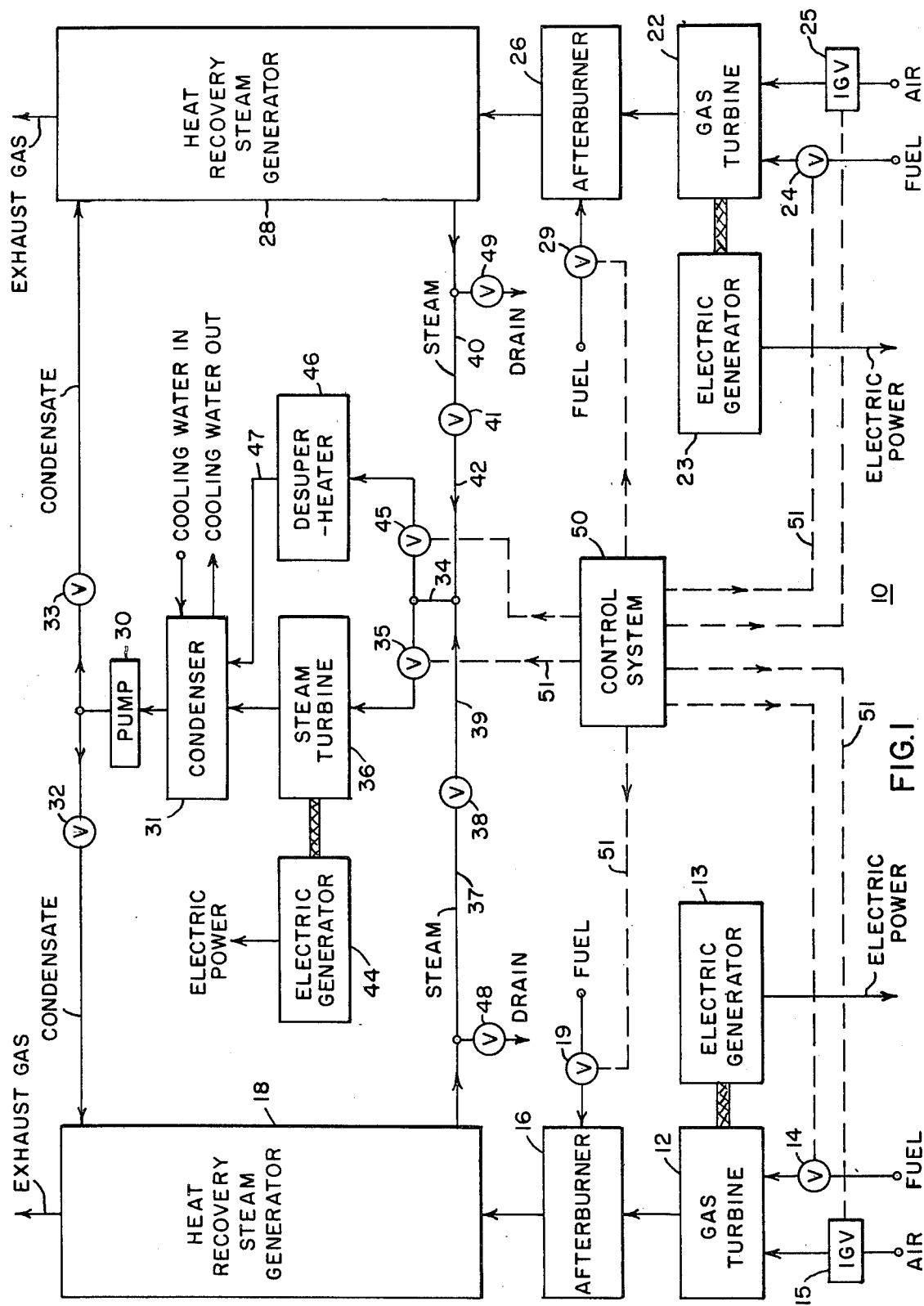
FIG. 1 shows a schematic view of a combined cycle electric power plant in which there is employed a heat recovery steam generator in accordance with the principles of this invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2")

includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 fo purposes of driving such steam turbine 36. The steam from the first steam generator 18 flows to the header 34 by way of a steam pipe 37, a isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 an 22. When one of the gas turbines, for example the gas turbine 12, is not being used or is sut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59°Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overal understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a cnsequence, each of the gas turbines 12 and 22 and each of the afterburners 16 and 26 is actually provided with two fuel throttle valves, one for natural gas and the other for fuel oil. Also, various other valves and devices employed in the actual fuel supply system have been omitted from FIG. 1 for the sake of simplicity. Other simplifications employed in FIG. 1 are of a similar character.

Figure 2:
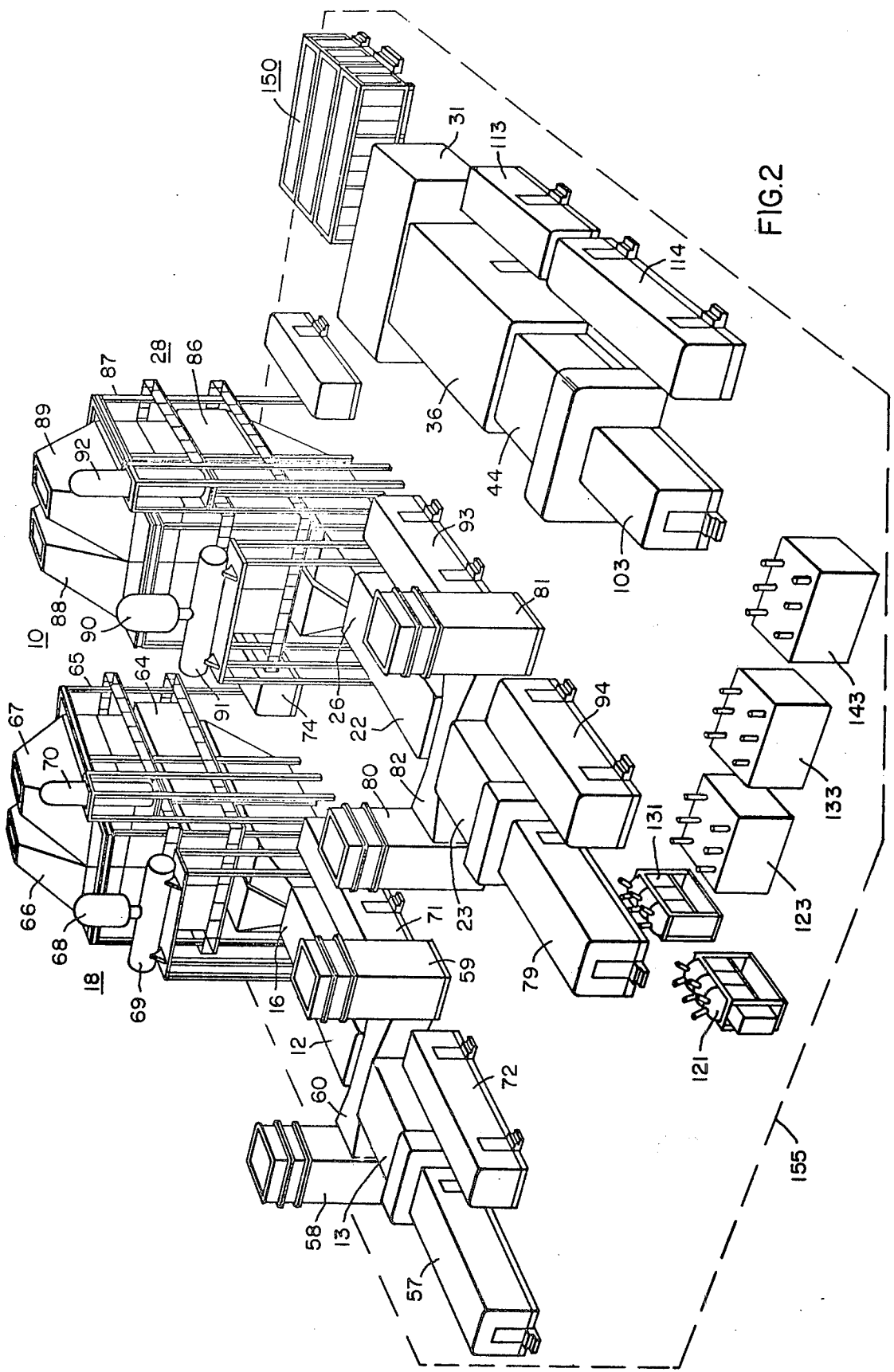
FIGS. 2 and 3 are, respectively, a perspective and top plan view of the arrangement of the combined cycle electric power plant as shown in FIG. 1.
Figure 3:
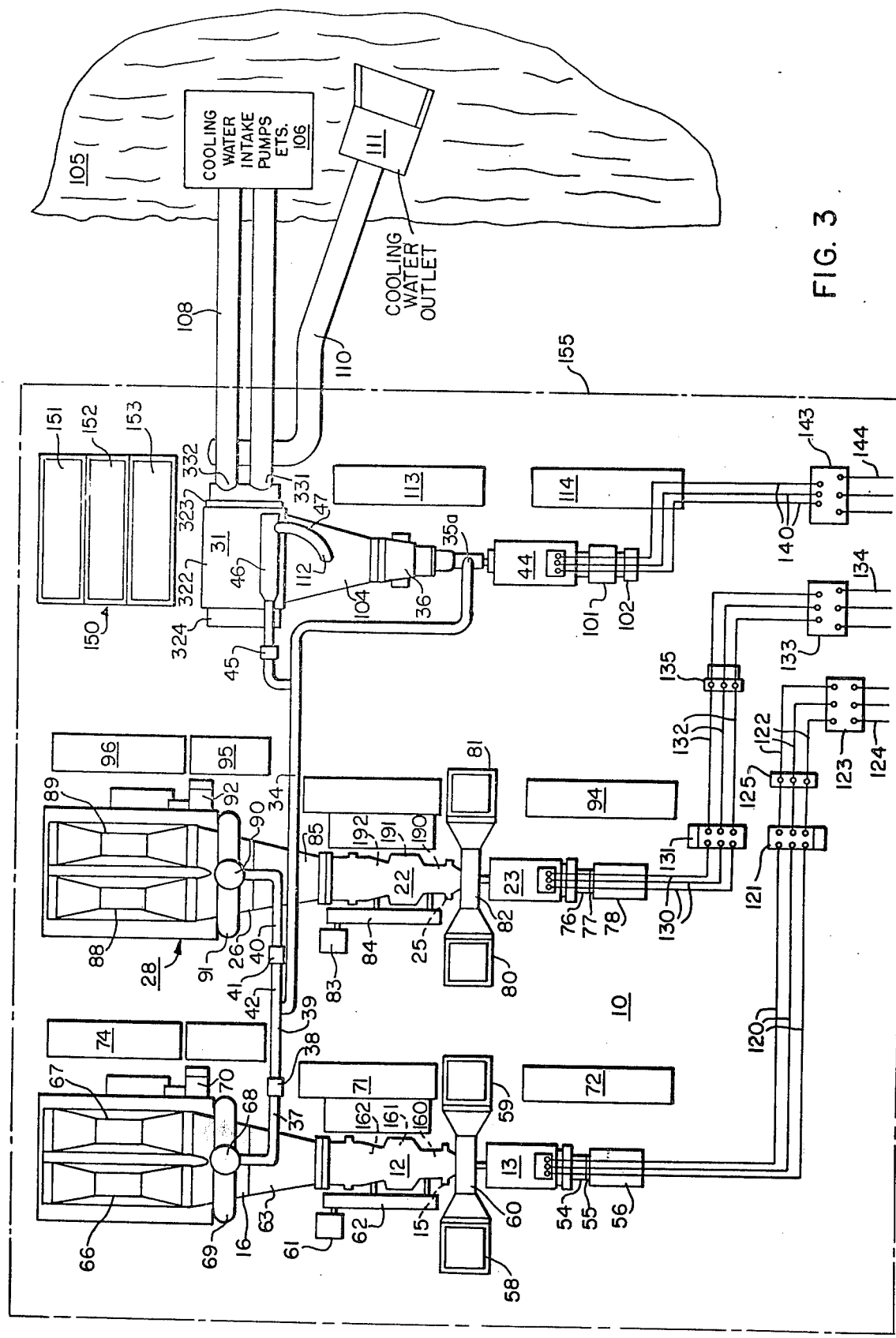

Referring now to FIGS. 2 and 3, there is shown the physical layout and overall structural nature of the apparatus included in the combined cycle electric power generating plant 10. FIG. 2 is a perspective view of the plant 10 and FIG. 3 is a plan view of the plant 10. FIG. 3 is somewhat more detailed and shows some additional structures not shown in FIG. 2. Thus, in the following description, reference will more frequently be had to FIG. 3.

As indicated in FIG. 3, the electric generator 13 is located in line with the gas turbine 12, the rotary shaft of the generator 13 being connected in tandem with the rotary shaft of the gas turbine 12. Also connected in tandem with the generator 13 on the end opposite turbine 12 is an exciter unit 54, a disengaging coupler or clutch mechanism 55 and an electric starting motor 56. Units 54-56 are located inside the enclosure 57 shown in FIG. 2. In the present embodiment, the electric generator 13 is of the three-phase alternating-current hydrogen-cooled type and is capable of generating better than 80 megawatts of electrical power at a voltage of 13.8 kilovolts. The rated speed of generator 13 is 3,600 rpm.

The physical structure associated with the gas turbine 12 includes a pair of vertically extending air intake ducts 58 and 59 which are open at the top and which communicate at their lower ends with a horizontal air intake duct 60. The duct 60, in turn, communicates with the air intake end of the compressor section of the gas turbine 12. In geograhical locations having high ambient temperatures, evaporative coolers (not shown) are located in the vertical air intake ducts 58 and 59. The inlet guide vane mechanism 15 is located in the opening at the inlet end of the compressor section of the gas turbine 12. An air-to-air heat exchanger or air cooler 61 is located alongside of the gas turbine 12 and serves to cool some air which is extracted from an intermediate stage of the gas turbine compressor and then returned to the turbine section for purposes of cooling some of the turbine blades. Air cooler 61 is coupled to the gas turbine 12 by way of cooling pipes located in an enclosure 62.

The exhaust end of the gas turbine 12 is connected by way of duct work 63 to the afterburner unit 16 which is, in turn, coupled to the intake or inlet opening of the No. 1 heat recovery steam generator 18. The steam generator 18 includes a stack structure 64 (FIG. 2) having a heavy outer steel casing, such stack structure 64 being tied to and supported by a structural steel framework 65 (FIG. 2). Located at the top of the stack structure 64 are a pair of exhaust sections 66 and 67 which serve to exhaust into the atmosphere the hot gas supplied to the steam generator 18 by the gas turbine 12. The steam generator 18 further includes a deaerator unit 68, a low pressure feedwater storage tank 69 and a vertical high pressure steam drum 70. The overall height of the steam generator 18 is approximately 52 feet or some 5 stories.

Located alongside of the gas turbine 12, the electric generator 13 and the steam generator 18 are a number of auxiliary equipment enclosures 71, 72, 73 and 74. For simplicity of illustration, enclosure 73 is not shown in FIG. 2. Enclosure 71 is a gas turbine mechanical auxiliary equipment enclosure which houses, among other things, the fuel valves, fuel pumps, pressure regulators and the like for the fuel system which supplies the fuel to the gas turbine 12, the lube oil and seal oil equipment for the gas turbine 12 and various control system components such as actuators, control relays, sensors, signal transmitters and the like used in connection with the foregoing mentioned and other mechanisms associated with the gas turbine 12.

Enclosure 72 is a gas turbine and generator auxiliary equipment enclosure which, among other things, houses a motor control center for the gas turbine 12 and generator 13, a bank of storage batteries for providing emergency auxiliary power, a battery charger system for the storage batteries, hydrogen cooling equipment for the generator 13, lube and seal oil equipment for the generator 13 and various control system components such as actuators, control relays, sensors, signal transmitters and the like used in connection with the foregoing mentioned and other mechanisms associated with the gas turbine 12 and generator 13.

Enclosure 73 (FIG. 3) is an afterburner auxiliary equipment enclosure which, among other things, houses the fuel valves for the afterburner 16. Enclosure 74 is a steam generator auxiliary equipment enclosure which, among other things, houses a main boiler feed pump, a standby boiler feed pump, a chemical treatment system including storage tanks and pumps for phosphate, hydrazine and amine, a motor control center and various motors, valves and heater controls associated with the steam generator 18 and various control system components such as actuators, control relays, sensors, signal transmitters and the like used in connection with the foregoing mentioned and other mechanisms associated with the steam generator 18.

The second electric generator 23 is located in line with the second gas turbine 22, the rotary shaft of the generator 23 being connected in tandem with the rotary shaft of the gas turbine 22. Connected in tandem with the generator 23 at the opposite end thereof is an exciter unit 76, a disengaging coupler or clutch mechanism 77 and an electric starting motor 78. Units 76–78 are located in the enclosure 79 shown in FIG. 2. Electric generator 23 is of the three-phase alternating-current hydrogen-cooled type and is capable of generating in excess of 80 megawatts of electrical power at a voltage of 13.8 kilovolts. The rated speed of generator 23 is 3,600 rpm.

The structure associated with the second gas turbine 22 includes a pair of vertical air intake ducts 80 and 81 which are open at the top and which communicates at the bottom with a horizontal air intake duct 82. Duct 82, in turn, communicates with the intake opening of the compressor section of the gas turbine 22. Air cooler 83 and cooling pipes in enclosure 84 serve to cool some air which is extracted from the compressor section of gas turbine 22 and is used to cool some of the blades in the turbine section of the gas turbine 22. The exhaust end of gas turbine 22 is coupled by way of a duct work 85 and the No. 2 afterburner unit 26 to the inlet opening of the No. 2 heat recovery steam generator 28.

The second steam generator 28 is of the same construction as the first steam generator 18 and, as such, includes a stack structure 86 (FIG. 2) having a heavy outer steel casing which is tied to and supported by a structural steel framework 87 (FIG. 2). Located at the top of the stack structure 86 are a pair of exhaust sections 88 and 89 which are open at the top. Steam generator 28 further includes deaerator unit 90, a low pressure feedwater, storage tank 91 and a vertical high pressure steam drum 92.

Located alongside of the gas turbine 22, electric generator 23 and steam generator 28 are a gas turbine mechanical auxiliary equipment enclosure 93, a gas turbine and generator auxiliary equipment enclosure 94, an afterburner auxiliay equipment enclosure 95 (not shown in FIG. 2) and a steam generator auxiliary equipment enclosure 96. These auxiliary equipment enclosures 93–96 include the same kinds of equipment as included in the auxiliary equipment enclosures 71–74, respectively. The equipment, mechanisms and components housed in enclosures 93–96 are used in connection with the operation of gas turbine 22, electric generator 23, afterburner 26 and steam generator 28 in the same manner that the corresponding auxiliary equipment in enclosures 71–74 is used in connection with the operation of gas turbine 12, electric generator 13, afterburner 16 and steam generator 18.

Considering now the steam turbine 36 and its associated electric generator 44, these units are, as indicated in FIG. 3, located in line with one another, the rotary shaft of the generator 44 being connected in tandem with the rotary shaft of the steam turbine 36. Coupled in tandem at the opposite end of the generator 44 is an exciter unit 101 and a turning gear 102. Units 101 and 102 are located in the enclosure 103 shown in FIG. 2. Electric generator 44 is of the three-phase alternating-current hydrogen-cooled type and is capable of generating in excess of 100 megawatts of electrical power at a voltage of 13.8 kilovolts. The rated speed of generator 44 is 3,600 rpm.

Steam turbine 36 receives superheated steam from the two steam generators 18 and 28 by way of steam pipes 34, 37, 39, 40 and 42. The exhaust end of the steam turbine 36 is connected by way of duct work 104 to the steam inlet of the condenser 31. The resulting condensed steam or condensate is collected in a hotwell (not shown) located below the condenser 31, from whence it is pumped back to the steam generators 18 and 28 by way of condensate piping which, for sake of clarity, is not shown in FIGS. 2 and 3.

Cooling water or circulating water for the condenser 31 is obtained from a nearaby body of water 105, such as a river or lake or the like, at which is located a water intake station 106. Water intake station 106 includes appropriate circulating water pumps, cooling water pumps, traveling screens, trash racks, strainers, and the like for obtaining the water needed by the condenser 31 as well as the water needed by an auxiliary cooling water system to be described hereinafter. The water intake station 106 pumps circulating water by way of pipes 107 an 108 to the condenser 31 which, as will be seen, is of the divided water box type. Incoming water flowing by way of pipe 108 passes through one set of condenser tubes in the condenser 31 and is returned by way of a discharge pipe 110 and a water outlet station 111 to the body of water 105. Water flowing to the condenser 31 by way of the pipe 107 passes through a second set of condenser tubes in the condenser 31 and is returned to the body of water 105 by way of the discharge pipe 110 and the water outlet station 111. Where the body of water 105 is a river, the outlet station 111 is located on the downstream side of the intake station 106.

As is seen in FIG. 3, the desuperheater 46 in the steam bypass path is located above the condenser 31, the discharge end of the desuperheater 46 being connected by way of pipe 47 to a bypass inlet 112 in the duct work 104.

Located alongside of the steam turbine 36 is a steam turbine mechanical auxiliary equipment enclosure 113 which, among other things, houses a hydraulic system for the steam turbine valves, a lube oil system for the steam turbine 36 including a lube oil cooler and controller, a gland steam condenser, air ejector apparatus for the condenser 31 and various control system components such as actuators, control relays, sensors, signal transmitters and the like used in connection with the steam turbine 36 and the condenser 31. Located alongside of the electric generator 44 is a steam turbine and generator auxiliary equipment enclosure 114 which, among other things, houses a motor control center for the steam turbine 36 and generator 44, a bank of storage batteries for providing emergency auxiliary power, a battery charging system for the storage batteries, hydrogen cooling equipment for the generator 44, seal oil equipment for the steam turbine 36 and generator 44 and various control system components such as actuators, control relays, sensors, signal transmitters and the like used in connection with the foregoing mentioned and other mechanisms ssociated with the steam turbine 36, generator 44 and condenser 31.

Three-phase alternating-current electrical power is taken from the armature windings of the three-phase alternating-current generator 13 by means of power conductors 120 which run to oil-type circuit breakers 121. The ouptput sides of circuit breakers 121 are connected by power conductors 122 to the primary windings of a three-phase main power transformer 123. The secondary windings of the main power transformer 123 are connected by means of power conductors 124 to an adjacent high-voltage transmission substation (not shown) of the electric utility system which receives the electricity generated by the electric power generating plant 10. An auxiliary transformer 125 is connected to the power conductors 122 and is used to tap off some of the electrical power produced by the generator 13 for use in operating the various electrical equipment and apparatus included in the plant 10.

Three-phase alternating-current power is taken from the armature windings of the second three-phase alternating-current generator 23 by means of power conductors 130 which run to oil-type circuit breakers 131. The output sides of circuit breakers 131 are connected by power conductors 132 to the primary windings of a second three-phase main power transformer 133. The secondary windings of the main power transformer 133 are connected by means of power conductors 134 to the adjacent high-voltage transmission substation (not shown) of the electric utility system which receives the power generated by the combined cycle plant 10. An auxiliary transformer 135 is connected to the power conductors 132 and is used to tap off some of the electrical power produced by the generator 23 for use in energizing the various electrical equipment and apparatus included in the plant 10.

Three-phase alternating-current power is taken from the armature windings of the third three-phase alternating-current generator 44 by means of power conductors 140 which run to the primary windings of a third three-phase main power transformer 143. The secondary windings of the main power transformer 143 are connected by means of power conductors 144 to the adjacent high-voltage transmission substation of the electric utility system which receives the power from the plant 10.

The adjacent high-voltage transmission substation (not shown) which is connected to the secondary windings of the three main power transformers 123, 133 and 143 via conductors 124, 134 and 144 is, in turn, connected to the electric power transmission system which is used to carry the electrical power generated by the plant 10 to the various industrial, commercial and residential customers of the electric utility system. By way of example only, the magnitude of the voltage generated by each of the generators 13, 23, and 44 may have a value of, for example, 13.8 kilovolts and the magnitude of the voltage appearing across the secondary windings of each of the main power transformers 123, 133 and 143 may have a value of, for example, 230 kilovolts.

B. Heat Recovery Steam Generator Mechanical Structure

Figure 4:
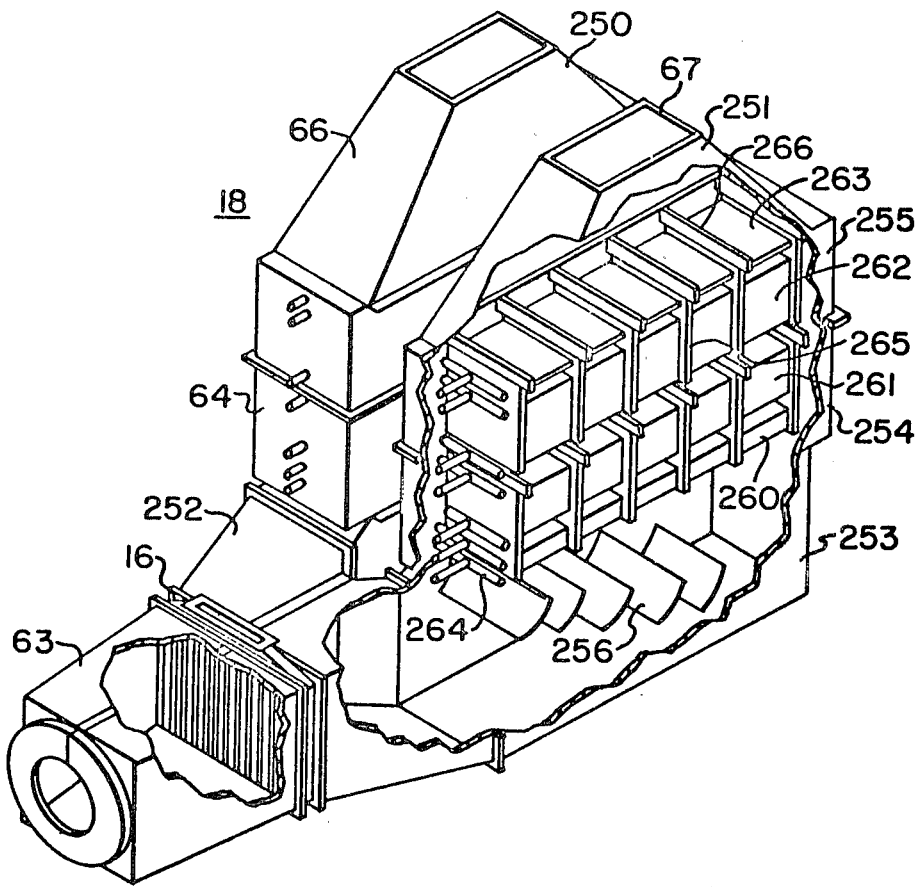
FIG. 4 shows a perspective view of a heat recovery steam generator as incorporated into the combined cycle electric power plant of FIG. 1.

Referring now to FIG. 4, there is shown in greater detail the manner of construction of the first heat recovery steam generator 18. FIG. 4 is a partially broken away perspective view of the main body portion or stack structure 64 of the steam generator 18. As there seen, the stack structure 64 is split into two separate parallel structures 250 and 251, this being done to facilitate shop assembly and transportability to the plant site. A "Y" shaped diffuser duct 252 directs the hot gas from the afterburner 16 into the lower portions of each of the stack structures 250 and 251. Each of the stack structures 250 and 251 includes a turning vane module 253, a lower tube module 254, an upper tube module 255 and an exhaust transition section, the exhaust transition section for the stack structure 250 being item 66 and that for the stack structure 251 being item 67.

Located in each of the two turning vane modules 253 is a number of curved turning vanes 256 which serve to turn the hot gas flow upwardly through the remainder of the stack structure. Located inside each of the lower tube modules 254 are two separate sets or bundles of boiler tubes 260 and 261, the lower set 260 being a superheater section and the higher set 261 being a higher-pressure evaporator section. The upper tube module 255 also includes two bundles or sets of boiler tubes 262 and 263, the lower set 262 being an economizer section and the upper set 263 being a low-pressure evaporator section. A typical one of the various headers for the tube sets is indicated at 264, this being the outlet header for the superheater section 260.

The tubes in all four sections 260–263 are of the serrated fin type wherein the fin is in the form of a slotted metal strip which is continuously welded to the tube. The tubes in the superheater and high-pressure evaporator sections 260 and 261 are approximately two inches in diameter, while the tubes in the economizer and low-pressure evaporator sections 262 and 263 are approximately 1.5 inches in diameter. The tubes and tube fins in the high-pressure evaporator section 261, the economizer section 262 and the low-pressure evaporator section 263 are made of carbon steel, while the tubes and tube fins in the superheater section 260 are made of chromium stainless steel. All the tubes in each of the modules 254 and 255 are supported in interlocking tube supports 265. These tube supports 265 are hung from carbon steel I-beams 266 located across the top of each of the modules 254 and 255. These I-beams 266 protrude through the module walls and are bolted to the structural steel framework 65 (FIG. 2) during plant erection.

The hot exhaust gas from the gas turbine 12 passes through the afterburner 16, is turned upwardly by the turning vanes 256 and passes through the various tube bundles 260–263. During this passage, the steam and water in the various tubes absorbs most of the heat from the turbine exhaust gas. The turbine exhaust gas is thereafter exhausted to the atmosphere by way of the exhaust transition sections 66 and 67. The temperature of the hot gas leaving the afterburner 16 and entering the steam generator 18 may, under peak load conditions, be as high as 1200° Fahrenheit, in which case, the temperature of the gas exhausted to the atmosphere by way of exhaust sections 66 and 67 will, under normal operating conditions, be on the order of approximately 340° Fahrenheit.

The exhaust openings at the tops of the transition sections 66 and 67 are provided with stack covers (not shown) having adjustable louvers which may be closed when the steam generator 18 is not in use. The diffuser duct 252 and the outer shell of each of the modules 253, 254 and 255 and the exhaust transition sections 66 and 67 are constructed of carbon steel and are internally lined with insulation material made of hydrous calcium silicate bonded with asbestos fibers. This insulation material is covered with metal lagging to prevent erosion.

A primary purpose of the turning vanes 256 is to provide a uniform distribution of gas flow through the tube bundles 260–263 and to dissipate hot spots in the gas steam caused by the afterburner 16. A further advantage is to produce an arrangement where the superheater tubes 260 absorb almost no heat by direct radiation. This latter feature enables superheater performance and tube metal temperatures to be more accurately controlled.

The construction of the steam generator 18 is such that it can be drained and vented without shutting down the gas turbine 12 and operated dry for extended periods of time with no adverse effect on the equipment. The steam generator 18, like other components in the combined cycle plant 10, is prepackaged and shipped to the plant site as factory assembled modules. In other words, each of the modules 253, 254 and 255, as well as the diffuser duct 252 and the exhaust sections 66 and 67, are completely preassembled at the factory and are individually shipped by rail or the like to the plant erection site. These various modules and sections are then bolted or welded together at the plant site to provide the complete steam generator structure. This modular approach considerably reduces the overall cost of the steam generator and holds the field erection work to a minimum.

The second heat recovery steam generator 28 is of the same construction as shown in FIG. 4 for the first heat recovery steam generator 18.

C. Detailed Plant Description

Referring now to FIGS. 5G and 5A–5F, FIG. 5G is a key diagram showing the manner in which FIGS. 5A–5F are to be arranged to form a complete view. FIGS. 5A–5F, when arranged in the manner indicated in FIG. 5G, constitute a detailed flow or piping and instrumentation diagram for the combined cycle electric power generating plant 10 of FIG. 3. As such, FIGS. 5A–5F show in greater detail the various valves, pumps, measurement devices and other items associated with the heat recovery steam generators 18 and 28, the condenser 31 and the steam turbine 36, as well as the various fluid pipes and lines which interconnect these units and their associated items. FIGS. 5A–5F also show in considerable detail the piping, valves, pumps and so forth for the fuel systems for the gas turbines 12 and 22 and the afterburners 16 and 26. At times herein, the composite figure formed by FIGS. 5A–5F will simply be referred to as FIG. 5G.

The same reference numerals used in the earlier figures will be used in FIGS. 5A–5F for elements previously described in these earlier figures. In some cases, an item previously described as a single element will be described in FIGS. 5A–5F as two or more identical elements performing the same function, usually in parallel with one another. In such cases, the same reference numeral will be used but with suffix letters a, b, c, etc. added thereto to distinguish the different ones of the identical multiple elements. For example, there is shown in FIG. 1 a single condensate pump 30 whereas, in FIG. 5B, there is shown a pair of condensate pumps 30a and 30b. During normal operation, the two pumps 30a and 30b are equivalent to the single pump 30.

Figure 5A:
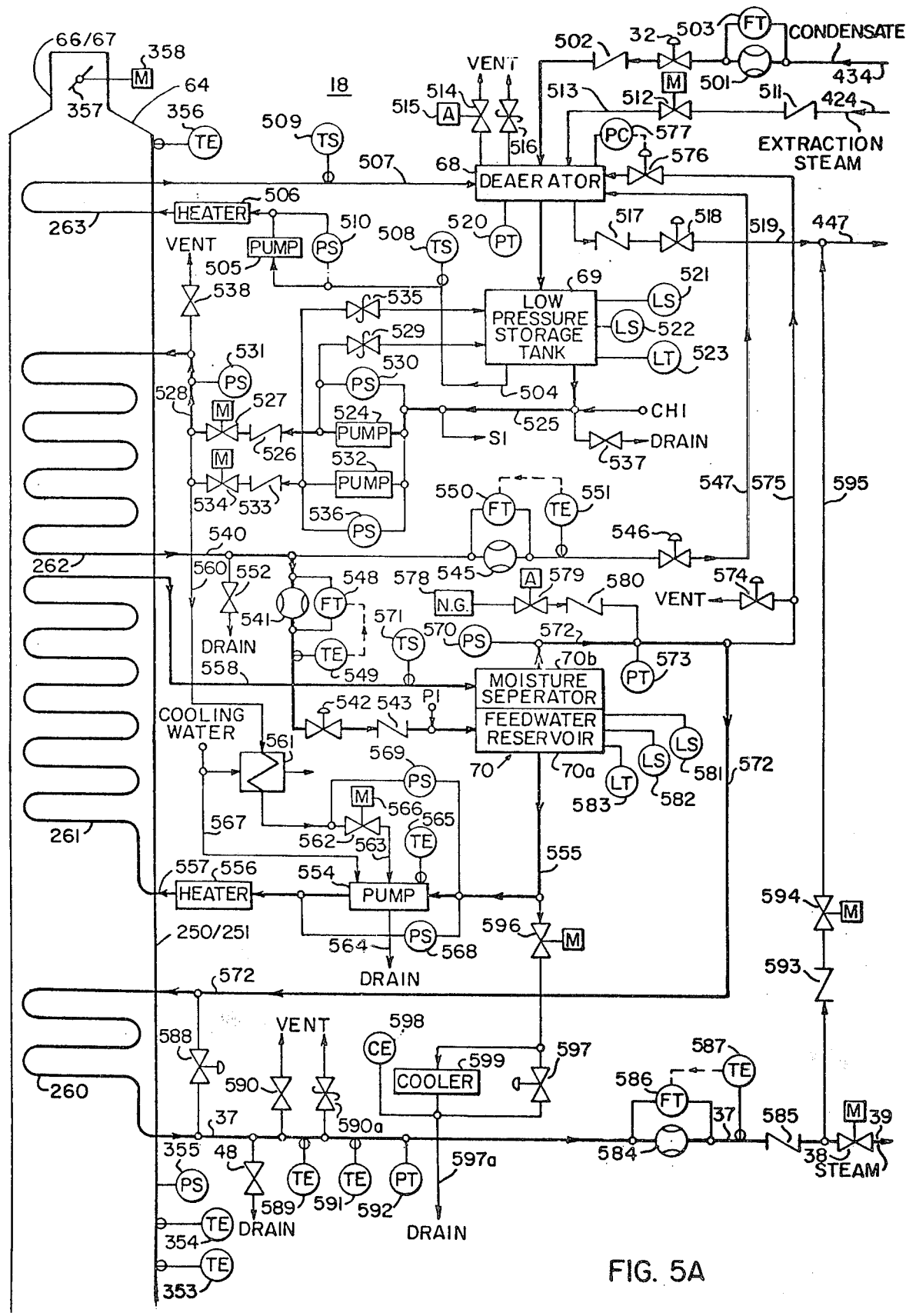
FIGS. 5A to 5F show schematically in detail the fluid interconnections between the gas turbines, the steam turbine and the steam generators as generally shown in FIG. 1.

In other instances, items shown as multiple elements in earlier figures will, for simplicity of illustration, be shown as single elements in FIGS. 5A–5F. For example, in FIG. 4, the stack structure 64 of the first steam generator 18 is shown as being comprised of a pair of parallel stack structures 250 and 251. In FIG. 5A, only a single stack structure 64 is shown, it being understood that this single structure in FIG. 5A represents, in a schematic manner, the two parallel structures 250 and 251 of FIG. 4. Thus, the superheater tubes 260 shown in FIG. 5A comprise and include the superheater tubes 260 in both of the parallel stack structures 250 and 251. The superheater tubes 260 in the two structures 250 and 251 are, in fact, operated in parallel to function, from a process flow standpoint, as a single set of tubes. This same consideration applies to the other tube sets 261, 262 and 263 included in the stack structures 250 and 251 of FIG. 4.

Various elements in FIGS. 5A–5F are identified by letter symbols. The meanings of these letter symbols are set forth in the following table:

| LETTER SYMBOL | ELEMENT DESCRIPTION |
| --- | --- |
| A | Actuator |
| C | Clutch |
| CC | Conductivity Controller |
| CE | Conductivity Element |
| CT | Conductivity Transmitter |
| E | Exciter |
| F | Filter |
| FC | Flow Controller |
| FE | Flow Element |
| FT | Flow Transmitter |

-continued

| LETTER SYMBOL | ELEMENT DESCRIPTION |
| --- | --- |
| LC | Level Controller |
| LS | Level Switch |
| LT | Level Transmitter |
| M | Motor |
| NG | Nitrogen Gas Supply |
| PC | Pressure Controller |
| PS | Pressure Switch |
| PT | Pressure Transmitter |
| S | Speed Transducer |
| TC | Temperature Controller |
| TE | Temperature Element |
| TG | Turning Gear |
| TS | Temperature Switch |
| TT | Temperature Transmitter |

The various conductivity elements (CE), conductivity transmitters (CT), flow transmitters (FT), level switches (LS), level transmitters (LT), pressure switches (PS), pressure transmitters (PT), speed transducers (S), temperature elements (TE), temperature switches (TS) and temperature transmitters (TT) shown in FIG. 5G develop various electrical signals which provide measurements of various parameters and which, in most cases, are transmitted to the digital and analog control system equipment located in the plant control center building 150 (FIG. 3) for turbine and plant control and monitoring purposes. The actuators (A), and (M) and most of the valves shown in FIG. 5G, on the other hand, are responsive to and are controlled by control signals which, for the most part, are produced by the digital and analog control system equipment located in the plant control center building 150.

It is noted at this point that most of the valves shown in FIG. 5G are diaphragm valves of either the pneumatic of the hydraulic type. The pneumatic valves are actuated by pressurized air obtained from the plant instrument air supply. They are controlled, however, by electrical signals which are applied to electrical-to-pneumatic converters associated with the valve pneumatic mechanisms. Most of the valves associated with the heat recovery steam generators 18 and 28 and the gas turbines 12 and 22 are of the pneumatic type. On the other hand, most of the valves associated with the steam turbine 36 are hydraulic valves which are operated by electrohydraulic controls. In this case, the valve actuating fluid is high pressure oil with the hydraulic actuator mechanism being controlled by an electrical control signal. For simplicity of illustration and description, the pneumatic and hydraulic mechanisms will, for the most part, not be shown or described herein and the valves will be spoken of more or less as though they were being driven directly by the electrical control signals.

Reference is made to a printed technical paper entitled "Electro-Hydraulic Control For Improved Availability and Operation of Large Steam Turbines," presented by M. Birnbaum and E. G. Noyes at the ASME-IEEE National Power Conference at Albany, New York during Sept. 19–23, 1965, for further description of typical hydraulic valves and electrohydraulic actuators.

Considering now the No. 1 gas turbine 12 (FIG. 5D), there is associated therewith, in addition to the other elements previously considered, a turning gear 349 which is coupled to the rotary shaft structure 165 and which is used to rotate such gas turbine structure at a speed of approximately 5 rpm just prior to a gas turbine startup and during the cool down period following a gas turbine shutdown. A speed pick-up device or speed transducer 350 is also coupled to the rotary shaft structure 165 and produces an electrical signal indicative of the speed of rotation (rpm) of the gas turbine 12 and the electric generator 13. During normal operation under load conditions, the gas turbine speed will be the synchronous value of 3,600 rpm and, during startup, it will normally be a controlled value as the turbine is accelerated to synchronous speed. Further, there is coupled to the turbine combustor shell 166 which surrounds the 16 combustors 167a–167p a pressure transmitter 351 which produces an electrical signal indicative of the magnitude of the pressure within the combustor shell. There is located in the turbine section 162 in the gas flow path at a point immediately following the last row of turbine blades an array of 16 temperature sensors or temperature elements 352a which provide signals indicative of the gas turbine blade path temperature. There is also located in the exhaust duct 63 leading from the turbine section 162 to the afterburner 16 an array of 16 temperature sensors or temperature elements 352b which provide signals indicative of the gas turbine exhaust temperature. Under peak load conditions, this exhaust temperature will be somewhere on the order of 900° to 1000° Fahrenheit.

As shown in FIG. 5A, there is located at the lower end of the stack structure 64 of the first steam generator 18 a plurality of temperature elements, including temperature elements 353 and 354, which provide indications of the steam generator inlet gas temperature. Under typical peak load conditions, this temperature will be on the order of approximately 1200° Fahrenheit as a result of added afterburner heat. A pressure switch 355 monitors the steam generator inlet gas pressure and produces a warning signal if such pressure exceeds a desired limit. Located at the top of the stack structure 64 is a further temperature element 356 which produces a signal indicative of the gas top temperature at the top of the stack. Under typical peak load conditions, this temperature will be approximately 340° Fahrenheit. Thus, under typical peak load conditions, the gas temperature varies from about 1200° Fahrenheit at the bottom of the stack 64 (temperature element 353) to about 340° Fahrenheit at the top of the stack 64 (temperature element 356). The gas temperature intermediate the superheater tubes 260 and the high pressure evaporator tubes 261 is about 1000° Fahrenheit. The gas temperature intermediate the high pressure evaporator tubes 261 and the economizer tubes 262 is about 600° Fahrenheit. The gas temperature intermediate the economizer tubes 262 and the low pressure evaporator tubes 263 is about 360° Fahrenheit.

Located at the top of the stack structure 64 is a stack cover louver structure 357 which can be closed when the gas turbine 12 is not in service. This stack cover mechanism 357 is operated by a motor 358. In passing, it is noted that there are actually two of these stack cover mechanisms 357, one being located at the top of each of the two parallel stack structures 250 and 251 (FIG. 4).

Considering now the second heat recovery steam generator 28 (FIG. 5C), there is located within the stack structure 86 thereof superheater tubes 360, high pressure evaporator tubes 361, economizer tubes 362 and low pressure evaporator tubes 363. These tubes 360–363 correspond in purpose and function to the tubes 260–263, respectively, located in the stack structure 64 of the first steam generator 18. Located at the lower end of the second stack structure 86 (FIG. 5F) are turning vanes 366 which turn the turbine exhaust gas upwardly through the tube sections 360–363.

Figure 5B:
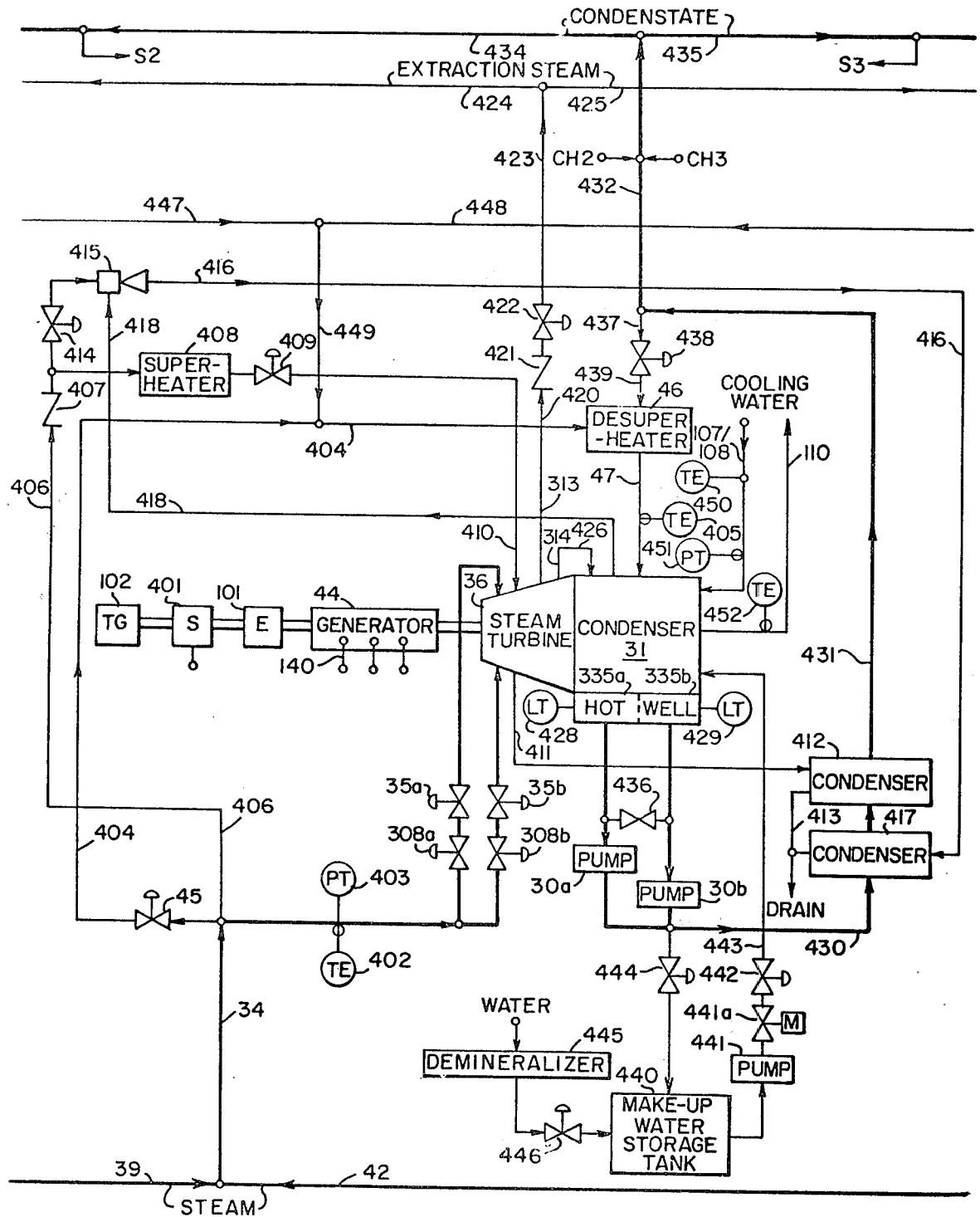
Figure 5C:
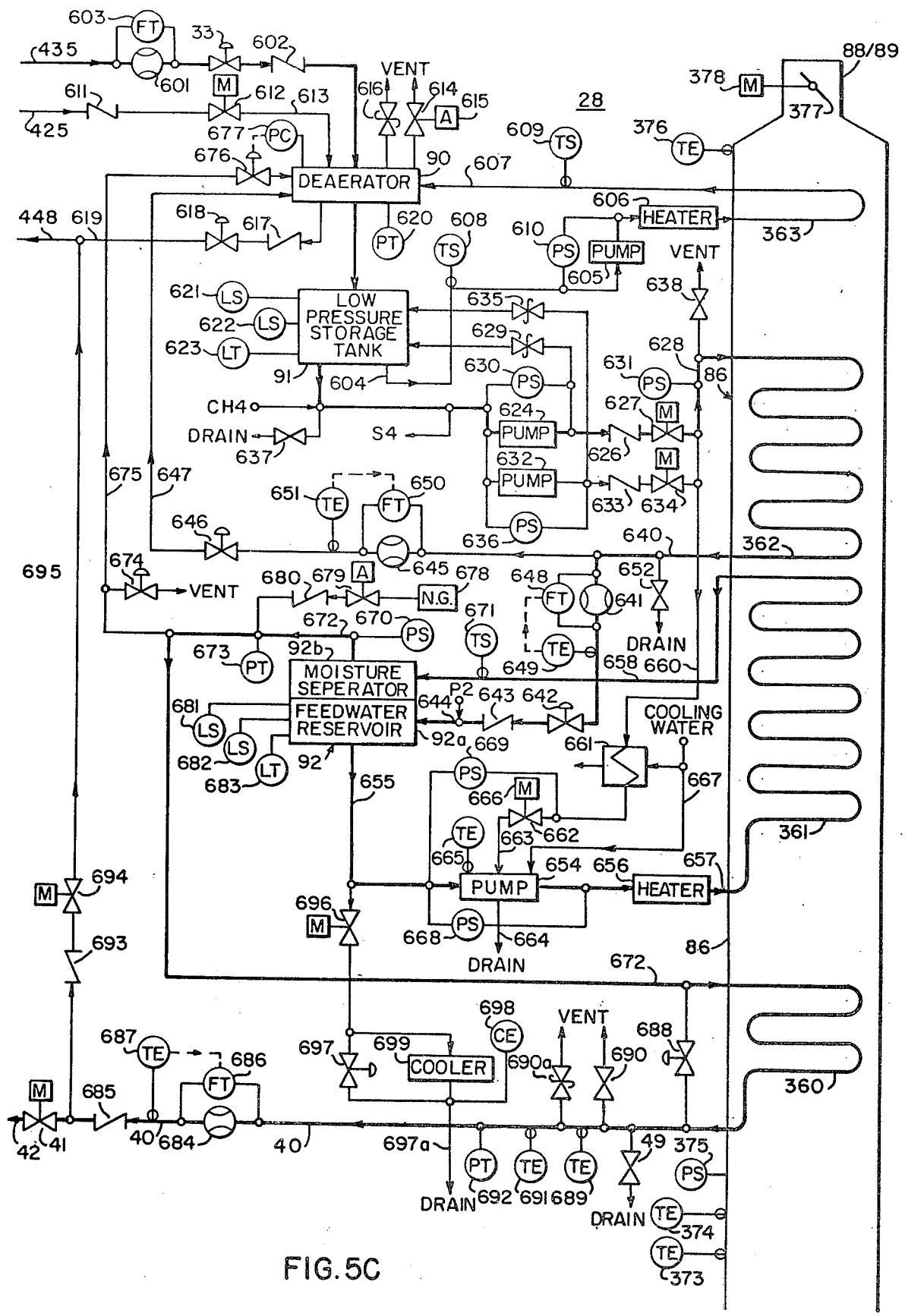
Figure 5D:
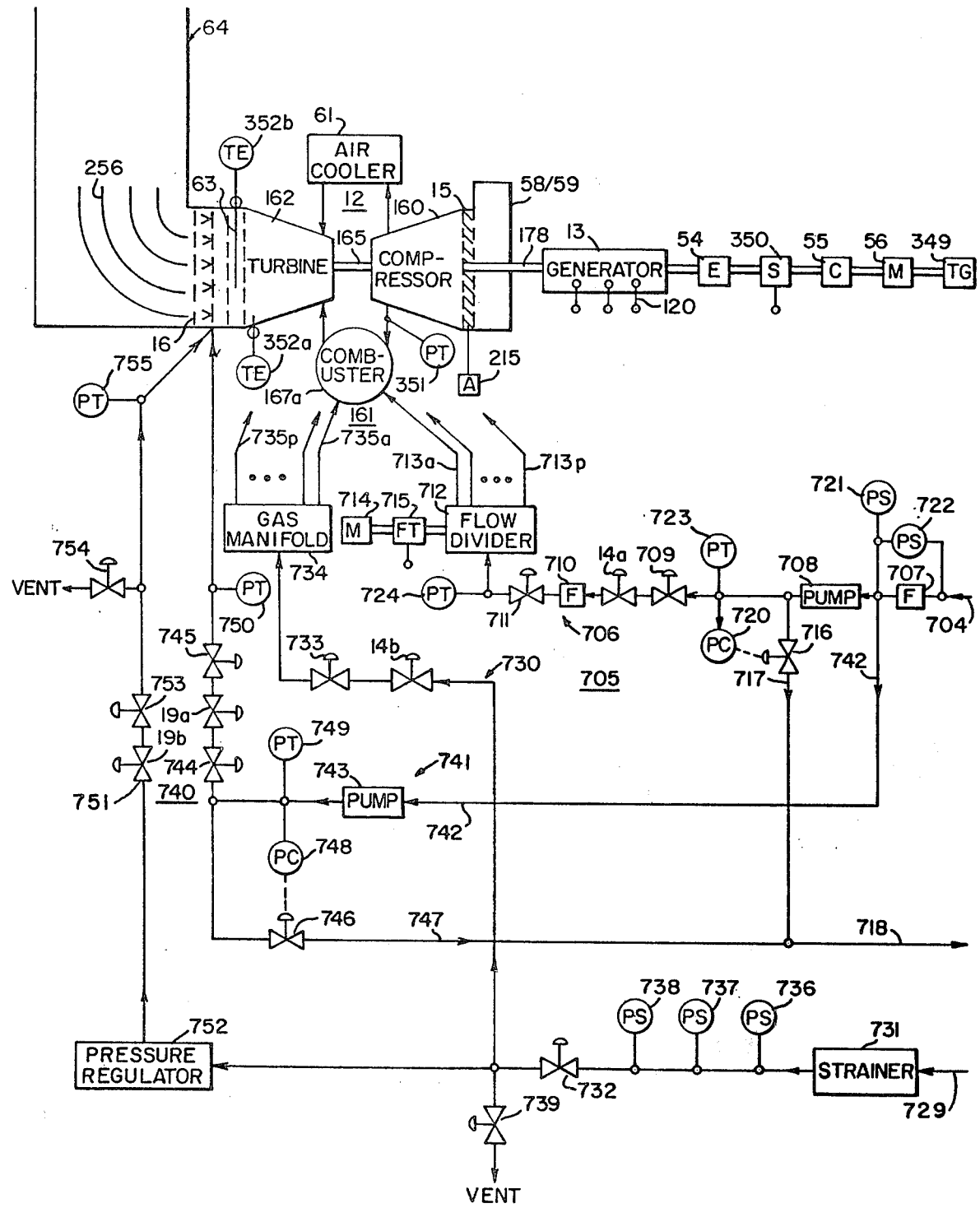
Figure 5E:
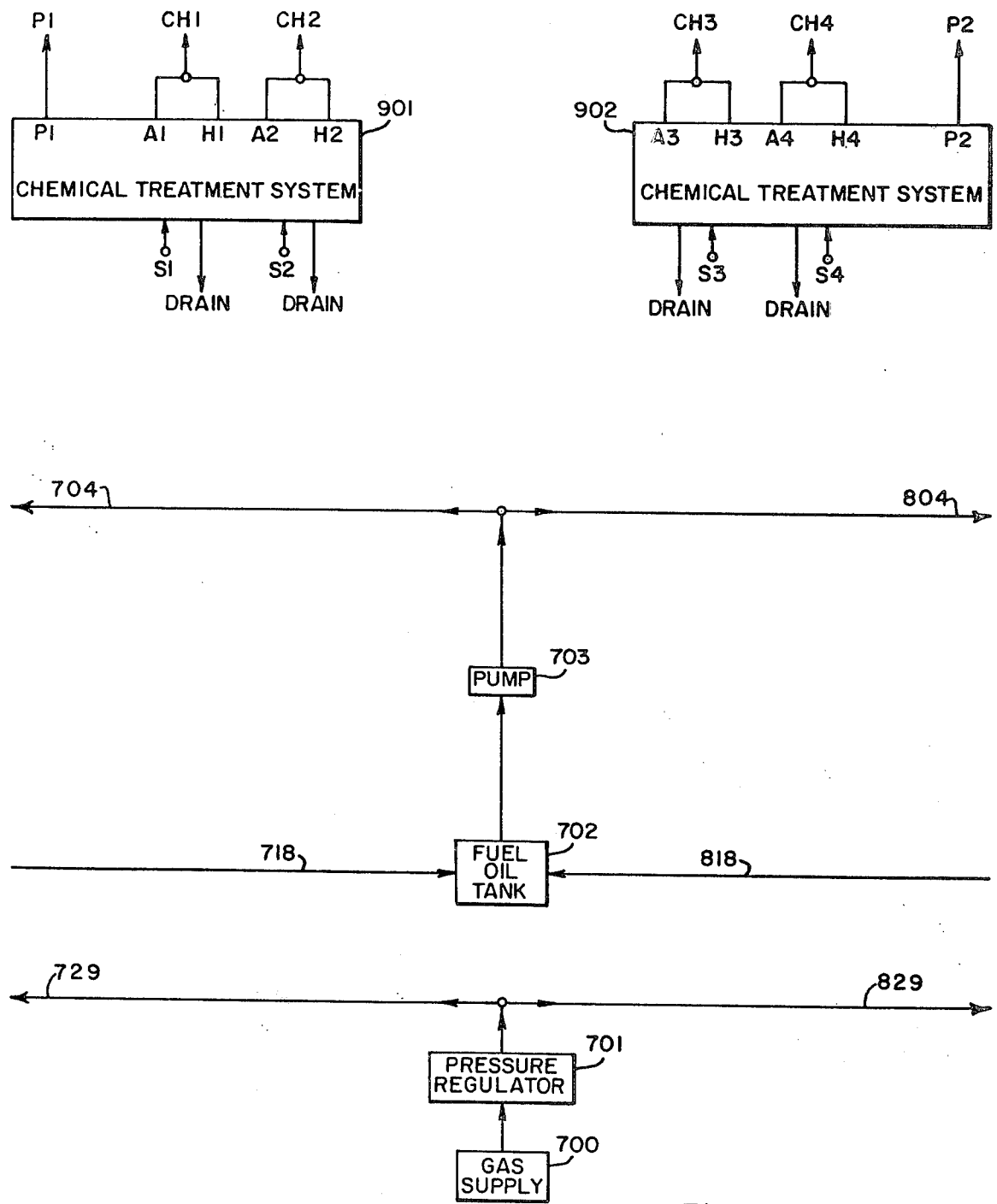
Figure 5F:
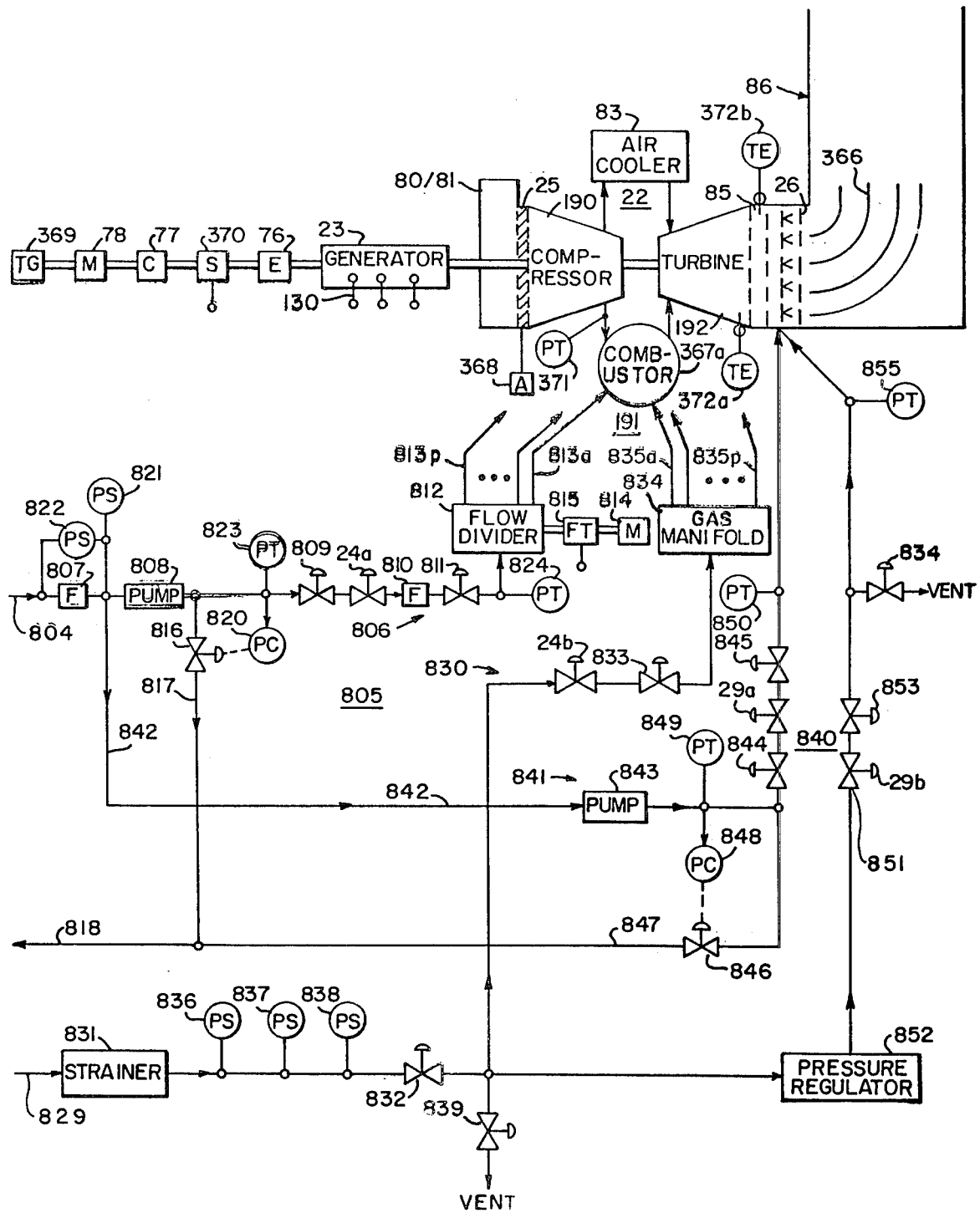

The combustion section 191 of the second gas turbine 22 (FIG. 5F) includes a concentric array of 16 combustors 367a–367p with only the combustor 367a being shown in FIG. 5F. The inlet guide vane mechanism 25 associated with the second gas turbine 22 is controlled by an actuator mechanism 368. A turning gear 369 is coupled to the rotary shaft structure of the electric generator 23 for turning the gas turbine rotor structure at a speed of approximately 200 rpm just prior to a gas turbine startup and during the cool down period following a gas turbine shutdown. A speed transducer 370 is coupled to the rotary shaft structure of the electric generator 23 and produces an electrical signal which indicates the speed of rotation or rpm of the rotary structures of generator 23 and gas turbine 22. A pressure transmitter 371 produces an electrical signal which indicates the magnitude of the pressure within the combustor shell which forms the outer housing of the gas turbine combustion section 191.

An array of 16 temperature elements 372a measure the blade path temperature at the outlet of the blade section in turbine portion 192 of the gas turbine 22. An array of 16 temperature elements 372b measure the exhaust gas temperature of the gas turbine 22. As shown in FIG. 5C, temperature elements 373 and 374 measure the inlet gas temperature for the stack structure 86, while a pressure switch 375 monitors the inlet gas pressure. A temperature element 76 measures the stack top gas temperature for the stack structure 86. Typical temperature values are the same as for the first stack structure 64. An adjustable louver type stack cover mechanism 377 is located at the top of the stack structure 86 (there being one of these mechanisms for each of the exhaust sections 88 and 89) and it is controlled by a motor 378.

Considering now the steam turbine 36, electric generator 44 and condenser 31 (FIG. 5B) in greater instrumentation detail, a speed transducer 401 is coupled to the rotary shaft structure of the generator 44 and produces an electrical signal indicating the rotary speed or rpm of the rotor structures of the steam turbine 36 and generator 44. Under normal load conditions, the steam turbine speed will be the synchronous value of 3,600 rpm and, during startup, the steam turbine speed will normally be a controlled value as the turbine accelerates to snychronous speed. A temperature element 402 and a pressure transmitter 403 generate electrical signals which indicate the throttle temperature and the throttle pressure of the steam entering the inlet of the steam turbine 36. Under typical peak load conditions, the turbine inlet steam temperature will be approximately 952° Fahrenheit and the turbine inlet steam pressure will be approximately 1,277 pounds per square inch (absolute). The outlet side of the steam turbine bypass valve 45 is connected to the desuperheater 46 by way of a steam pipe 404. A temperature element 405 generates an electrical signal which indicates the temperature of any steam flow from the desuperheater 46 to the condenser 31 by way of steam pipe 47. Under typical load conditions with both of the gas turbines 12 and 22 in operation, the bypass valve 45 is fully closed and no steam flows to the desuperheater 46.

Some of the steam in the incoming main steam pipe 34 is removed by way of a steam pipe 406 and supplied by way of a check valve 407, a superheater 408, a control valve 409 and a steam pipe 410 to the gland seals inside the steam turbine 36 to provide the desired sealing action therein. Superheater 408 is an electric heater having a rating of, for example, 45 kilowatts and is included in the steam turbine motor control center located in the auxiliary equipment enclosure 114 (FIG. 2). After passage through the gland seal structure, this gland steam is removed by way of a pipe 411 and passed to a gland steam condenser 412, the resulting condensate being passed to a drain tank (not shown) by way of a drain line 413.

Some of the steam in main steam line 34 is also supplied by way of a control valve 414 to an air ejector mechanism 415. Air ejector mechanism 415 is a Venturi type air ejector which is used to evacuate the condenser 31. The steam leaving the air ejector 415 passes by way of a steam line 416 to an air ejector steam condenser 417, the resulting condensate being passed to the drain line 413. Air is removed from the condenser 31 by way of a line 418 which runs to the air ejector 415. The Venturi effect occurring in the air ejector 415 serves to suck the air out of the condenser 31 by way of the air line 418. Under typical operating conditions, this evacuates the condenser 31 to a pressure of approximately two inches of mercury.

Extraction steam for feedwater heating purposes is removed from the steam turbine 36 between the tenth and eleventh stages thereof by way of turbine outlet 313 and is supplied by way of a steam pipe 420, a check valve 421, a control valve 422 and steam pipe 423 to a pair of branch steam pipes 424 and 425. The branch steam pipe 424 supplies extraction steam to the deaerator 68 included in the first steam generator 18 (FIG. 5A), while the branch steam pipe 425 supplies extraction steam to the deaerator 90 included in the second steam generator 28 (FIG. 5C). The "internal water removal" steam removed between the 12th and 13th stages via the steam turbine outlet 314 is supplied by way of steam pipe 426 to the condenser 31. Level transmitters 428 and 429 produce electrical signals which indicate the wate levels in hotwell portions 335a and 335b, respectively.

Condensate is pumped from the two hotwell portions 335a and 335b of the divided hotwell 335 by means of condensate pumps 30a and 30b, respectively. The inlet side of pump 30a is connected to the hotwell condensate outlet, while the inlet side of pump 30b is connected to the hotwell condensate outlet. The condensate pumped by pumps 30a and 30b is supplied by way of a condensate pipe 430, the air ejector steam condenser 417, the gland steam condenser 412, a condensate pipe 431 and a condensate pipe 432 to a pair of branch condensate pipes 434 and 435. Branch condensate pipe 434 runs to the deaerator 68 located in the first steam generator 18, while the second branch condensate pipe 435 runs to the deaerator 90 located in the second steam generator 28. The condensate as it leaves the pumps 30a and 30b is at a temperature of approximately 110° Fahrenheit. This condensate flows through the coolant tubes in the air ejector condenser 417 and the gland steam condenser 412 to provide the cooling action which occurs in these condensers 417 and 412. A normally-open manual crossover valve 436 is connected between the two hotwell outlets and can be closed if half the condenser 31 is shut down for maintenance purposes or the like. Each of the condensate pumps 30a and 30b has sufficient capacity to enable either pump alone to carry the full flow load in the event the other pump should fail.

Some of the condensate flowing in the pipe 431 is also supplied by way of a pipe 437, a desuperheater control valve 438 and a pipe 439 to the desuperheater 46. This condensate provides the cooling medium in the desuperheater 46. The desuperheater 46 is of the water spray type such that the relatively cool condensate entering by way of pipe 439 is sprayed into the relatively hot steam flow entering by way of the pipe 404. Under typical conditions for such steam flow, this lowers the steam temperature to about 350° Fahrenheit. The temperature signal produced by the temperature element 405 coupled to the desuperheater outlet pipe 47 is supplied by way of a temperature transmitter (not shown) and a temperature controller (not shown) to the desuperheater control valve 438 for purposes of regulating same to hold the temperature of the desuperheater outlet steam in pipe 47 fairly constant.

If the condensate level in the hotwell portions 335a and 335b becomes too low, than makeup water from a makeup water storage tank 440 is supplied to the hotwell portions 335a and 335b by means of makeup water pump 441, a makeup block valve 441a, a makeup control valve 442 and a makeup water pipe 443 which runs to the makeup water inlet 340 on the condenser 31. Conversely, if the condensate level in hotwells 335a and 335b becomes too high, then condensate is returned to the makeup water storage tank 440 by way of a condensate return valve 444. In other words, the pump 441 is operated and the valves 442 and 444 are opened and closed as needed in order to hold the condensate level in hotwells 335a and 335b fairly constant. This is accomplished by means of level sensing switches (not shown) associated with the hotwells 335a and 335b which operate the appropriate control circuits (not shown) to control the pump 441 and the valves 442 and 444. Block valve 441a is fully open during normal operation. When needed, additional water is supplied to the makeup water storage tank 440 from an external water source by way of a demineralizer 445 and a control valve 446.

A pair of auxiliary steam bypass lines 447 and 448 are connected by way of a common bypass line 449 to the bypass steam pipe 404 which runs to the desuperheater 46. Bypass line 447 enables steam from the first steam generator 18 (FIG. 5A) to be passed directly to the desuperheater 46 under certain operating conditions, while the bypass line 448 does likewise for the second steam generator 28 (FIG. 5C).

As previously indicated in connection with FIG. 3, cooling water or circulating water is taken from the river or lake 105 (FIG. 3) and supplied to the condenser tubes in the condenser 31 by way of circulating water intake pipes 107 and 108. Circulating water pumps located at the intake station 106 (FIG. 3) serves to move the water through the intake pipes 107 and 108. Temperature elements 450 and pressure transmitters 451 generate electrical signals which serve to monitor the temperature and pressure of the incoming circulating water. The circulating water leaves the condenser 31 by way of the outlet pipe 110 and is returned to the river or lake 105. A further temperature element 452 generates an electrical signal to monitor the temperature of the outgoing circulating water.

Various additional elements, pressure transmitters, level transmitters and other measurement devices are associated with the condenser 31 and the steam turbine 36, these items being omitted FIG. 5B for sake of simplicity.

Considering now the details of the first heat recovery steam generator 18 (FIG. 5A), condensate from the condenser hotwells 335a and 335b is supplied to the deaerator 68 by way of the condensate pipe 434, a flow element 501, the condensate control valve 32 (Cf. FIG. 1) and a check valve 502. A flow transmitter 503 cooperates with the flow element 501 to provide an electrical signal which indicates the value of the condensate flow rate through the flow element 501. Flow element 501 provides a restriction in the flow path and flow transmitter 503 measures the pressure differences across the restriction. As is well known, this pressure difference is indicative of the flow rate. Thus, flow element 501 and flow transmitter 503 constitutes a well-known type of flowmeter for measuring fluid flow.

Deaerator 68 provides a feedwater heating action as well as a deaerating action, and it is of the spray tray or jet tray type. The condensate entering from check valve 502 is sprayed by way of spray nozzles into a tray structure which also receives steam from the low pressure evaporator tubes 263. More particularly, the water or condensate collected in the deaerator 68 flows to a low pressure feed-water storage tank 69 which, among other things, serves as a storage reservoir for the deaerator 68. Water from this storage tank 69 flows by way of a pipe 504, a low pressure circulation pump 505, a standby electric heater 506, the low pressure evaporator tubes 263 and a pipe 507 to a steam inlet into the tray structure inside the deaerator 68. Low pressure circulation pump 505 provides the desired fluid flow and the low pressure evaporator tubes 263 in the stack structure 64 serve to convert the water into steam. This steam is supplied to the deaerator 68 by way of pipe 507 to heat the condensate entering the deaerator 68 from check valve 502. This provides a substantial portion of the desired feedwater heating.

Electric heater 506 is used for standby heating purposes when the gas turbine 12 is not in service. If the gas turbine 12 is not in operation and if it is desired to maintain the steam generator 18 in a hot standby condition, then the heater 506 is controlled by a temperature switch 508 so as to maintain the temperature of the water in the storage tank 69 at a value of approximately 250° Fahrenheit. If, on the other hand, it is desired that the steam generator 18 be shut down for an extended period of time but not drained, then electric heater 506 is used to provide freeze protection. In this latter case, the heater 506 is controlled by a temperature switch 509 so as to prevent the temperature of the water in this part of the system from falling below a value of 40° Fahrenheit. In both of these cases, the low pressure circulation pump 505 must be turned on and operating. A pressure switch 510 monitors the operation of the pump 505 and produces a warning signal if the pressure differential across the pump 505 becomes too low.

For total plant loads above approximately 80% of the total plant capacity, supplemental feedwater heating is provided by the extraction steam taken from the steam turbine 36. This extraction steam is supplied to the deaerator 68 by way of the extraction steam pipe 424, a check valve 511, a motor operated isolation valve 512 and a steam pipe 513. The extraction steam control valve 422 is opened for plant loads above the 80% figure. Below this figure, the steam used for feedwater heating is obtained from the low pressure evaporator tubes 263 and the economizer recirculation flow.

Deaerator 68 is provided with a low pressure vent valve 514 which is controlled by an actuator 515. Actuator 515 is of the solenoid type and is controlled by an appropriate control signal from the main operator control board in the plant control center building 150 (FIG. 3). During normal operation, the vent valve 514 is kept fully open to allow air to escape from the deaerator 68. The deaerator 68 is also provided with a pressure safety valve 516. Deaerator 68 is provided with a further pressure release mechanism which includes a check valve 517 and a dump valve 518, the outlet side of the latter being connected by way of a pipe 519 to the auxiliary steam bypass pipe 447 by way of which steam may be returned to the desuperheater 46 and condenser 31. If the pressure within the deaerator 68 exceeds 160 pounds per square inch, dump valve 518 opens to dump steam in the deaerator 68 back to the condenser 31. Among other things, this prevents a popping of the safety valve 516.

A pressure transmitter 520 senses the pressure within the deaerator 68 and provides a signal indicative of the value thereof. Level switches 521 and 522 monitor the water level within the low pressure storage tank 69, switch 521 producing an electrical warning signal if the water level is too high and switch 522 producing an electrical warning signal if the water level is too low. A level transmitter 523 produces an electrical signal indicative of the actual water level in the tank 69.

Boiler feedwater stored in the low pressure storage tank 69 is pumped through the economizer tubes 262 in the stack structure 64 by means of a main boiler feed pump 524. The intake side of boiler feed pump 524 is connected to the storage tank 69 by means of a feedwater pipe 525. The outlet side of boiler feed pump 524 is connected to the inlet side of economizer tubes 262 by means of a check valve 526, a motor operated block valve 527 and a feedwater pipe 528. Valve 527 is open during normal operation. The electric motor which runs the boiler feed pump 524 has a nominal rating of 1250 horsepower. A pressure safety valve 529 is connected between the outlet side of pump 524 and the low pressure storage tank 69. A pressure switch 530 monitors the pressure difference across the boiler feed pump 524 and produces an electrical warning signal if such pressure difference falls below a desired lower limit. A further pressure switch 531 monitors the pressure in the feedwater pipe 528 and produces an electrical warning signal if such pressure falls below a desired lower level.

A standby boiler feed pump 532 is connected in parallel with the main boiler feed pump 524 and the valves 526 and 527, the outlet side of this standby pump 532 being connected by way of a check valve 533 and a motor-operated block valve 534 to the feedwater pipe 528 which runs to the inlet of the economizer tubes 262. During normal operation of the steam generator 18, the standby pump 532 is turned off and the block valve 534 is closed. The electric motor which runs the standby pump 532 has a nominal rating of 25 horsepower. The standby pump 532 is used when the steam generator 18 is in either the hot standby mode or the freeze protection mode. At such time, the main boiler feed pump 524 is turned off and its block valve 527 is closed. A pressure safety valve 535 is connected to the outlet side of the standby pump 532 and is connected back to the low pressure storage tank 69. A pressure switch 536 monitors the pressure difference across the standby boiler feed pump 532 and produces an electrical warning signal when the pressure difference is too low.

A manually-operated drain valve 537 is provided for draining the deaerator 68 and low pressure storage tank 69 when the steam generator 18 is to be shut down for maintenance purposes or other desired reasons. A manually-operated vent valve 538 is connected to the economizer feedwater pipe 528 for venting air from the system when the steam generator 18 is being shut down and the system filled with a nitrogen blanket. During normal operation, the drain valve 537 and the vent valve 538 are closed.

During normal load operation, the main boiler feed pump 524 pumps boiler feedwater through the economizer tubes 262, such feedwater being obtained from the low pressure storage tank 69. Under typical peak load conditions, the feedwater leaving the storage tank 69 will be at a temperature of approximately 250° Fahrenheit. As this feedwater flows through the economizer tubes 262, it is heated to within 5° Fahrenheit of the saturation temperature, that is, the temperature at which it will boil at the pressure at hand. Under typical peak load conditions, the feedwater leaving the economizer tubes 262 will be at a temperature of approximately 570° Fahrenheit.

The hot feedwater leaving the economizer tubes 262 goes to two different places. Firstly, some of this feedwater flows by way of a pipe 540, a flow element 541, a feedwater control valve 542, a check valve 543 and a pipe 544 to the feedwater reservoir section 70a of the vertical steam drum 70. The remainder of the hot feedwater leaving economizer tubes 262 flows by way of pipe 540, a flow element 545, a recirculation control valve 546 and a pipe 547 back to the deaerator 68, wherein it serves to provide some of the heating of the condensate entering the deaerator 68.

During normal load operation, the feedwater control valve 542 and the recirculation control valve 546 are automatically controlled in a coordinated manner to keep constant the water flow rate through the economizer tubes 262. For example, if less water is required by the feedwater reservoir 70a (lower load level), then more water is recirculated back by way of the valve 546 to the deaerator 68, the proportions being such as to hold constant the water flow in the pipe 540. As the power generated by steam turbine 36 increases, more economizer water flow is directed to the feedwater reservoir 70a.

Constant water flow through the economizer tubes 262 is important in order to minimize steaming and prevent stagnation in some of the economizer tubes 262 at part loads. If the flow rate were not constant but instead were allowed to vary with load, then the flow rate would decrease as the load decreased. At the lower flow rates, the likelihood of steaming would be greater. The problem with steaming is that it produces an increased pressure drop in the tube wherein it is occurring. This leads to less flow and more steaming and ultimately stagnation or a complete absence of flow in such tube.

In the present embodiment, the flow rate is maintained constant at a relatively high value such that the same higher water velocities are provided in the various economizer tubes at all levels. Thus, the pressure drop across the entire economizer section 262 is relatively high at all load levels. Consequently, may increase in pressure drop caused by steaming in certain tubes is small compared to the total pressure drop, resulting in insignificant changes in water flow and thereby preventing stagnation in any of the economizer tubes 262. In addition, the higher pressure drops produced by the higher water velocities through the economizer tubes 262 promotes a more uniform distribution of water flow through the economizer tubes which, among other things, results in higher heat transfer coefficients on the inside of the tubes.

A further advantage of the constant water flow rate through the economizer tubes 262 is that the main boiler feed pump 524 operates at a constant and optimum rate in terms of pump efficiency for all plant load levels.

A flow transmitter 548 and a temperature element 549 are associated with the feedwater flow element 541, with the flow transmitter 548 providing an electrical signal indicative of the feedwater flow rate through the flow element 541 and the temperature element 549 providing temperature compensation for the flow rate signal. Similarly, a flow transmitter 550 and a temperature element 551 are associated with the recirculation path flow element 545, with the flow transmitter 550 providing an electrical signal indicative of the value of the flow rate of the water flowing back to the deaerator 68 and the temperature element 551 providing temperature compensation for the flow rate signal. A manually-operated drain valve 552 is connected to the feedwater pipe 540 for purposes of draining the economizer tubes 262 when the steam generator 18 is to be shut down. During normal operation, the drain valve 552 is closed.

The hot, nearly boiling feedwater in the feedwater reservoir 70a is pumped through the high pressure evaporator tubes 261 by a high pressure circulation pump 554. The electric motor associated with this pump 554 has a horsepower rating of 60 horsepower. The inlet side of the pump 554 is connected to the feedwater reservoir 70a by way of pipe 555. The outlet side of pump 554 is connected to the high pressure evaporator tubes 261 by way of a standby electric heater 556 and a pipe 557. As the hot feedwater flows through the high pressure evaporator tubes 261 it is converted into steam which is then supplied by way of a pipe 558 to the moisture separator section 70b of the steam drum 70. Under typical peak load conditions, the steam leaving the high pressure evaporator tubes 261 will be at a temperature of approximately 575° Fahrenheit.

The high pressure circulation pump 554 is of a type which employs floating ring type seals. The water required for these seals is obtained from the economizer inlet pipe 528 by way of a pipe 560, a water-to-water heat exchanger or cooler 561, a motor-operated control valve 562 and a pipe 563. Heat exchanger 561 cools the 250° Fahrenheit water coming from the feedwater pipe 528 to a temperature of approximately 150° Fahrenheit. The water leaving the pump seals is carried to a drain by way of a pipe 564.

With floating ring type seals, it is necessary to control the flow of water through the seals such that flashing will not occur since flashing of the water through the seals would result in erosion of the labyrinth elements in the seals. To this end, a temperature element 565 is located in the atmospheric collection chamber at the exit of the seals to sense the temperature of the seal water leaving the seals. This temperature element 565 produces an electrical signal which is supplied to a temperature transmitter (not shown) which drives a temperature controller (not shown) which, in turn, controls the motor 566 which operates the seal water control valve 562. This control loop modulates the control valve 562 to assure that only the required amount of water is provided to the pump seals.

Water for the stuffing box in the high pressure circulation pump 554 is supplied thereto from the cooling water source for heat exchanger 561 by way of a pipe 567. The stuffing box water is drained by way of the drain pipe 564. A pressure switch 568 monitors the pressure difference across the pump 554 and produces an electrical warning signal if this pressure becomes too low. A further pressure switch 569 monitors the differential pressure across the seals in pump 554 to provide an electrical warning signal if this pressure differential becomes too low.

The electric heater 556 is used for standby and freeze protection purposes when the gas turbine 12 is not in service. When the gas turbine 12 is not in operation and the steam generator 18 is in the hot standby mode, the heater 556 is controlled by a pressure switch 570 to maintain the proper steam pressure in the steam drum 70. In other words, pressure switch 570 turns on the heater 556 if the steam drum pressure falls below the desired minimum value. On the other hand, if the plant 10 is shut down for an extended period of time and the plant operator chooses not to generate steam in the steam generator 18, then the heater 556 is controlled by a temperature switch 571 to maintain the water in the steam drum 70 above the freezing point. The high pressure circulation pump 554 must be kept on and operating during either of these operating modes for the heater 556.

The moisture separator section 70b of the steam drum 70 receives the wet steam from the high pressure evaporator tubes 261 and removes practically all of the remaining water from such steam. The resulting dry steam leaves the moisture separator 70b and is supplied by way of a steam pipe 572 to the superheater tubes 260 located in the stack structure 64. Under typical peak load conditions, the dry steam leaving the moisture separator 70b is at a temperature of approximately 575° Fahrenheit and a pressure of approximately 1300 pounds per square inch (absolute).

A pressure transmitter 573 generates an electrical signal which indicates the steam pressure at the outlet of the moisture separator 70b. A high pressure vent valve 574 is connected to the steam line 572 for purposes of, among other things, venting some of the steam if it appears that the steam pressure inside the steam drum 70 is becoming too large. During normal operation, the vent valve 574 is closed. The steam drum 70 is also provided with one or more pressure safety valves which for simplicity of illustration, are not shown.

A steam line 575 is connected from the main steam pipe 572 to a deaerator pressure control valve 576 which is, in turn, connected to an additional steam inlet of the deaerator 68. The control valve 576 is controlled by a pressure controller 577 which is responsive to the pressure within the deaerator 68. Pressure controller 577 and control valve 576 function to maintain the desired steam pressure in the deaerator 68 at part loads for the plant 10. If the steam pressure within the deaerator 68 falls below the desired value, then pressure controller 577 opens the valve 576 to bring the pressure back up to the desired value. This is most likely to occur at part loads of less than about 80% because, in such cases, the extraction steam control valve 422 (FIG. 5B) is closed and no extraction steam is being supplied to the deaerator 68.

A nitrogen gas supply 578 is connected to the main steam pipe 572 by way of an actuator-operated nitrogen admission valve 579 and a check valve 580. During normal operation, the nitrogen admission valve 579 is closed and no nitrogen is admitted into the steam system. Valve 579 is opened during the process of draining and venting the steam generator 18 and transferring it to a dry status. The nitrogen valve 579 is opened as more or less the final step in this process. The nitrogen gas is admitted into the steam system for purposes of replacing steam which condenses in the system during the draining and venting process. Among other things, this minimizes subsequent rusting or scaling in the steam drum 70 and the evaporator and superheater tubes 261 and 260. As mentioned elsewhere herein, the gas turbine 12 can be operated for prolonged periods of time with the steam generator 18 in a dry conditions without causing serious damage to the boiler tubes 260–263 and other parts of the steam generator 18.

The feedwater reservoir section 70a of the steam drum 70 is provided with a high-indicating level switch 581, a low-indicating level switch 582 and a level transmitter 583. Switch 581 produces an electrical warning signal when the water level in the reservoir 70a gets too high, while switch 582 produces an electrical warning signal when the water level gets too low. Level transmitter 583 produces an electrical signal indicating the actual water level in the reservoir 70a. The water level signal from the transmitter 583 is supplied to a controller (not shown) which controls the feedwater control valve 542 to maintain a fairly constant water level in the feedwater reservoir 70a.

As the dry steam from the steam drum 70 flows through the superheater tubes 260, it is further heated to raise its temperature another 300° to 400° Fahrenheit. Under typical peak load conditions, the superheated steam flowing in the main steam outlet line 37 is at a temperature of 952° Fahrenheit and a pressure of approximately 1277 pounds per square inch (absolute). During normal operation of the plant 10, this superheated steam flows by way of main steam outlet line 37, isolation valve 38, steam pipe 34 and steam turbine valves 35a, 35b, 308a and 308b to the main steam inlet of the steam turbine 36 (FIG. 5B). Connected in series in the main steam outlet line 37 are a flow element 584 and a check valve 585. A flow transmitter 586 and a temperature element 587 (for temperature compensation of flow transmitter 586) are associated with the flow element 584, the flow transmitter 586 producing an electrical signal indicating the value of the output steam flow rate for the steam generator 18. During normal load operation, the main steam isolation valve 38 is, of course, fully open.

The final output steam temperature for the steam generator 18 is the temperature of the superheated steam flowing in the steam generator outlet line 37. This temperature is primarily determined by the temperature rise of the steam in the superheater tubes 260, this temperature rise being dependent on the temperature of the exhaust gas leaving gas turbine 12 and the amount of supplemental heat added to the turbine exhaust gas by the afterburner 16. The final steam temperature in outlet line 37 is also controlled in part by means of a superheater bypass valve 588 which is connected between the inlet and outlet of the superheater tube section 260. More specifically, the outlet side of bypass valve 588 is connected to the superheater outlet header 264 (FIG. 4) to which is connected the steam generator outlet line 37.

Superheater bypass valve 588 controls the output steam temperature by bypassing some of the lower temperature steam coming from the steam drum 70 around the superheater tubes 260 and then mixing this lower temperature bypassed steam with the higher temperature superheated steam emerging from the superheater tubes 260. Other things being constant, the greater the degree of opening of the bypass valve 588, the greater the amount of the lower temperature steam which is bypassed and, hence, the lower the temperature of the steam flowing to the steam turbine 36. The maximum amount of steam that can be bypassed by the bypass valve 588 is about 20% of the total steam flow from the steam drum 70.

The superheater bypass valve 588 is the final control element in a temperature control loop which is used to regulate the output steam temperature to hold it fairly constant at a predetermined setpoint value. In the present embodiment, this predetermined setpoint value is 952° Fahrenheit. Also included in this temperature control loop is a temperature element 589 which senses the temperature of the steam flowing in the outlet steam line 37 downstream of the bypass valve 588. Temperature element 589 cooperates with a temperature transmitter (not shown) to produce an electrical signal which is transmitted to a temperature controller (not shown) which controls the degree of opening of the superheater bypass valve 588. If the steam temperature in the outlet line 37 is greater than the 952° Fahrenheit setpoint value, then the temperature controller sends a signal to the bypass valve 588 to increase the degree of opening of such valve. This reduces the steam temperature in outlet line 37 to bring it back to the 952° value. Conversely, if the steam temperature in outlet line 37 is less than 952° Fahrenheit, the temperature controller decreases the degree of opening of the bypass valve 588. This causes more steam to pass through the superheater tubes 260 and thus increases the temperature of the steam in the outlet line 37.

This type of temperature control system has several advantages. It is superior to a system in which water is injected into the superheated steam to cool it because such a system could also send slugs of water into the steam turbine if its control valve failed. Since the present system injects dry steam, this is not a problem. The present system is also better than a system which controls steam temperature by varying the afterburner firing rate because it will respond more rapidly to load changes.

There is also connected to the main steam outlet line 37 a normally-closed manually-operated vent valve 590, a pressure safety valve 590a, a temperature element 591 and a pressure transmitter 592. During normal operation, the vent valve 590 and the previously considered drain valve 48 are closed. Temperature element 591 and pressure transmitter 592 generate electrical signals which indicate the temperature and pressure of the steam in the outlet line 37 and transmit such signals to the plant control center building 150.

In certain situations, the main steam isolation valve 38 is closed and the steam produced by the steam generator 18 is bypassed to the condenser 31 by way of an auxiliary steam bypass path which includes a check valve 593, a motor-operated block valve 594 and a steam line 595 which runs to and connects with the auxiliary steam bypass line 447 which communicates with the desuperheater 46 by way of pipes 449 and 404 (FIG. 5B). This particular arrangement wherein the main steam isolation valve 38 is closed and the auxiliary bypass block valve 594 is open is employed, for example, to drain the outlet steam line 37 of water when the No. 1 steam generator 18 is to be started up after the No. 2 steam generator 28 has already been put into operation and is busy supplying steam to the steam turbine 36.

The steam generator 18 further includes an automatic "blowdown" mechanism for minimizing the buildup of mineral deposits on the inner walls of the high pressure evaporator tubes 261. This blowdown mechanism includes a motor-controlled blowdown block valve 596 and a blowdown control valve 597 which are connected in series between the feedwater outlet pipe 555 of the steam drum 70 and an appropriate drain or sewer outlet 597a. During normal operation, the block valve 596 is full open.

The blowdown control valve 597 is controlled by a signal developed by a conductivity element 598 which continuously measures the conductivity of a sample portion of the steam drum feedwater, which sample portion flows by way of the block valve 596 and a cooler 599 to the drain outlet 597a. Conductivity element 598 is connected to the outlet side of the cooler 599, the function of the cooler 599 being to cool the feedwater sample to a temperature suitable for the conductivity element 598. The conductivity element 598 cooperates with a conductivity transmitter (not shown) to generate an electrical signal indicative of conductivity, which signal is transmitted to a conductivity controller (not shown) which controls the blowdown control valve 597.

The conductivity element 598 provides an electrical signal which indicates the electrical conductivity of the feedwater flowing in the steam drum outlet pipe 555. The "hardness" or mineral content of the feedwater in the steam drum outlet pipe 555 determines the conductivity of this feedwater. The greater the "hardness" or mineral content, the greater the conductivity.

The conductivity element 598 and its associated conductivity controller operate to adjust the degree of opening of the blowdown control valve 597 so as to keep the feedwater mineral content below a desired limit. If the feedwater mineral content increases above the desired limit, then the blowdown control valve 597 is opened to a greater degree to dump a greater amount of the steam drum feedwater into the drain outlet 597a. This tends to lower the water level in the system. This, in turn, signals the makeup water pump 441 and the makeup water valve 442 (FIG. 5B) to add fresh demineralized water to the system. This brings the mineral content of the water in the system back down to the desired level.

As seen from the foregoing description, the heat recovery steam generator 18 includes not only the stack structure 64 and the various boiler tubes 260–263 located therein, but also the deaerator 68, the low pressure storage tank 69, the steam drum 70 and the various other items 501–599 considered in connection therewith.

The normal operation of the heat recovery steam generator 18 will now be briefly summarized for the case where the combined cycle plant 10 is operating under typical peak load conditions. In this case, both of the gas turbines 12 and 22, both of the afterburners 16 and 26, both of the heat recovery steam generators 18 and 28 and the stem turbine 36 are in operation. The condensate pumps 30a and 30b pump condensate at a temperature of approximately 110° Fahrenheit from the condenser hotwell sections 335a and 335b via pipes 430, 431, 432 and 434 to the deaerator 68 wherein such condensate is deaerated and heated to a temperature of approximately 250° Fahrenheit by heat from the steam from the low pressure evaporator tubes 263, the extraction steam from the steam turbine 36 (via steam pipe 424) and the hot water being recirculated from the economizer tubes 262 by way of the recirculation control valve 546 and the pipe 547. This heated 250° water is supplied to the low pressure storage tank 69. At this point, the water is referred to as boiler feedwater.

The boiler feedwater in the storage tank 69 is pumped through the economizer tubes 262 by the main boiler feed pump 524. As this feedwater flows through the economizer tubes 262, heat from the turbine exhaust gas raises its temperature to within 5° Fahrenheit of the saturation temperature, that is, the temperature at which it will boil at the particular pressure at hand. Typically, the hot feedwater leaving the economizer tubes 262 will be at a temperature of approximately 570° Fahrenheit. This hot feedwater flows to the feedwater reservoir 70a of the steam drum 70, the water level in the reservoir 70a being controlled by the feedwater control valve 542.

The hot feedwater in the reservoir 70a is pumped through the high pressure evaporator tubes 261 by the high pressure circulation pump 554. As the feedwater flows through the high pressure evaporator tubes 261, more heat from the turbine exhaust gas converts it into steam having a temperature of approximately 575° Fahrenheit. This steam is supplied to the moisture separator 70b which serves to remove practically all of the remaining moisture from such steam.

The resulting dry steam leaving moisture separator 70b flows by way of steam pipe 572 to the superheater tubes 260. As this steam flows through the superheater tubes 260, heat from the turbine exhaust gas at the gas entry end of the stack structure 64 raises its temperature to a value of approximately 952° Fahrenheit. The resulting superheated steam leaving superheater tubes 260 flows by way of steam generator outlet line 37 and steam pipes 39 and 34 to the steam turbine 36, wherein it is used to drive the rotor blades of the steam turbine 36. At the same time, the second steam generator 28 (FIG. 5C) is similarly making superheated steam which is also flowing to the steam turbine 36 by way of steam pipes 42 and 34, this steam combining with the steam from the first steam generator 18 to produce the total driving force for the steam turbine 36.

As will be considered in greater detail hereinafter, when the combined cycle plant 10 is operating above a minimum load level with both steam generators 18 and 28 in operation, the steam turbine 36 is operated in a pure turbine following mode. In this mode, the steam turbine bypass valve 45 (FIG. 5B) is fully closed and the steam turbine governor or control valves 35a and 35b and throttle or stop valves 308a and 308b are all fully open. In this case, the power developed by the steam turbine 36 is determined entirely by the steam generated by the steam generators 18 and 28 which is, in turn, determined by the operating levels of the gas turbines 12 and 22 and the afterburners 16 and 26.

The hot gas produced by the gas turbine 12 and the afterburner 16 (FIG. 5D) flows vertically upward in the stack structure 64 (FIG. 5A). On the other hand, the fluid in the superheater tubes 260 and the economizer tubes 262 flows in a downward direction, counter to the direction of gas flow. This downflow or counterflow in the superheater and economizer sections 260 and 262 provides better heat transfer for the steam and water moving through these sections. In the evaporator sections, namely, the high pressure evaporator 261 and the low pressure evaporator 263, the water and steam flow is in the upward direction which is the same direction as that of the hot gas flow. This is of particular importance with respect to the high pressure evaporator 261. Since the process of evaporation is isothermal, the temperature advantage is the same for either an upflow or a downflow design. The upflow design used for the high pressure evaporator section 261 is, however, more advantageous in that it permits operation at part loads by means of natural circulation should there be a failure of the high pressure circulation pump 554.

Considering now the No. 2 heat recovery steam generator 28 (FIG. 5C), it is noted that this steam generator 28 includes, in addition to the elements previously considered, various elements bearing reference numerals 601 through 699, inclusive. These elements 601–699 are the same as elements 501–599, respectively, previously considered for the first steam generator 18 (FIG. 5A). These elements 601–699 serve the same purposes and function in the same manner as do the corresponding ones of counterpart elements 501–599 in the first steam generator 18. Thus, the second steam generator 28 is of the same construction as and operates in the same manner as does the first steam generator 18. For this reason, a detailed description of the second steam generator 28 will not be given herein.

As shown in FIGS. 5D–5F, the combined cycle plant 10 further includes means for supplying fuel to the two gas turbines 12 and 22 and to the two afterburners 16 and 26. In the present embodiment, this fuel may be either natural gas or distillate type No. 2 grade fuel oil. Natural gas is obtained from a gas supply 700 (FIG. 5E) which may be, for example, a gas distribution line tied to a natural gas utility system. This gas is supplied to the combined cycle plant 10 by way of a gas pressure regulator 701. The fuel oil, on the other hand, is obtained from a fuel oil storage tank 702 located off of but immediately adjacent to the plant site 155. This fuel oil is pumped to the plant site 155 proper by means of a fuel forwarding pump 703. Appropriate control mechanisms are provided so that the plant operator may readily select the particular fuel to be used.

Associated with the first gas turbine 12 is a fuel system 705 (FIG. 5D) for supplying the gas and oil fuels thereto. The gas turbine fuel system 705 includes an oil delivery system 706 which is connected between the outlet of the fuel forwarding pump 703 and the combustion section 161 of the gas turbine 12. As previously indicated, the combustion section 161 includes an array of 16 combustion chambers of combustors 167a–167p. For simplicity of illustration, only the combustor 167a is shown in FIG. 5D. Starting with the fuel forwarding pump 703, the oil fuel system 706 includes, in the order named, a low pressure filter 707, a main fuel pump 708, an overspeed trip valve 709, an oil throttle valve 14a, a high pressure filter 710, an isolation valve 711 and a fuel distributor or flow divider 712. Connected to the 16 outlets of the flow divider 712 are 16 outlet lines 713a–713p which run to the different individual combustors 167a–167p, respectively. During normal operation on oil fuel, the overspeed trip valve 709 and the isolation valve 711 are full open.

Flow divider 712 includes a rotary mechanism which serves to divide and distribute the oil fuel in an equal manner to the 16 outlet lines 713a–713p. During normal operation, the flow divider 712 operates under its own power, so to speak, the flow of the high pressure oil through the flow divider 712 serving to cause the rotation of the rotary distributor mechanism therein. An electric starting motor 714 is coupled to the rotary shaft of the flow divider 712 for purposes of insuring a proper initial startup of the flow divider 712. Once the oil flow exceeds a predetermined relatively low value such as, for example, 4%, the starting motor 714 is turned off and the flow divider 712 operates on its own.

Also coupled to the rotary shaft of the flow divider 712 is a speed pick-up device or speed transducer 715 which produces an electrical signal indicative of the rotary speed of the flow divider 712. Since this rotary speed is proportional to the fuel flow rate through the divider 712, the signal generated by the transducer 715 is also indicative of the fuel flow rate. For this reason, the transducer 715 will hereinafter be referred to as a flow transmitter and will be thought of as providing a signal indicative of the fuel flow rate.

The inlet side of a pressure regulating valve 716 is connected to the oil line intermediate the main fuel pump 708 and the overspeed trip valve 709, the outlet side of this valve 716 being connected by way of oil return lines 717 and 718 to an oil return inlet on the fuel oil tank 702. A pressure controller 720 measures the oil pressure on the output side of the main fuel pump 708 and adjust the pressure regulating valve 716 in accordance therewith so as to hold the oil pressure at this point in the system substantially constant.

A pressure switch 721 monitors the oil pressure on the output side of the low pressure filter 707, while a differential pressure switch 722 monitors the pressure difference across the low pressure filter 707. Pressure switch 722 produces an electrical warning signal when the pressure difference becomes too high. A pressure transmitter 723 produces a signal indicative of the oil pressure on the output side of the main fuel pump 708. A further pressure transmitter 724 generates a signal indicative of the oil pressure of the oil being supplied to the flow divider 712.

The gas turbine fuel system 705 further includes a gas delivery system 730 for supplying natural gas from the gas supply 700 to the turbine combustors 167a–167p. Starting with the pressure regulator 701 (FIG. 5E), this gas system 730 includes, in the order named, a strainer 731, an overspeed trip valve 732, a gas throttle valve 14b, an isolation valve 733 and a gas manifold 734. The 16 outlets of the gas manifold 734 are connected by way of fuel outlet lines 735a–735p to different individual ones of the 16 combustors 167a–167p, respectively. During normal operation on natural gas, the overspeed trip valve 732 and the isolation valve 733 are fully open, the flow of the gas fuel being controlled by the degree of opening of the throttle valve 14b.

Electrical type pressure switches 736, 737 and 738 are connected to the gas delivery line intermediate the strainer 731 and the overspeed trip valve 732 and are used to monitor the gas pressure at this point in the system. Pressure switch 736 is closed if the gas pressure is above a predetermined value, while pressure switches 737 and 738 are open if the pressure is above a predetermined value. A vent valve 739 is connected to the gas delivery line on the outlet side of the overspeed trip valve 732. This valve 739 is closed during normal operation but can be opened to vent the system when the overspeed trip valve 732 is closed.

A further fuel system 740 is provided for the afterburner 16. This fuel system 740 includes an oil delivery system 741 for supplying fuel oil from the tank 702 to the burner elements in the afterburner 16. Starting with the fuel forwarding pump 703 (FIG. 5E), this afterburner oil system 741 includes, in the order named, the low pressure filter 707, a fuel delivery line 742, a main afterburner fuel pump 743, an overspeed trip valve 744, an oil throttle valve 19a and an isolation valve 745. A pressure regulating valve 746 is connected to the oil delivery line on the outlet side of the main fuel pump 743 to maintain a constant oil pressure at this point in the system. The outlet side of the pressure regulating valve 746 is connected by way of an oil return line 747 and the oil return line 718 to the return inlet on the fuel oil tank 702. Pressure regulating valve 746 is controlled by a pressure controller 748 which responds to the oil pressure in the oil delivery line coming from pump 743.

During normal operation on oil, the overspeed trip valve 744 and the isolation valve 745 are full open, the flow of oil to the afterburner 16 being controlled by the throttle valve 19a. A pressure transmitter 749 generates a signal indicative of the oil pressure in the delivery line from pump 743, while a further pressure transmitter 750 generates a signal indicative of the oil pressure at the inlet to the afterburner 16.

The afterburner fuel system 740 further includes a gas delivery system 751 for delivering natural gas from the gas supply 700 to the burner elements in the afterburner 16. Starting with the pressure regulator 701 (FIG. 5E), this after burner gas system 751 includes, in the order named, the strainer 731, the overspeed trip valve 732, a pressure regulator 752, a gas throttle valve 19b and an isolation valve 753. It is noted that the gas overspeed trip valve 732 is common to both the turbine gas system 730 and the afterburner gas system 751. A vent valve 754 is connected on the outlet side of the isolation valve 753 for venting the latter portion of the system when the isolation valve 753 is closed. A pressure transmitter 755 senses the gas pressure at the inlet of the afterburner 16 and produces a signal indicative of the value thereof.

There is associated with the second gas turbine 22 a fuel system 805 (FIG. 5F) which is identical in construction to the fuel system 705 for the first gas turbine 12. This No. 2 gas turbine fuel system 805 includes items 806–839 which are identical in construction and purpose to the corresponding respective ones of items 706–739 in the No. 1 gas turbine fuel system 705. In a similar manner, there is associated with the second afterburner 26 a fuel system 840 (FIG. 5F) which is identical in construction to the fuel system 740 for the first afterburner 16. This No. 2 afterburner fuel system 840 includes items 841–855 which are identical in construction and purpose to the corresponding respective ones of items 741–755 in the No. 1 afterburner fuel system 740. The No. 2 gas turbine fuel system 805 and the No. 2 afterburner fuel system 840 are connected to the gas supply 700 and the fuel oil storage tank 702 in the same manner as the No. 1 gas turbine and afterburner fuel systems 705 and 740.

The second gas turbine and afterburner fuel systems 805 and 840 are operated independently of the first gas turbine and afterburner fuel systems 705 and 740. Thus, among other things, the second gas turbine 22 and the second afterburner 26 can be in operation while the first gas turbine 12 and the first afterburner 16 are out of service, or vice versa.

As shown in FIG. 5E, the combined cycle plant 10 further includes a pair of chemical treatment systems 901 and 902 for injecting various chemicals into the condensate/feedwater/steam systems associated with the first and second heat recovery steam generators 18 and 28 for minimizing corrosion and the buildup of mineral deposits in the boiler tubes, steam drums, storage tanks and the like. The first chemical treatment system 901 is primarily associated with the first steam generator 18 and the second chemica treatment system 902 is primarily associated with the second steam generator 28 though, as will be seen, there is some degree of overlap. The particular chemicals which are injected in the present embodiment are amine (or ammonia), hydrazine and phosphates. As used in FIG. 5E, the letter "A" denotes amine (or ammonia), the letter "H" denotes hydrazine and the letter "P" denotes phosphates.

The first chemical treatment system 901 takes a first fluid sample from a first sample outlet S1 (FIG. 5A) which is located on the feedwater pipe 525 coming from the low pressure storage tank 69, analyzes it and then automatically injects the proper amount of amine (A1) and hydrazine (H1) into the system via the chemical injection inlet CH1 (FIG. 5A) which is also located on the feedwater pipe 525, but upstream of the sample outlet S1. The first chemical treatment system 901 also takes a second fluid sample from the system by way of sample outlet S2 (FIG. 5B) which is connected to the condensate pipe 434 running to the deaerator 68, analyzes it and then automatically injects the appropriate amounts of amine (A2) and hydrazine (H2) into the system via the chemical injection inlet CH2 (FIG. 5B) which is connected to the condensate pipe 432 located immediately upstream of the condensate pipe 434. Phosphate (P1) is injected into the system by way of a phosphate injection inlet P1 (FIG. 5A) which is located on the feedwater pipe 544 at the inlet to the feedwater reservoir 70a of the steam drum 70. The phosphate injection control is manually in nature. The injection rate is adjusted at periodic intervals by the plant operator after studying the results of the chemical analyses which are automatically performed and recorded by equipment included in the chemical treatment system 901.

The second chemical treatment system 902 (FIG. 5E) is of the same construction as the first chemical treatment system 901. Sample outlet S3 (FIG. 5B) is located on the condensate pipe 435 running to the deaerator 90, while sample outlet S4 (FIG. 5C) is located on the feedwater pipe 625 coming from the storage tank 91. The chemical injection inlet CH3 is located on the condensate pipe 432 (FIG. 5B), while the chemical injection inlet CH4 is located on the feedwater pipe 625 (FIG. 5C). The phosphate injection inlet P2 is located on the feedwater pipe 644 at the inlet of the feedwater reservoir 92a (FIG. 5C).

D. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 6:
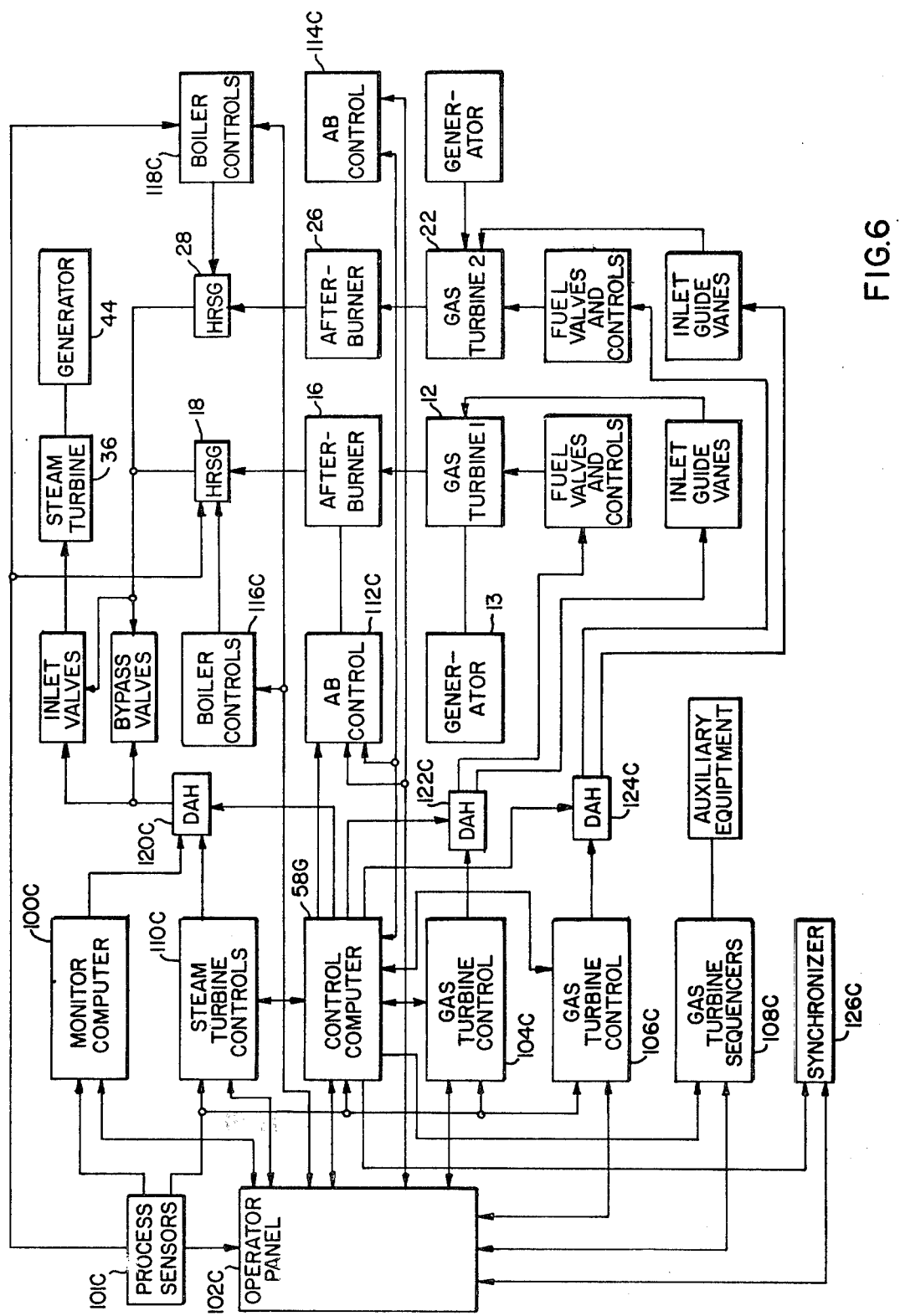
FIG. 6 shows a schematic view of a control system arranged to operate the combined cycle electric power plant of FIG. 1 in accordance with the principles of this invention.

As shown in FIG. 6, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbine have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

E. Hotwell and Deaerated Level Control

Figure 7A:
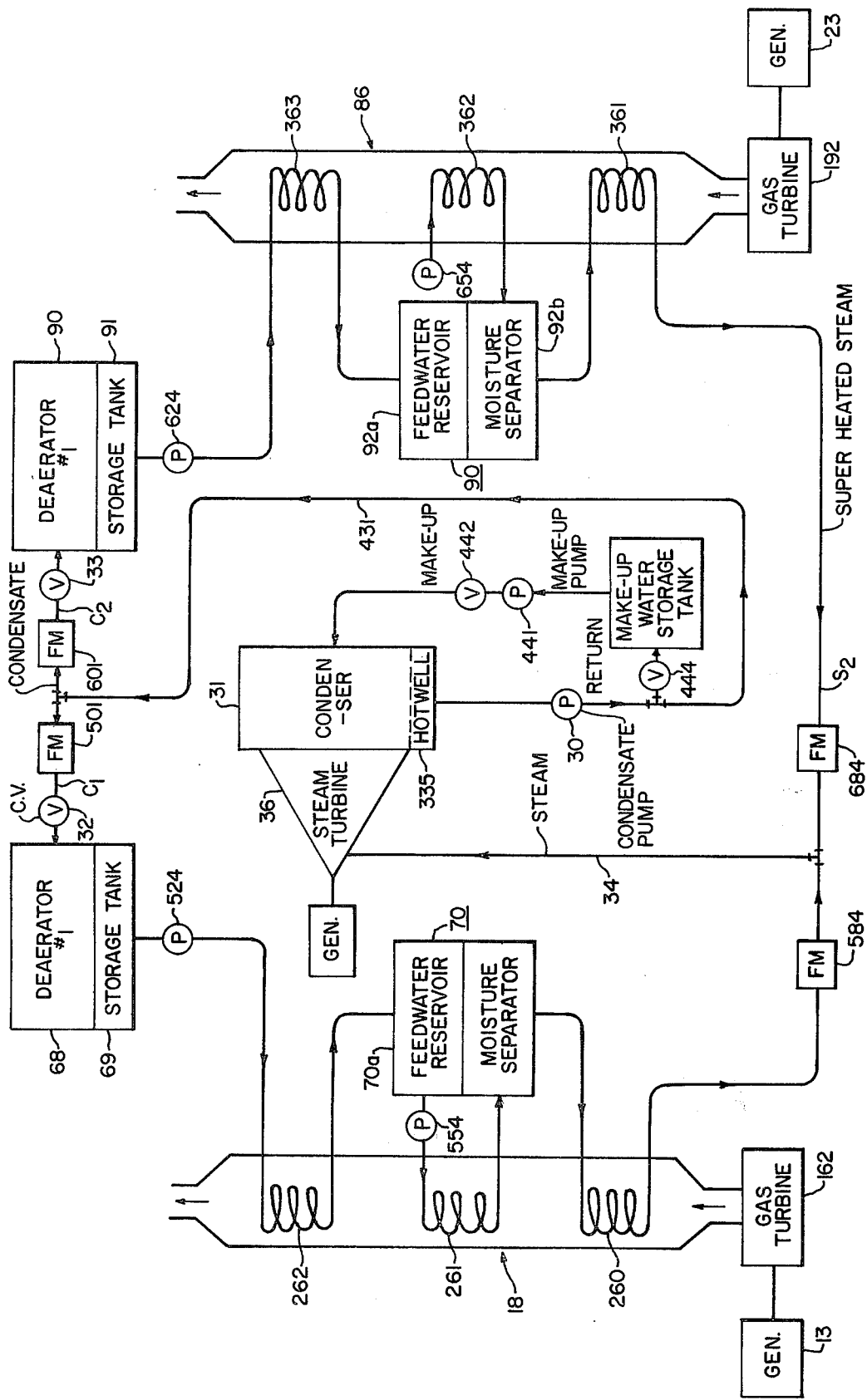
FIGS. 7A and 7B are simplified, schematic diagrams of selected parts of the combined cycle electric power system as it relates to this invention, and the control circuitry implementing the fluid level control of this invention, respectively.

As generally illustrated in FIG. 7A, this invention is used in a "combined cycle" electric power plant including a first gas turbine 162 which drives a generator 13. Exhaust gases from the gas turbine 162 are used to heat the fluid, e.g. water, in first heat recovery steam generator (or boiler) 18. A second gas turbine 192 drives a second generator 23. Similarly, the heated exhaust gases derived from the turbine 192 pass through and heat the fluid directed through a second heat recovery steam generator 86. The steam generators 18 and 86 serve to heat the water from a temperature in the order of 100°F into superheated steam at a temperature in the order of 952°F. The superheated steam is supplied from both the first and second heat recovery steam generators 18 and 86 to a single steam turbine 36 by way of a common steam conduit 34. The superheated steam serves to rotate the steam turbine 36 which in turn drives an associated generator 44.

Condensate steam circuits are formed through the steam turbine and each of the steam generators 18 and 86. In particular, the steam leaving the exhaust end of the steam turbine 36 is converted into condensate water by a condenser 31. As the water condenses, it is collected in a hotwell 335 located at the bottom of the condenser 31. The collected condensate is pumped from the hotwell 335 by a condensate pump 30, passing by way of a conduit 431 to a first deaerator 68 associated with the steam generator 18 and to a second deaerator 90 associated with the second steam generator 86. In particular, the condensate wate passes through a flow meter 501 which provides an electrical output indicative of the flow therethrough to be used by the deaerator and hotwell level control in a manner to be explained. The flow of condensate water to the deaerator 68 is controlled by a variable condensate valve 32. Similarly, condensate water is passed through a flowmeter 601 to provide a similar output signal and a condensate valve 33 for variably controlling condensate flow to the second deaerator 90.

The deaerator 68 also includes as indicated in FIG. 7A, a storage tank 69 for storing the condensate water before being pumped by the feedwater pump 524 to the steam generator 18. The fluid passes successively through a low pressure tube 262 into a main drum 70 comprised of a moisture separator 70b and a feedwater reservoir 70a and therefrom through a high pressure tube 261 before being circulated to a superheater tube 260. In the superheater tube 260, the fluid is heated into superheated steam to be passed through a flowmeter 584 before being returned by conduit 34 to the steam turbine 36. The flowmeter 584 provides an electrical output indicative of the superheated steam flow therethrough. In a similar manner, the condensate water is introduced into the deaerator 90 which includes storage tank 91, from which the condensate water is pumped by a feedwater pump 624 to the second steam generator 86. The condensate water is successively passed through the low pressure tube 363, the main drum 92, the high pressure tube and the superheater tube 361 before being returned as superheated steam through a flowmeter 684 to the steam turbine 36.

As the fluid is circulated through the steam generators 18 and 86, a certain portion of the water is bound to escape from the system as through leaks and in particular through a pair of vents 514 and 516 (associated with deaerator 68) and vents 616 and 614 (associated with deaerator 90). In order to resupply water from an outside source e.g. a river or lake, a makeup water system is used to selectively introduce water into the system and further to control the fluid levels in the deaerators 68 and 90 and the hotwell 335. The makeup system includes an electrically controllable "return" valve 444, a storage tank 440, a makeup water pump 441 and the electrically controllable "makeup" valve 442. The valves 444 and 442 are biased to be normally closed so that the condensate pump 30 typically directs the water condensate along conduit 431 avoiding the makeup water system. However, if there is too much fluid in the steam condensate systems, then the return valve 444 is selectively opened to introduce some of the fluid into the makeup water storage tank 440. Conversely, if there is not enough fluid in the stream condensate system, then the makeup valve 442 is open to inject additional fluid into the condenser 31, to be circulated through the closed loop systems as described above.

Figure 7B:
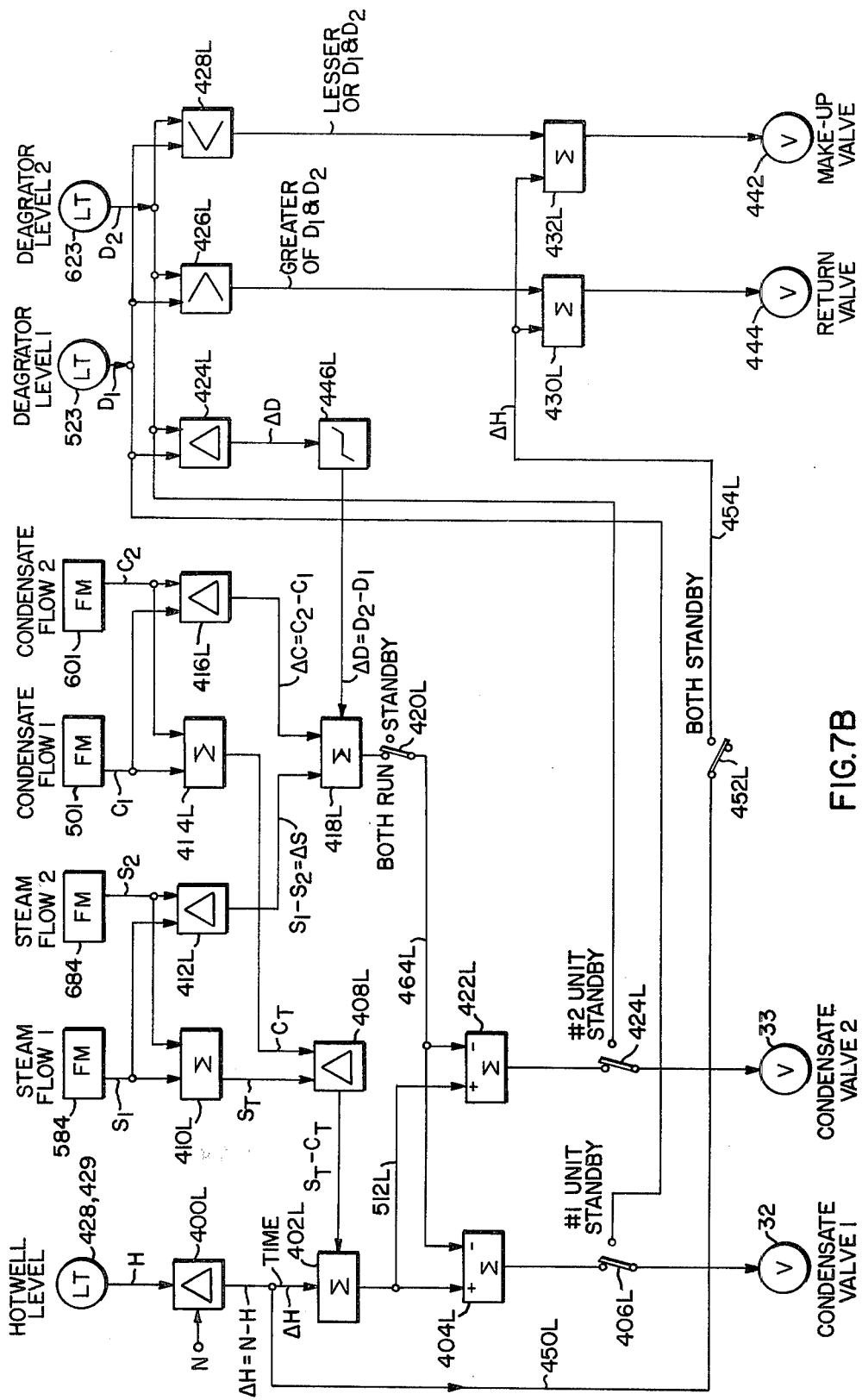

Referring now to FIG. 7A, the outputs of the flowmeters 501, 601, 584 and 684, of the indicator 428 (or 429) associated with the hotwell 335 and of the level transmitters 523 and 623 associated respectively with the storage tanks 69 and 91 (see FIGS. 5A and 5C) are used to control the fluid level within the deaerators 68 and 90 and the hotwell 335. The condensate level in the hotwell 335 is measured by the level transducer 428 to provide a corresponding signal. The condensate levels in the storage tanks 69 and 91 are measured respectively by the level transducers 523 and 623. The electrical circuit as shown in FIG. 7B responds to the aforementioned inputs to control the fluid level within the storage tanks 69 and 91 by first ensuring that the total condensate flow to storage tanks 69 and 91 is equal to the total steam flow to the steam turbine 36, by regulating the condensate valves 32 and 33. To this end, the outputs $S_1$ and $S_2$ are applied to a summing circuit 400L produce a total steam flow signal $S_T$ to be applied to a first input of a subtraction circuit 408L. In a similar manner, the output of the flowmeters 501 and 601 indicative of the condensate flows C1 and C2 respectively are applied to a summing circuit 414L to provide output signal $C_T$ representing the total condensate flow. The subtraction circuit 408L provides a different signal $S_T$-$C_T$ indicative of any difference between the condensate and steam flow, is applied by way of the summing circuit 402L, the summing circuit 404L and closed switch 406L to drive the first condensate valve 32. Similarly, the difference signal is applied by way of the summing circuit 402L and the summing circuit 422L and closed switch 424L to drive the condensate valve 33.

Thus, if the total steam flow $S_T$ is equal to the total condensate flow $C_T$, then the difference signal output derived from the subtraction circuit 408L goes to zero and no adjustment is made by the condensate valves 32 and 33. However, if the total condensate flow $C_T$ is less than the total steam flow $S_T$, a positive difference signal is generated and supplied to the condensate valves 32 and 33 to open these valves and to correspondingly increase the condensate flow to the deaerators 68 and 90. This increase in the position of the condensate valves 32 and 33 and therefore in the condensate flows to the deaerators 68 and 90 continues until the total condensate flow $C_T$ becomes equal to the total steam flow $S_T$, at which time the difference signal goes to zero and the valve adjustment is discontinued. On the other hand, if the total condensate flow $C_T$ is larger than the total steam flow $S_T$, a negative difference signal is generated by the subtraction circuit 408L and is applied to close the condensate valves 32 and 33 to reduce the condensate flow, until the condensate flow is made equal to the steam flow $S_T$.

The control circuit of FIG. 7B provides a second control action which serves to control the condensate level within the hotwell 335 of the condenser 31. In particular, the output of the level transducer 428 (or 429) is supplied to a subtraction circuit 400L to be compared with a "normal level" bias signal "N" to produce a corresponding difference signal to be applied to the summing circuit 402L. The difference signal is used to trim the $S_T$-$C_T$ difference signal to compensate for variations of the hotwell level from the normal value as indicated by the bias signal N. In operation, if the difference signal $S_T$-$C_T$ is zero, the difference signal derived from the subtraction circuit 400L is zero and no action is taken. However if the howell level departs from the normal level as indicated by the bias signal N, then the difference signal will assume a positive or negative value to increase or decrease the opening of the condensate valves 32 and 33, to bring the level of condensate within the hotwell 335 back to its normal level. With regard to FIG. 7A, if the level in the hotwell 335 is too high, a positive signal is derived from the subtraction circuit 400L to be applied by way of the summing circuits 402L and either of the summing circuits 404L or 422L to increase the openings of the condensate valves 32 and 33 to permit more condensate to be pumped to the deaerators 68 and 90, thus reducing the level of the condensate within the hotwell 335. A converse action is taken if the measured level is too low; in particular, the subtraction circuit 400L provides a negative signal, whereby the openings of the condensate valves 32 and 33 are closed thus reducing the flow of water from the hotwell 335 and increasing its level.

The electrical circuit of FIG. 7B effects the further control action in that the steam flow signals S1 and S2 as derived from the flowmeters 584 and 684 are compared to determine whether there is an unbalanced steam flow from the steam generators 18 and 86 to cause an opposite unbalance in the condensate flow to the corresponding deaerators 68 and 90. In particular, the steam flow signals S1 and S2 are applied to a subtraction circuit 412L to provide a difference signal output $S_1$-$S_2$ indicative of the aforedescribed imbalance. Such imbalance may occur if the first steam generator 18 is producing more steam than the second steam generator 86; under such conditions it would be desirable to supply an increased flow of condensate water C1 to the steam generator 18 and supply a corresponding less flow of condensate water to the steam generator 86. This is accomplished by applying the difference signal output of the subtraction circuit 412L by way of the summing circuit 418L and the corresponding one of the summing circuits 404L and 422L to provide driving signals to the condensate valves 32 and 33. As seen in FIG. 7B, the difference signal has opposite effects upon the summing circuits 404L and 422L, such that the difference signal of a given polarity produced output signals of opposite polarities at the outputs of the summing circuits 404L and 422L. Thus, the outputs of the summing circuits 404L and 422L produce opposite effects upon their condensate valves 32 and 33. For example, if the difference signal is positive, the output of the summing circuit 404L is likewise positive and is operated to supply more condensate to the first deaerator 68, while the output of the summing circuit 422L is negative serving to decrease the position of the condensate valve 33 and therefore the condensate supply to the second deaerator 86. The connections to the summing circuits 404L and 422L are made such that the steam generator producing the lesser amount of steam receives the lesser amount of condensates. The two condensate flow signals $C_1$ and $C_2$ as derived from the flowmeters 501 and 601 are supplied to a subtraction circuit 416L to form a condensate difference signal, $C_2$–$C_1$ which represents the unbalance in the condensate flows. Thus, when an imbalance in steam flow is detected and a corresponding adjust in the condensate valves 32 and 33 is made, a subsequent opposite imbalance in condensate flow is effected to supply more condensate flow to that steam generator generating more steam. As a corresponding imbalance in the condensate flow is effected, the $C_2$–$C_1$ condensate imbalance signal is generated by the subtraction circuit 416L and applied to the summing circuit 418L to effect a reduction of its output. In particular, the polarity of the steam flow difference signal is opposite to that of the condensate flow difference signal. As a result, the condensate valves 32 and 33 are adjusted until the two unbalanced signals $\Delta S$ and $\Delta C$ become equal, whereupon the condensate valve adjustment is discontinued since the resulting difference signal as derived from the summing circuit 418L goes to zero.

The control circuitry of FIG. 7B also functions to control the fluid level in the deaerators 68 and 90 by selectively actuating the makeup water system. In particular if the fluid level in either storage tank 69 or 91 becomes too high, the makeup water system is actuated to remove water from the condensate steam closed loops. On the other hand, if the water level within either of the storage tanks 69 or 91 is too low, the makeup water system is operated to inject water into the closed condenste steam loops. In particular, the deaerator level signals D1 and D2 as derived respectively from the level transducers 523 and 623 are applied to a high select circuit 426L, which produces an output signal corresponding to the greater of the two input signals D1 and D2. In turn, the greater signal is applied to drive the return valve 444. If the water level of either of the storage tanks 69 or 91 and the corresponding deaerator level signals D1 and D2 exceeds a predetermined level, the return valve 444 is driven open to extract water from the closed loops thereby reducing the water level in the storage tanks 69 and 91. This action continues until the level storage tank returns to normal at which time, the return valve 444 is again closed. The deaerator level signals D1 and D2 are also applied to a "low select circuit" 428L, which produces an output corresponding to the lesser of the two D1 and D2 input signals. The lesser signal is supplied by way of the summing circuit 432L to drive the makeup valve 442 open, if the lesser signal and therefore the water level is less than a predetermined value. As the makeup valve 442 is driven open, water is extracted from the makeup water storage tank 440 and is circulated by pump 441 into the condenser 31 to be circulated through the condensate steam closed loops, thus tending to raise the level of the fluid within the storage tanks 69 and 91.

A further control action is provided if an unbalance or unequal condensate levels is detected within the storage tanks 69 and 91, whereby a corresponding imbalance in the condensate level signals D1 and D2 is detected by the subtraction circuit 424L to which the signals D1 and D2 are applied. If such imbalance exists, the subtraction circuit 424L produces a difference signal to be applied by way of a deadband circuit 446L to the summing circuit 418L. The output of the deadband circuit 446L is supplied by way of the summing circuit 418L, and one of the summing circuits 404L and 422L to drive the condensate valves 32 and 33 in opposite directions dependent upon the polarity of the difference signal. For example, if the level of the first storage tank 69 is less than that of the second storage tank 90, then the polarity of the difference signal derived from the subtraction circuit 424L is such as to open the first condensate valve 32 more than the second condensate valve 33 so as to bring the level of the first storage tank 69 up to equality with that of the second storage tank 91. This action whereby one condensate valve is open and the other closed, continues until the fluid levels within the storage tanks become equal, at which time the difference signal derived from the subtraction circuit 424L goes to zero and the condensate valve adjustment on account of unbalanced levels is discontinued.

Further modes of operation of the combined cycle electric power plant are available whereby in contrast to the above described operation of the level control system in which both gas turbines as well as the steam turbine is in operation, one of the gas turbines may be operated under normal load conditions while the other load gas turbine is in a standby or idling condition. In such case, the steam and condensate flows for the steam generator associated with the gas turbine on standby, are set relatively low whereby minimal condensate and steam flows are maintained. For example, if the number 1 gas turbine 162 and its associated steam generator 18 are placed in a STANDBY mode of operation, the condensate valve 32 is set to a predetermined minimal position to provide a corresponding condensate flow, and the switch 406L associated with the condensate valve 32 and the switch 60 are opened to their standby position as indicated in FIG. 7B. As a result, the output of the summing circuit 418L tending to drive the condensate valve to an imbalance position is removed and the driving signal for the condensate valve 32 is derived directly from the level transducer 523. Though not shown in FIG. 7B, the output D1 of the level transducer 523 is compared with a minimal standby value to regulate the position of the condensate valve 32 to provide a corresponding condensate flow. The other condensate valve 33 is regulated in response to the imbalance of steam flow signals S1 and S2 and the ΔH difference signal as derived respectively from the subtraction circuits 408L and 400L and as supplied by way of the summing circuits 402L and 422L. However, the balancing action provided by the output of summing circuit 418L is discontinued by opening the switch 420L. On the other hand, the second gas turbine 192 and its steam generator 86 may be placed in a standby condition, whereby the gas turbine 162 and its steam generator 18 may be operated normally; in such a case, the switch 424L is disposed to its standby position, whereby the condensate valve 33 is regulated with respect to a minimal standby value or setpoint.

The combined cycle electric power plant as generally shown in FIG. 7A is capable of being operated in a "STANDBY" mode wherein both gas turbines 162 and 192 are disposed at standby. In this mode, the first and second steam generators 18 and 86 generate a minimum flow of steam and as consequence, the steam turbine 16 is also at standby. With reference to FIG. 7B, all four switches 406L, 424L, 420L and 452L are disposed to their standby positions. As a result, the outputs of the level transducers 523 and 623 indicative of the fluid level within the storage tanks 69 and 91, respectively, are applied to their corresponding condensate valves 32 and 33 for proportionally controlling their openings. The closing of the switch 452L applies the difference signal ΔH as derived from the subtraction circuit 400L by way of the summing circuits 430L and 432L to control the return valve 444 and the makeup valve 442, whereby the fluid level in the hotwell 335 is regulated by a proportional control action to either open the makeup valve 442 or the return valve 444. The opening of the switch 420L disconnects the output of the summing circuit 418L from control of the condensate valves 32 and 33.

Figure 13A:
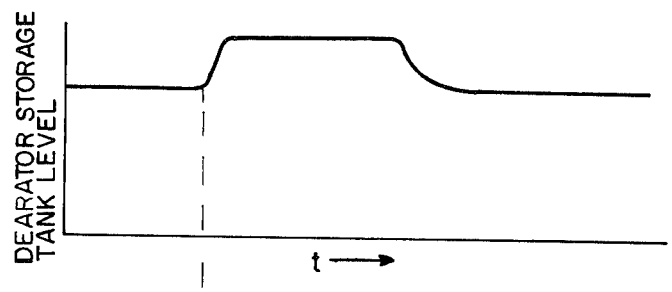
FIGS. 13A to 13F show the effects of increasing and decreasing the steam flow from the steam generators of this invention upon the deaerator storage flow, main drum flow and the fluid level within the deaerator storage tank.
Figure 13B:
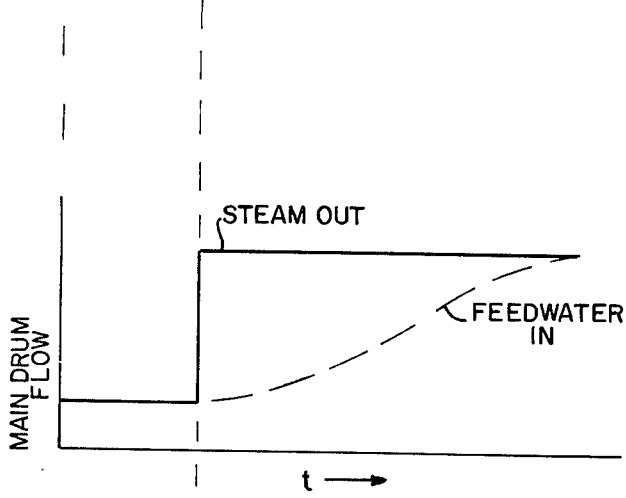
Figure 13C:
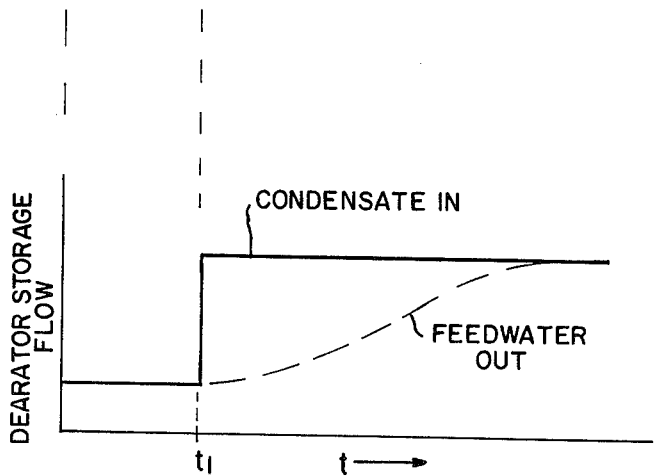
Figure 13D:
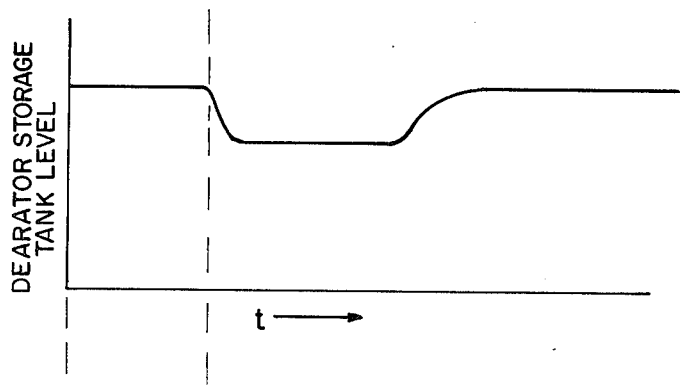
Figure 13E:
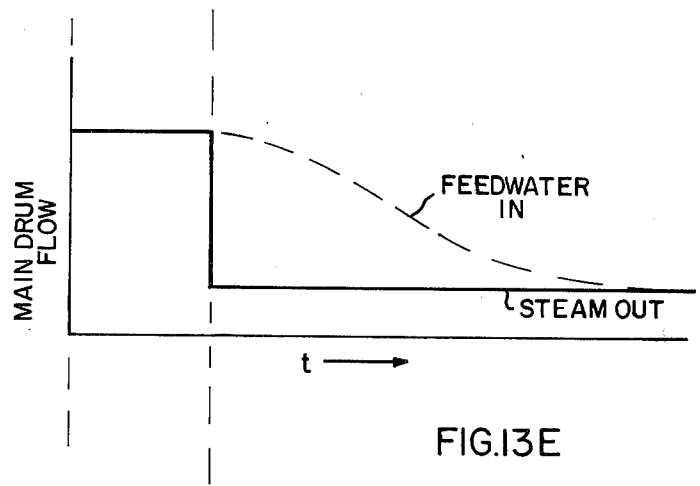

The water level control system, as shown in FIGS. 7A and 7B, controls the fluid level in the storage tanks of the combined cycle electric power plant by use of a three element mechanism, measuring the condensate water flow in, the water level within the storage tanks and the flow of the superheated steam to the steam turbine. By contrast to the prior art, wherein the water level within the storage tank is controlled by a measurement of feedwater flow to the main drum, a difference is introduced between the flow into and from the storage tanks i.e. the condensate flow thereto is made directly dependent upon the flow of superheated steam as opposed to the feedwater. This is especially significant if the flow of steam is suddenly increased as indicated in FIG. 13E, whereby a corresponding drop in condensate flow into the storage tank is effected. In this manner, the potentially undesirable effect of introducing a large quantity of relatively cold condensate water into the storage tank i.e., a drastic pressure drop, is avoided. In particular, if the condensate flow was fed into the storage tank at a rate corresponding to the feedwater out, the fluid level within the storage tank would be maintained, but the pressure therein would rapidly drop with potentially damaging effects upon the associated feedwater pump.

E-1. Control Functions Of The Hotwell And Deaerator Fluid Level Control

Figure 8A:
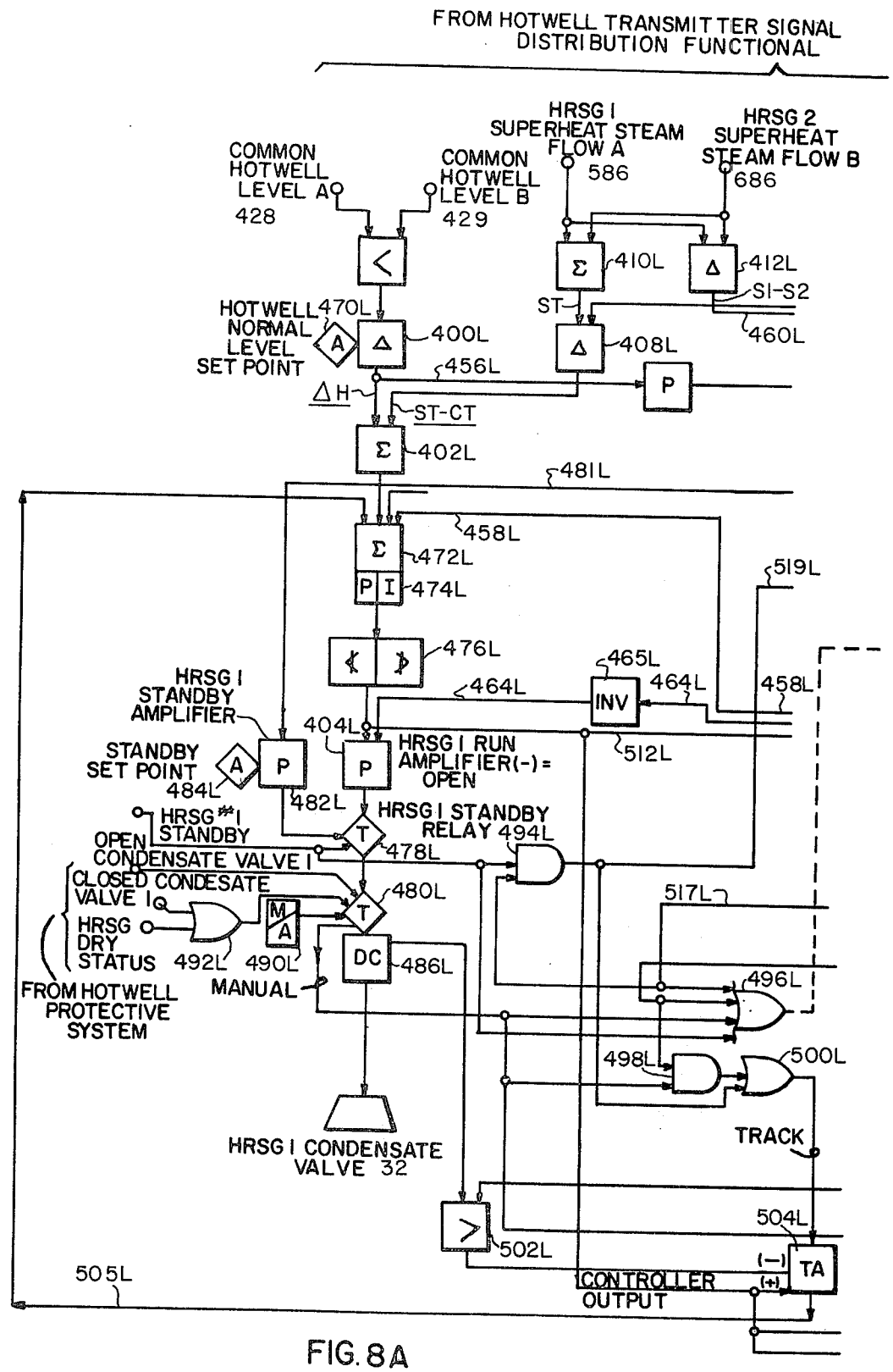
FIGS. 8A, 8B and 8C show functional diagrams of the fluid level control as generally shown in FIGS. 7B.
Figure 8B:
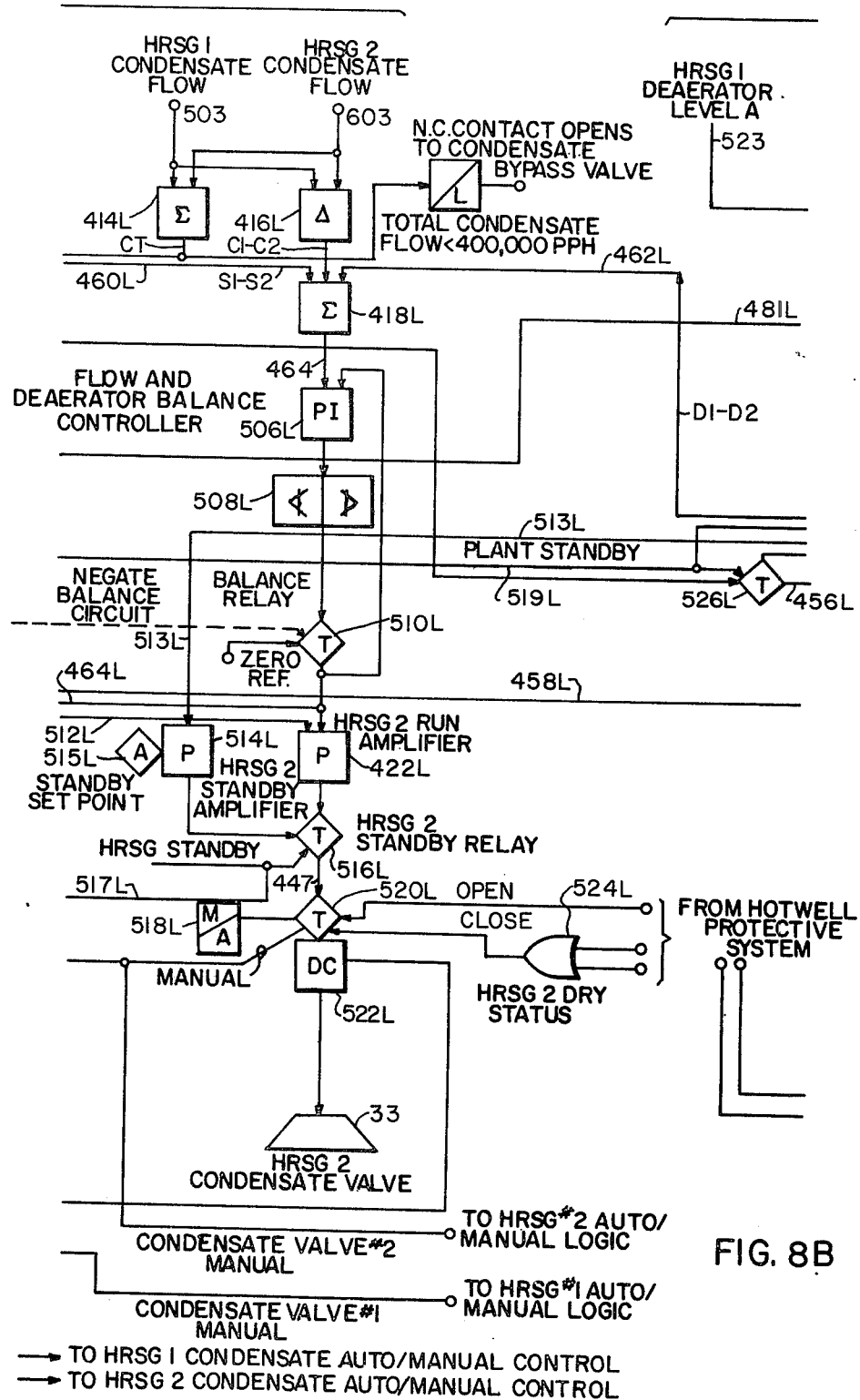

There is shown in more functional detail in FIGS. 8A, B and C the deaerator and hotwell fluid level control more generally shown in FIG. 7B. With reference to FIG. 8A, hotwell level signals as derived from the level transducers 428 and 429 associated with sections 335a and 335b are applied to a low select circuit 471L. The low select circuit 471L selects and applies the lower of the two input signals to a subtraction circuit 400L which takes the difference of the selected input and a setpoint indicative of the normal level within the hotwell as entered through setpoint block 470L. The difference output signal is in turn applied to one input of the summing circuit 402L, and by connector 456L to a transfer function block 526L as shown in FIG. 8B. The other input to the summing circuit 402L is supplied from the subtraction circuit 408L and its summed output is applied to the summing circuit 472L. In turn, the summed output of the circuit 472L is applied by way of a proportional plus integral circuit 474L, a high low limiting circuit 476L, a run amplifier 404L, and transfer function blocks 478L and 480L to a driver circuit 486L, whose output drives the condensate valve 32 to the controlled position. Signals indicative of the flows of superheated steam to the gas turbine 36 from the first and second steam generators as measured by the flow transmitters 586 and 686 are applied, as shown in FIG. 8A to each of the summing circuit 410L nd the subtraction circuit 412L. The summed output of the summing circuit 410L is applied to one input of the subtraction circuit 408L, the other input thereto derived from the summing circuit 414L. As shown in FIG. 8B, output signals indicative of the condensate flows to the deaerators 69 and 90 are derived from flow transmitters 503 and 603 to be applied to the inputs of the summing circuit 414L and to the inputs of the subtraction circuit 416L. Thus, the inputs applied to the subtraction circuit 406L are indicative of the total steam flow $S_T$ and the total condensate flow $C_T$, and the difference output $S_T-C_T$ therefrom is applied to the summing circuit 402L. Thus, as explained above, the condensate valve 32, in the run or normal mode, is set in response to the difference signal $S_T-C_T$ indicative of any difference between the total steam and condensate flows. The difference signal $S_T-C_T$ is trimmed by the $\Delta H$ signal indicative of any variation in the water level within the hotwell from a normal value. The difference signal $S_T-C_T$ is summed with the $\Delta H$ signal by the circuit 402L, whose output is applied by way of the summing circuit 472L to the proportional plus integral circuit 474L. The proportional plus integral circuit 474L operates to drive the condensate valve 32 to its correct position as long as an input signal is present thereto. In the run mode, the transfer function blocks 478L and 480L, shown in FIG. 8A are set to apply the limited output of the proportional plus integral circuit 474L to the drive card 486L whereby the condensate valve 32 is set to a controlled position as explained above.

Figure 8C:
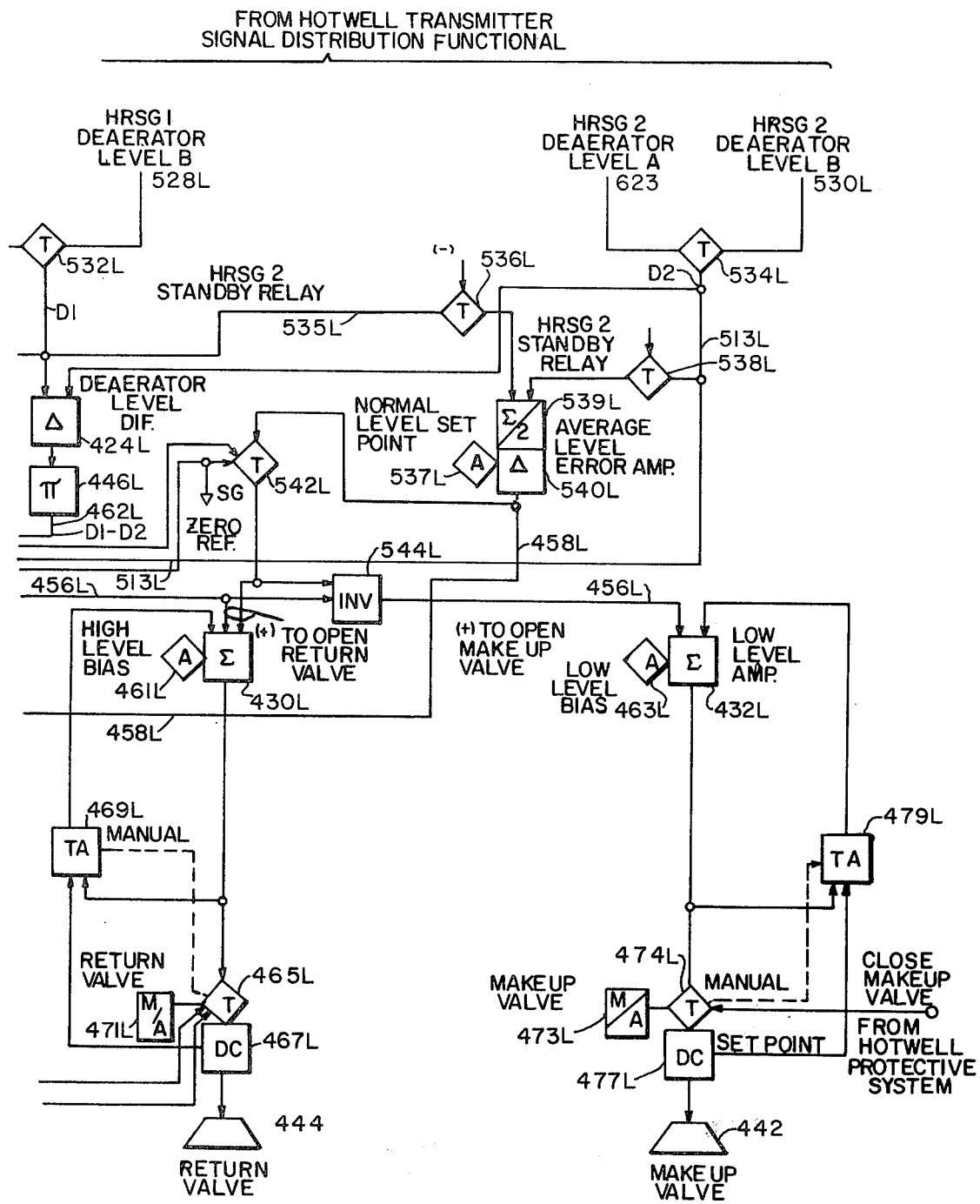

When the first steam generator 18 is disposed to operate in its STANDBY mode, a command signal is applied to the transfer function block 478L to disconnect the control signal as derived through the control path including the run amplifier 404L and to apply the control signal as derived from a standby amplifier 482L. With reference to FIGS. 8B and 8C, level signals indicative of the fluid level within the deaerator storage tank 69 are derived from level transducers 523 and 528L, one of which is selected by a transfer block 532L to be applied by connector 481L to the input of the standby amplifier 482L to be compared with a normal value of the fluid level within the storage tank 69 in STANDBY mode, as entered through setpoint block 484L. A difference signal is derived from the standby amplifier 482L to be applied by way of the transfer block 478L and the transfer block 480L to the driver card 486L to set the position of the condensate valve 32. Thus in a STANDBY mode of operation, the water level within the storage tank 69 is proportionately controlled in accordance with the measured value of the level therein as compared with a normal value thereof. As indicated in FIG. 8A, the condensate valve 32 may be operated in a manual mode of operation in response either to operator control or in response to signals developed from the hotwell protective system indicating a command to close the condensate valve or of a dry status within the steam generator 18. Under either condition output is derived from the OR gate 492L and applied to the transfer function block 490L whereby the control signal for setting the position of condensate valve 32 is derived from the manual/auto control station 490L. Further, an open condensate valve signal is applied as an override through the transfer function block 480L to open the condensate valve 32 in response to the detection of a high hotwell trip condition.

The condensate valve 33 associated with the second steam generator 86 is controlled in a manner similar to that of the first described condensate valve 32. In particular, the output of the summing circuit 402L is applied by way of the summing circuit 472L, the proportional plus integral circuit 472L, the high low limiting circuit 476L and the connector 512L to a run amplifier 422L. In the normal run mode, the transfer function blocks 516L and 520L apply the control signal so derived to a driver circuit 522L whose output drives the condensate valves 33 to the desired position.

As discussed above, a flow and deaerator balance control is shown particularly in FIG. 8B as comprised of the summing circuit 418L having a first input to which is applied a signal indicative of the difference in superheated steam flows S1 and S2 (see FIG. 8A) by connector 460L, a second input for receiving the output of the subtraction circuit 416L indicative of the difference in condensate flows C1-C2, and a third input for receiving the output of a deadband circuit 446L. As more clearly seen in FIG. 8C, the selected signal D1 indicative of the level of fluid within the storage tank 69 is applied to one input of a subtraction circuit 424L, whereas the second input is applied thereto from a transfer function block 534L representing a selected one signal $D_2$ of two deaerator level signals indicative of the fluid level within the storage tank 91 as derived from level transducers 623 or 530L. The subtraction circuit 424L provide a difference output indicative of the difference $D_1-D_2$ in the fluid levels within the storage tanks 69 and 91 to be applied to the third input of the summing circuit 418L by connector 462L (see FIG. 8B). In turn, the output of the summing circuit 418L tends to correct for differences in steam flow, condensate flow and storage tank levels to selectively control the positions of the condensate valves 32 and 33, whereby the levels within the storage tank 69 and 91 are maintained substantially equal to each other and at a predetermined level. In particular, the output of the summing circuit 418L is applied by way of a proportional plus integral circuit 506L, a high low limiting circuit 508L and the transfer function block 510L to provide a trim signal to the run amplifier 422L associated with the condensate valve 33. Further, as shown in FIGS. 8B and 8A, the trim signal so developed is applied by connector 464L through an inverter 465L to the run amplifier 404L associated with the condensate valve 32. Thus, the effect of the balancing trim signal upon the condensate valve 33 is opposite the effect upon condensate valve 32 e.g. condensate valve 33 is opened while condensate valve 32 is being closed.

When the second steam generator is being operated in a STANDBY mode, a heat recovery steam generator standby signal is applied to the transfer function block 516L, whereby the normal control signal as provided by the run amplifier 422L is removed and a standby control signal as provided by standby amplifier 414L is applied by way of the transfer function block 516L, and the transfer function block 520L to the driver card 522L which drives the condensate valve 33 to its controlled position. In standby, as shown in FIGS. 8B and C the selected level signal $D_2$ indicative of the fluid level within the storage tank 91 as derived from the transfer block 534L is applied by connector 513L to the standby amplifier 514L to be compared with a normal level value as entered through setpoint block 515L to generate and apply a difference signal therebetween by way of the transfer blocks 516L and 520L to the drive circuit 522L.

The condensate valve 33 may be also operated in a manual mode in response to open and close signals as derived from the hotwell protective system and applied to the transfer function block 520L. Further, as seen in FIGS. 8A and B, the transfer function blocks 520L and 480L when operated in their manual mode of operation provide a corresponding output to a logic circuitry comprised of AND gate 498L and OR gates 496L and 500L. As indicated in FIG. 8B, the OR gate 500L generates a track enabling signal to be applied to a tracking amplifier 504L. Further, outputs are derived as shown in FIGS. 8A and B from the driver circuits 486L and 522L indicative of the positions of the corresponding condensate valves 32 and 33, to be applied to a high select circuit 502L, which selects and applies the higher of the two input signals to one input of the tracking amplifier 504L. The other input is derived from the output of the condensate valve controller as taken from the high low limiting circuit 476L indicative of the position to which the controller would set the positions of the condensate valves 32 and 33. Thus, while the condensate valve controller is being operated in its manual mode, the tracking amplifier 504L is operated in a tracking mode, to generate and apply by connector 505L an output to the summing circuit 472L whereby the output of the controller as derived from the high low limiting circuit 476L is driven to a value corresponding to that at which the condensate valves 32 and 33 are set during their manual mode of operation.

With respect to FIG. 8C, the operation of the return valve 444 and the makeup valve 442 is more clearly shown. In particular, the selected level signal D1 indicative of the fluid level within the storage tank 69 is applied by way of the transfer function block 536L to one input of the average level summing circuit 539L. The other input to the average summing level circuit 539L is derived by way of the transfer function block 538L from the transfer block 534L corresponding to the selected level signal $D_2$ indicative of the fluid level within the storage tank 91.

A signal indicative of the average fluid level within the storage tanks 69 and 91 is applied by the summing circuit 539L to a subtraction circuit 540L to be compared with a normal level setpoint indicative of the desired levels within the storage tanks to provide a corresponding difference signal. The difference signal from circuit 540L is applied by way of the transfer function block 542L (when the control system is in its run mode) to the summing circuit 530L, and by way of an inverting circuit 544L to a summing or low level amplifier 432L.

The summing circuit 430L is associated with the return valve 444 and compares the difference signal input with a high level bias signal as entered through setpoint block 461, whereby if the average water level exceeds a high limit value or setpoint, the output of the circuit 430L is applied by way of the transfer function block 465L to a driver circuit 467L, whose output drives the return valve 444 to its open position to remove water from the closed loop system thereby tending to reduce the fluid level within the storage tanks 69 and 91. Similarly, the summing circuit 432L compares the inverted average level error signal with a low level bias signal indicative of the low limiting level of fluid within the storage tanks 69 and 91, as entered through a setpoint block 463L, to generate and apply an output by way of the transfer function block 474L to the driver circuit 477L, whereby the makeup valve 442 is opened to return water into the condenser 31 and eventually into the storage tanks 69 and 91 thereby tending to raise their fluid level.

As indicated in FIG. 8C, both of the return valves 444 and the makeup valve 442 may be operated in a manual mode. In particular, an operator determined value may be entered by manual/auto control 471 by way of a transfer block 465 to the driver card 467L. As indicated, signals are applied from the hotwell protective system to the transfer of function block 465L whereby it is transferred into its manual mode of operation. Further, while operating in a manual mode, a tracking amplifier 469L is actuated to compare the position of the return valve 444 while in a manual mode of operation to that positional value that the control system would operate th return valve 444 when in an auto or run mode of operation. In a manner as explained above, the tracking amplifier 469 applies its output to the summing circuit 430L thereby driving its output toward a value corresponding to the position of the return valve 444 in manual operation, to insure a bumpless transfer when the control system is transferred from its manual to automatic mode of operation. In a similar manner, the makeup valve 442 may likewise be operated in a manual mode of operation, whereby operator determined values are entered by the manual/auto control 473L, by way of the transfer block 474L to the driving circuit 477L. While in a manual mode of operation, the tracking amplifier 479L provides an output tending to drive the output of the summing amplifier 432L toward a value corresponding to the position of the makeup valve 442L as set in its manual mode of operation.

When both of the steam generators 18 and 86 are operated in a STANDBY mode, the combined cycle electric power generating plant is considered to be operating in "plant standby". In particular, the steam generator No. 2 standby signal (see FIG. 8A) and the steam generator No. 1 standby signal are both applied to an AND gate 494L whose output forms a "plant standby" command signal to be applied by connector 519L to the transfer function block 536L (see FIG. 8B). Thus, in the plant STANDBY mode of operation, the difference signal ΔH indicative of the difference between the measured and normal fluid levels within the hotwell 335, is applied by connector 456L and the transfer block 456L to an input of the summing block 430L and subsequently by way of inverting circuit 544L to the summing block 432L to control the positions of the return valve 444 and the makeup valve 442 as a function of the measured fluid level within the hotwell 335. In the normal or run mode of operation, the transfer function block 526L applies a zero reference to the summing circuits 430L and 432L, thus having no influence thereon through that input. Further, the plant standby command signal is likewise applied to the transfer function block 542L (see FIG. 8C), whereby in the STANDBY mode of operation, a zero reference level signal is applied thereby to the summing circuits 430L and 432L, thus having no influence thereon.

A further trim signal is generated as shown in FIG. 8C by the output of the subtraction circuit 540L, whereby the average level error signal is applied by connector 458L to a fourth input of the summing circuit 472L to trim the effect of the difference signal $S_T$–$C_T$ upon the operation of the condensate valves 32 and 33.

E-2. System Circuitry

Figure 9A:
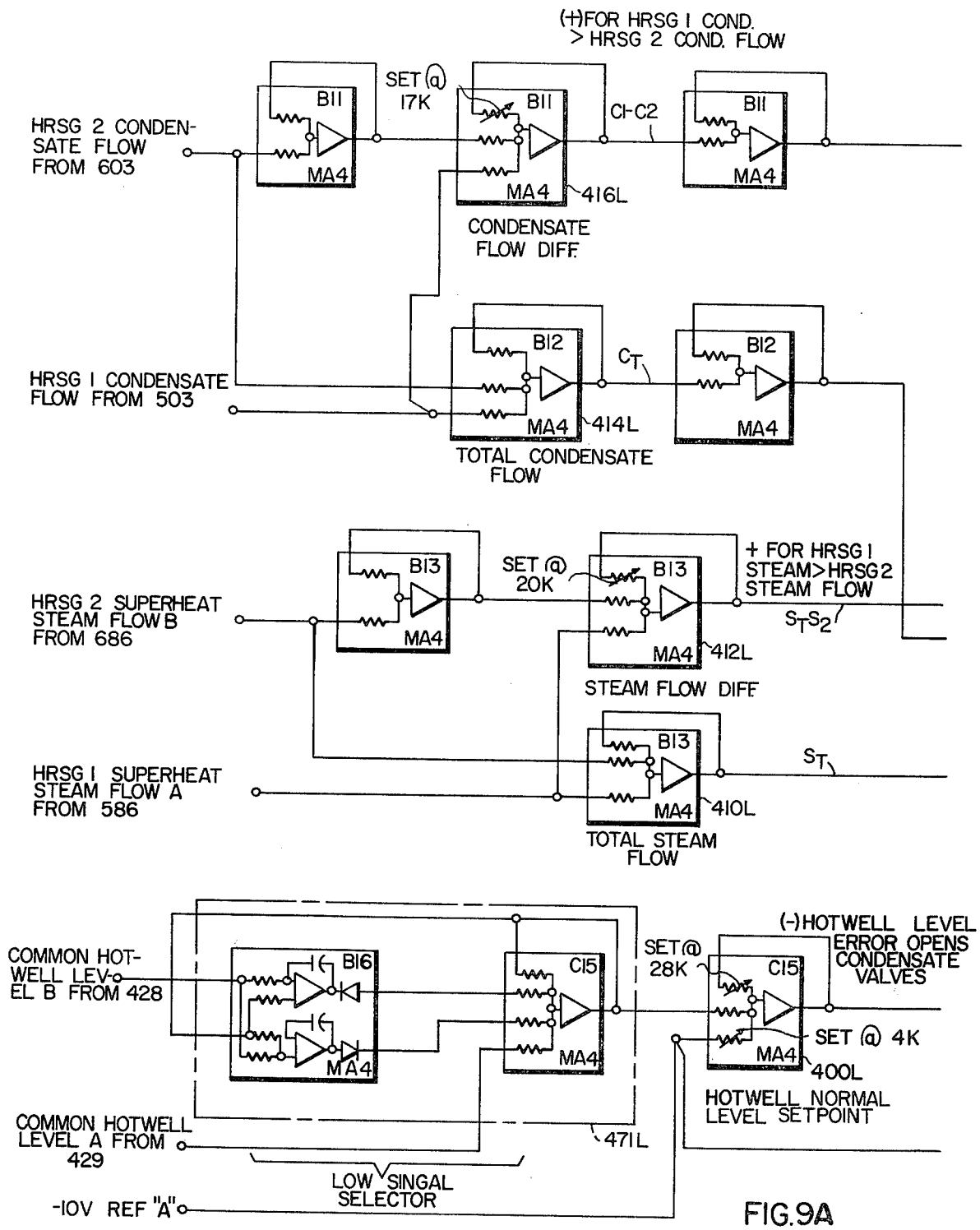
FIGS. 9A to 9R show in detail an illustrative embodiment of the circuitry which may be employed to perform the various functional blocks shown in FIGS. 8A, 8B and 8C.
Figure 9B:
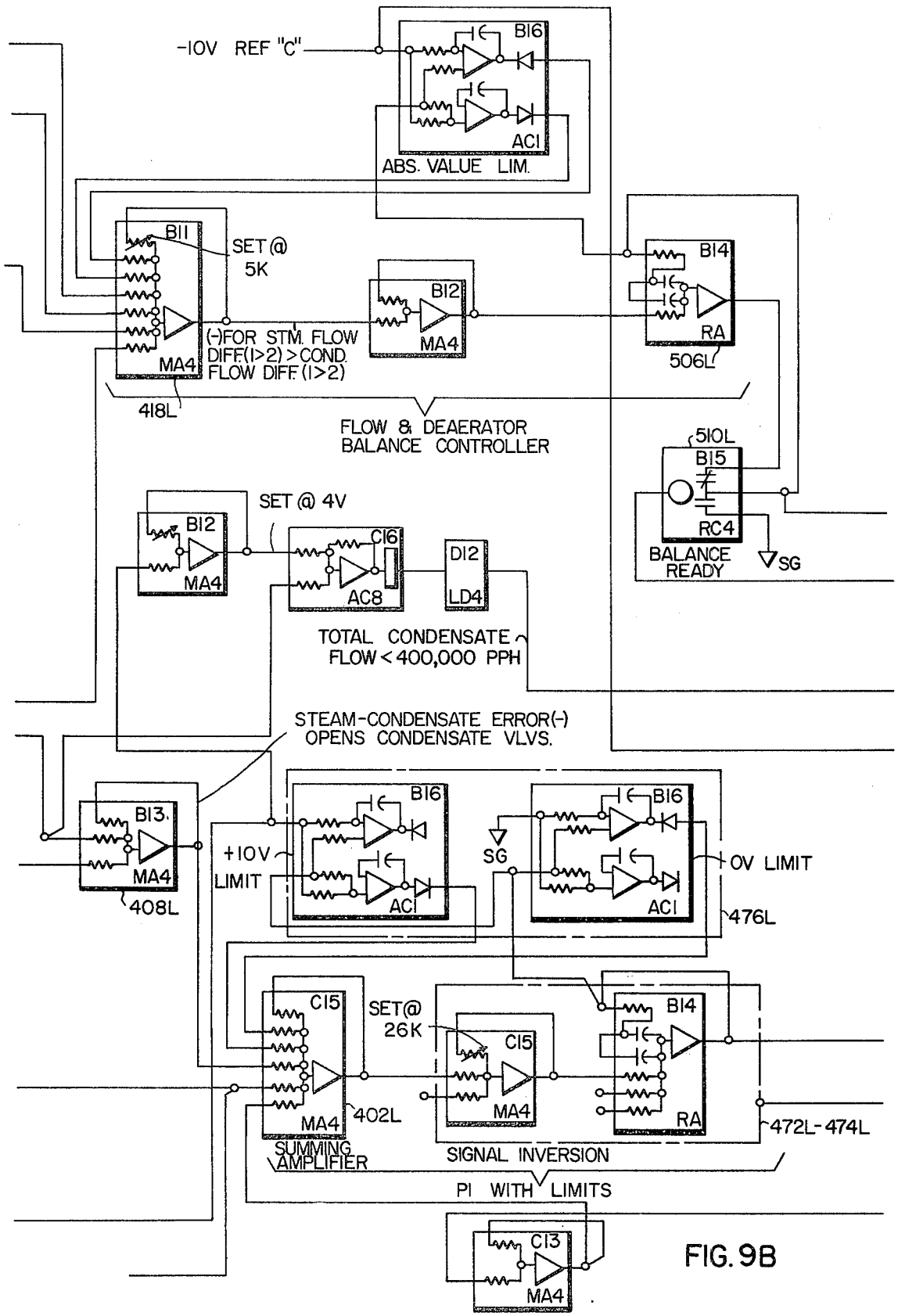
Figure 9C:
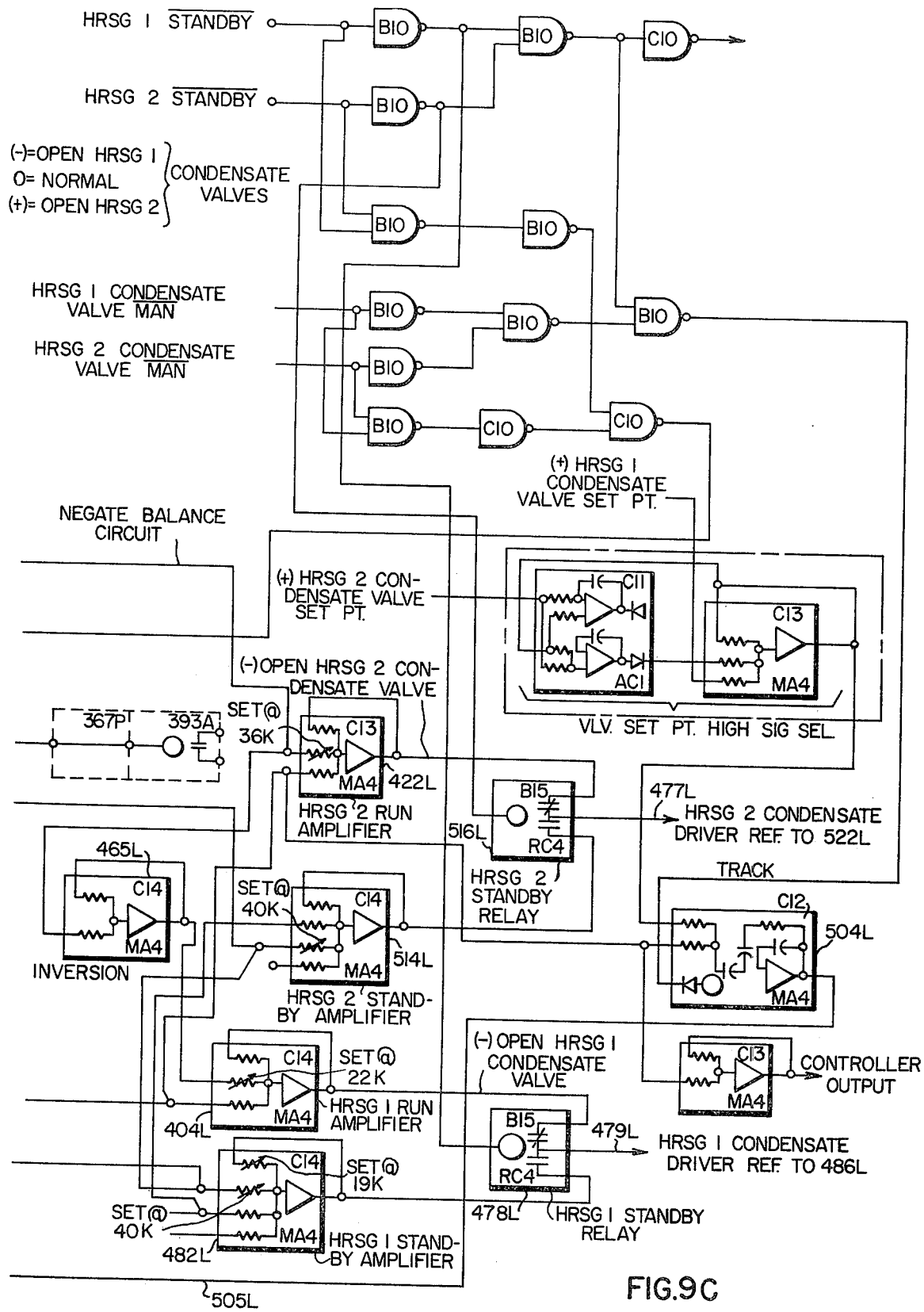
Figure 9D:
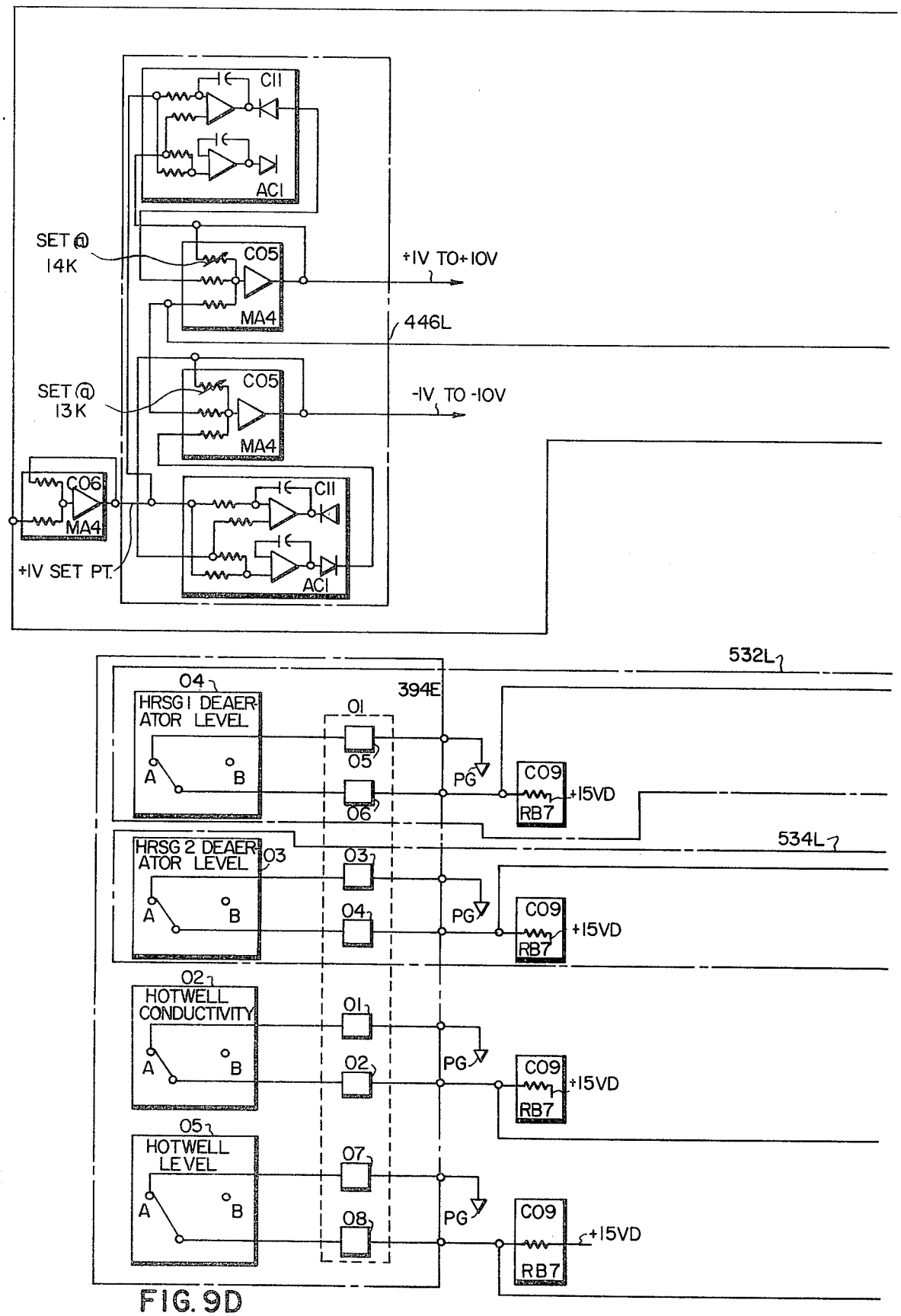
Figure 9E:
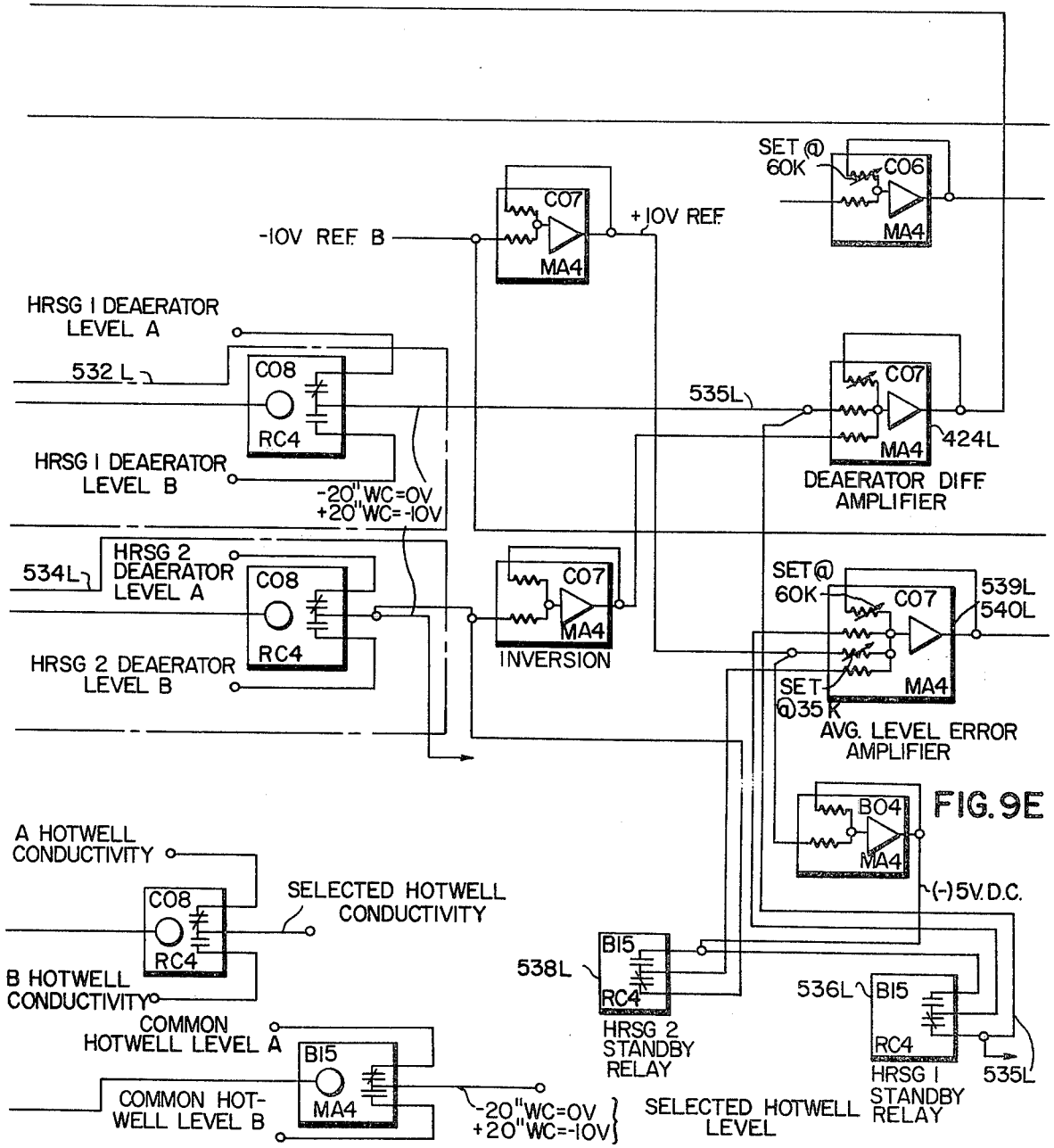
Figure 9F:
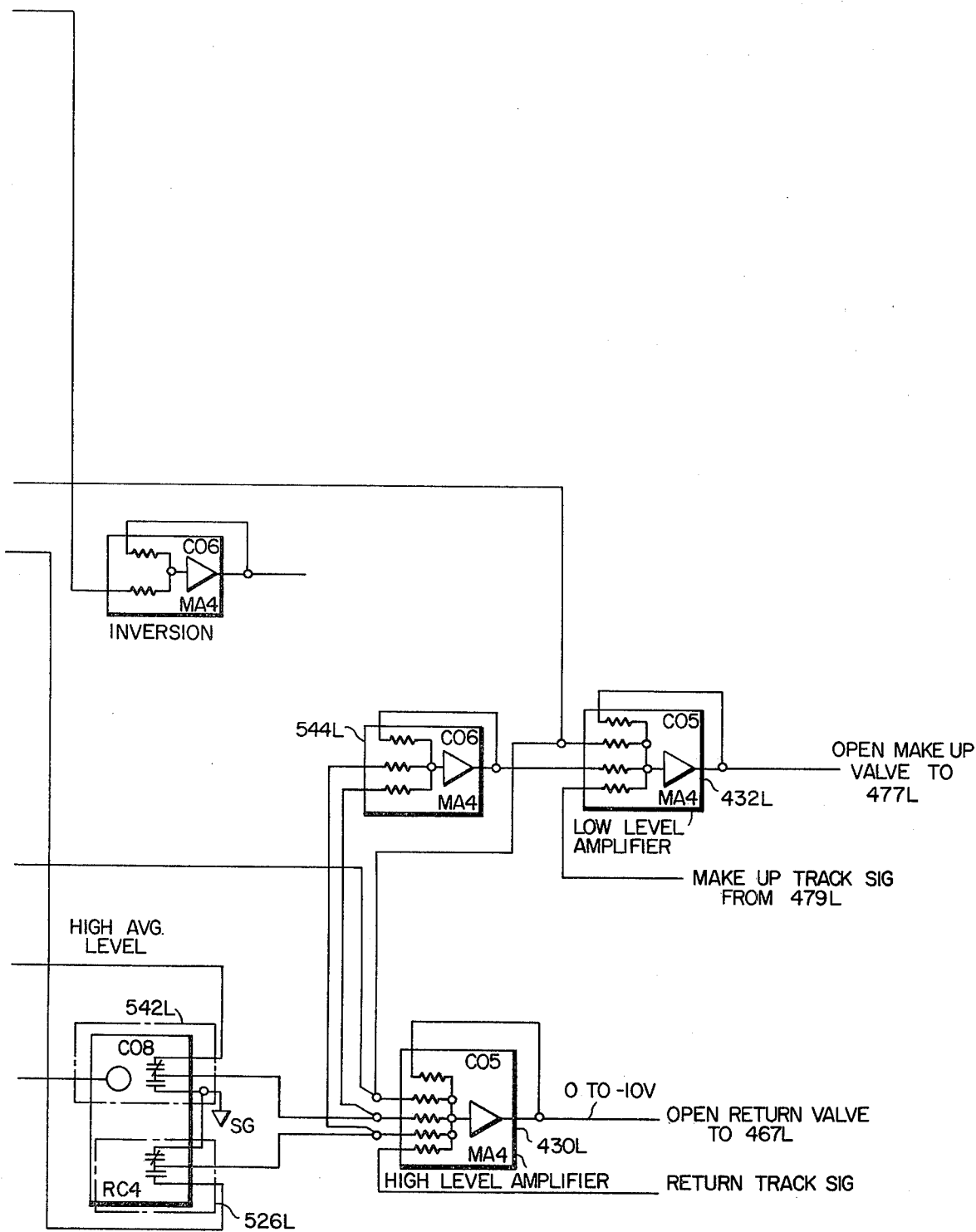
Figure 9G:
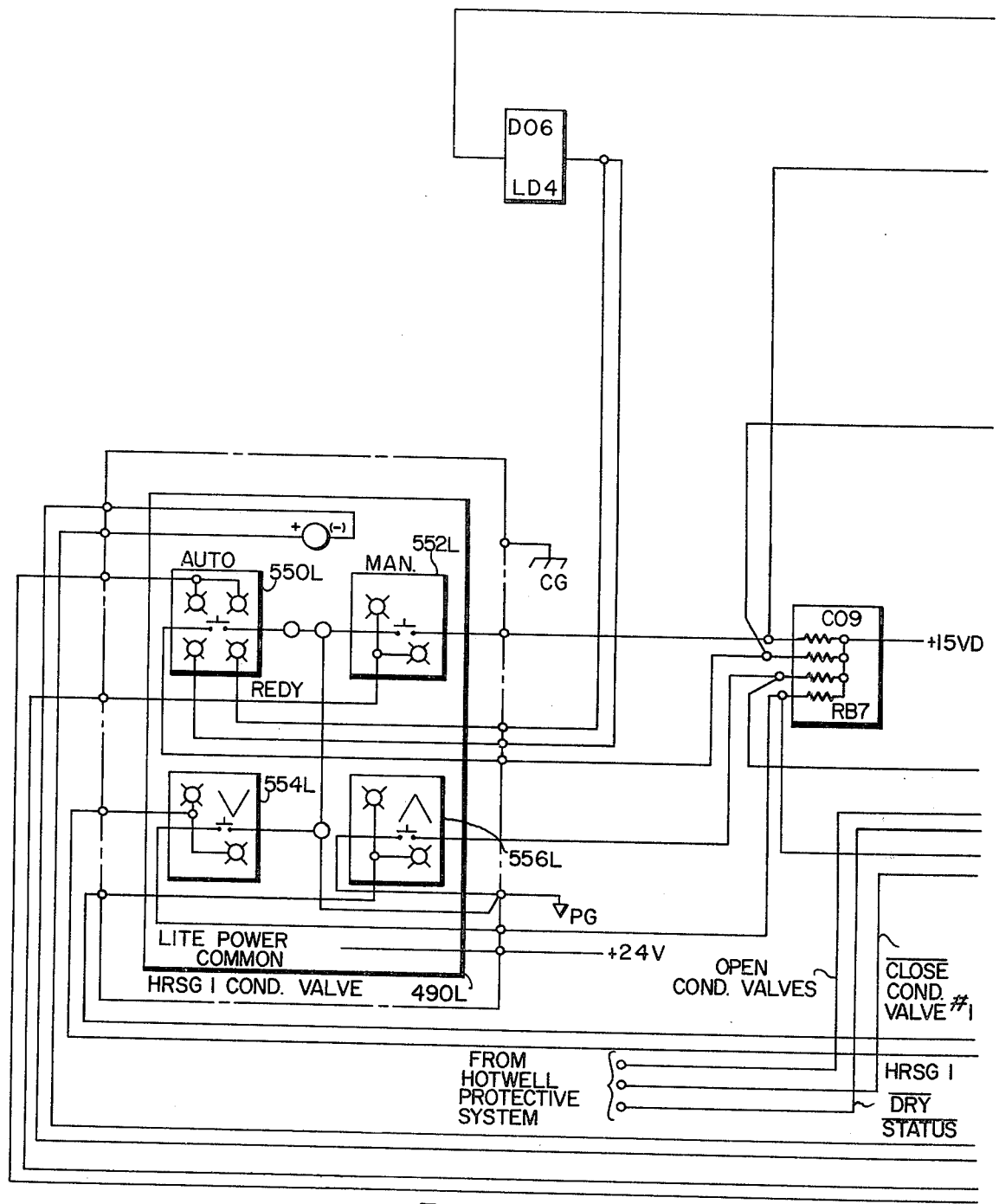
Figure 9H:
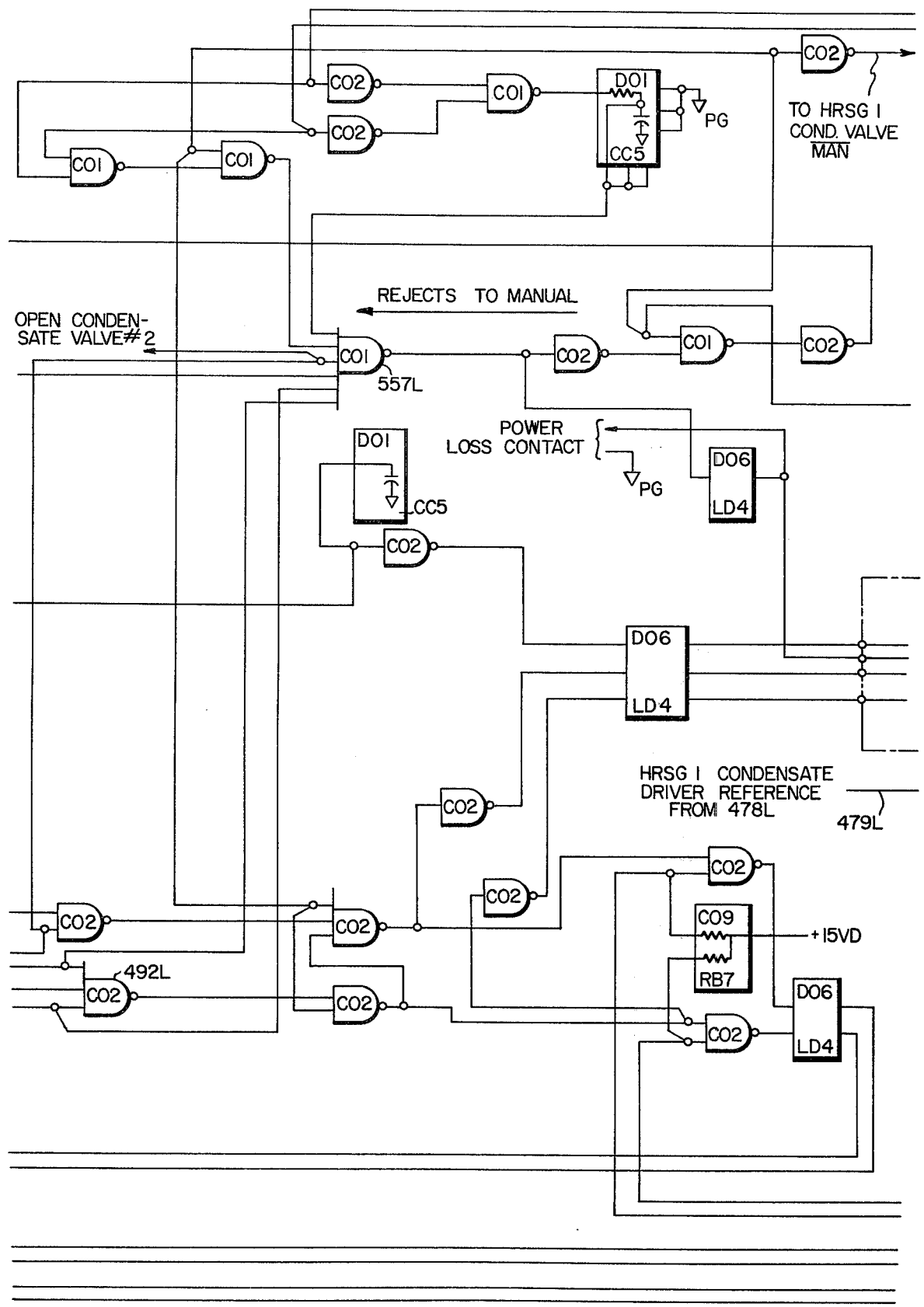
Figure 9:
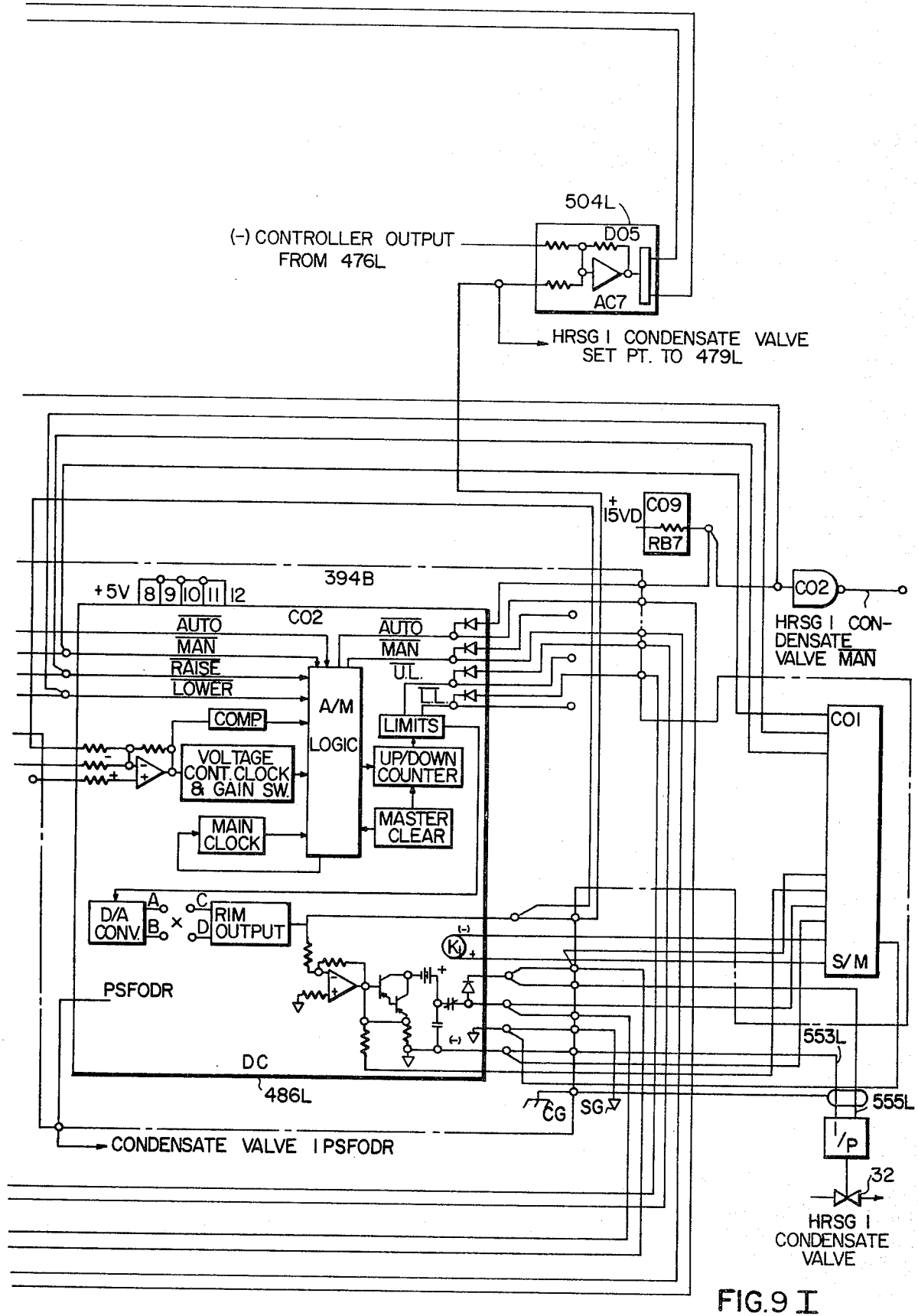
Figure 9J:
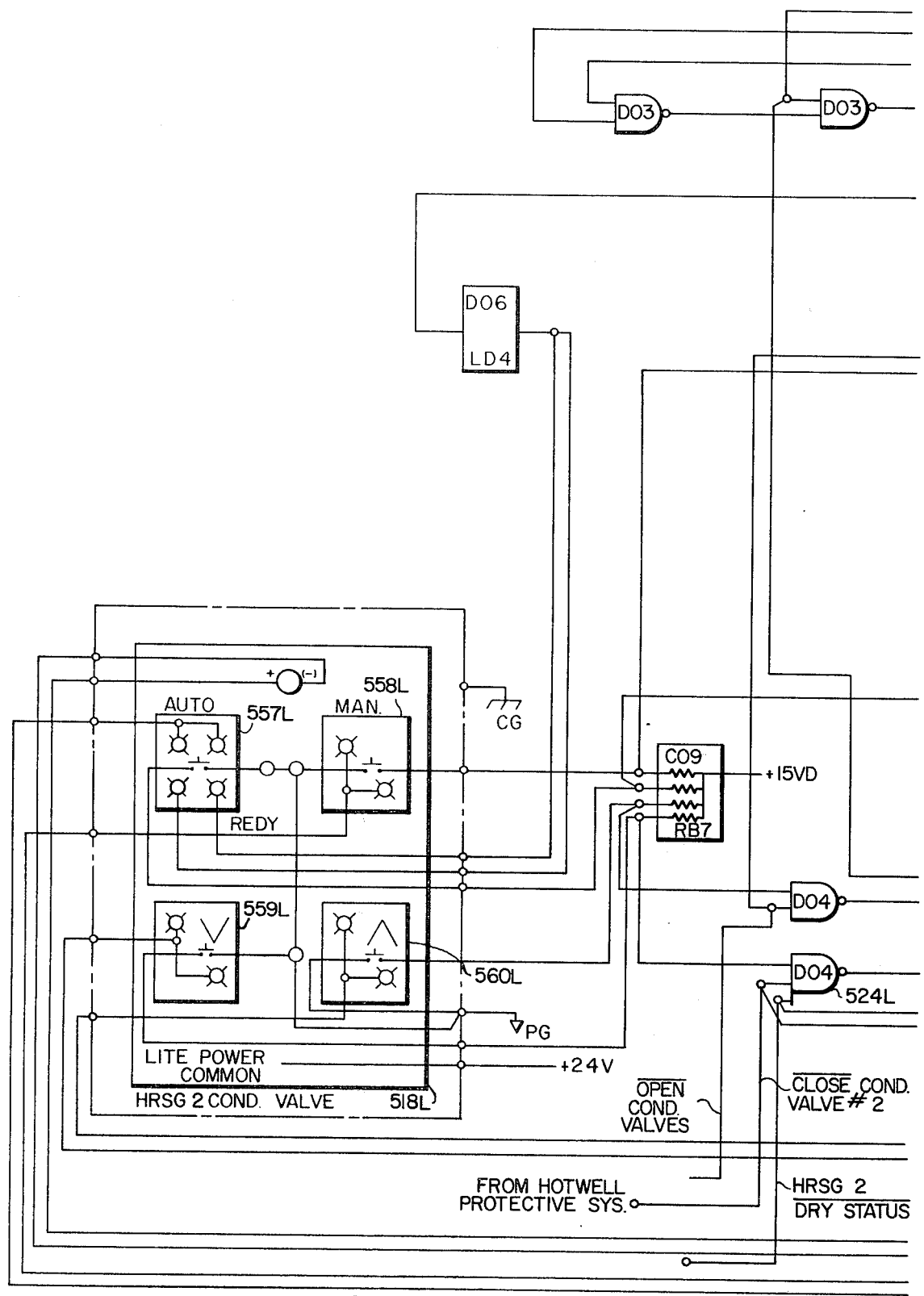
Figure 9K:
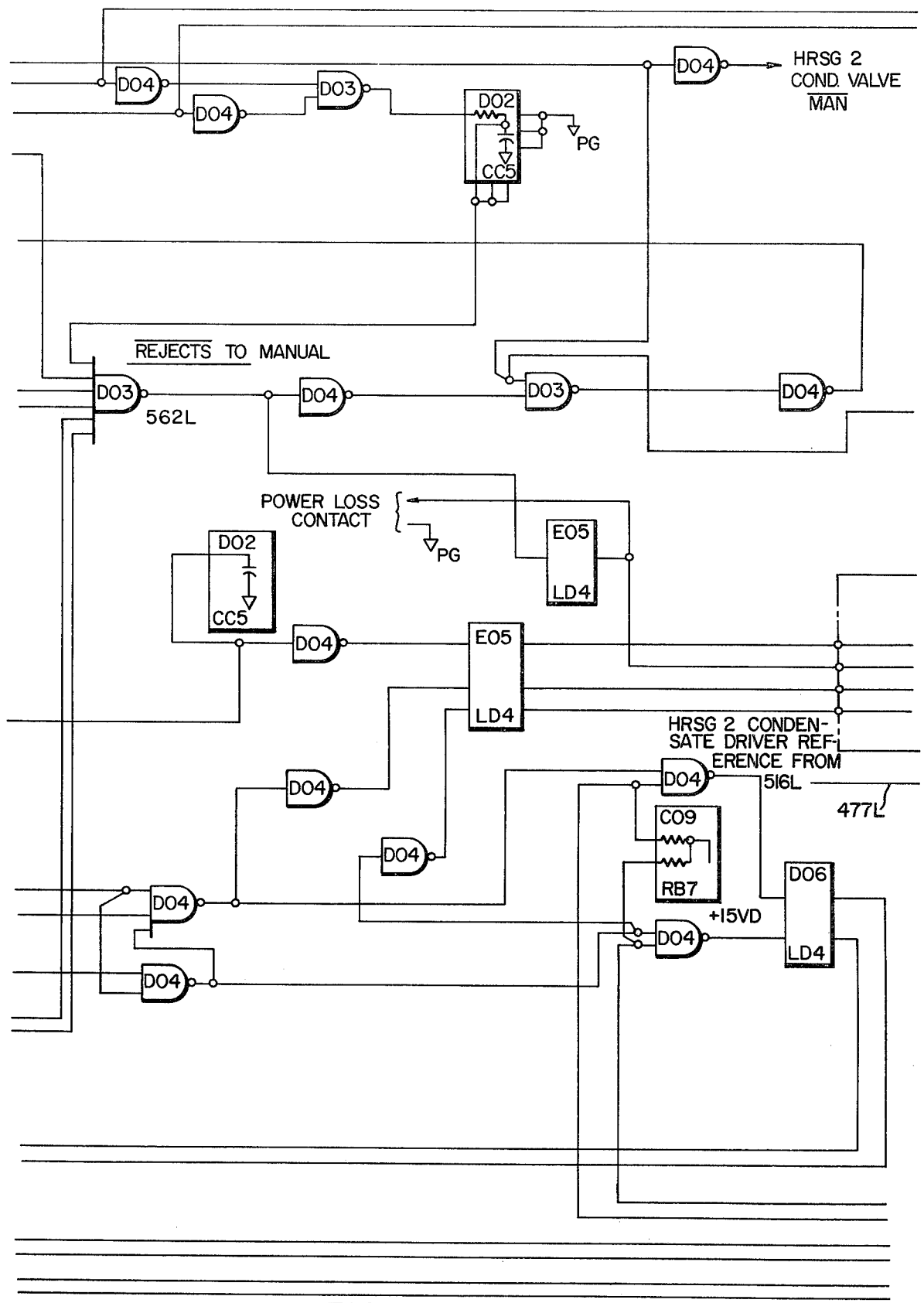
Figure 9L:
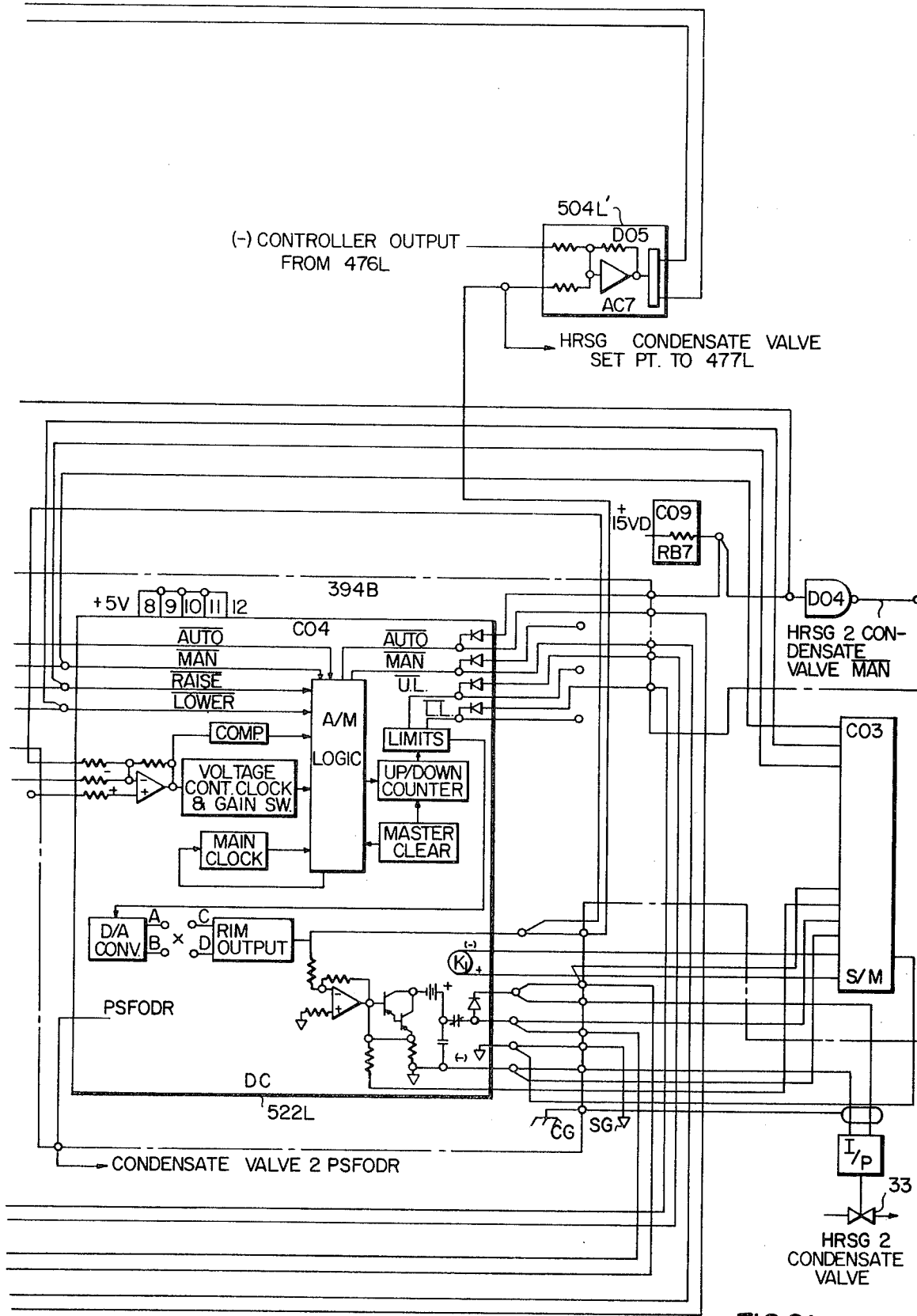
Figure 9M:
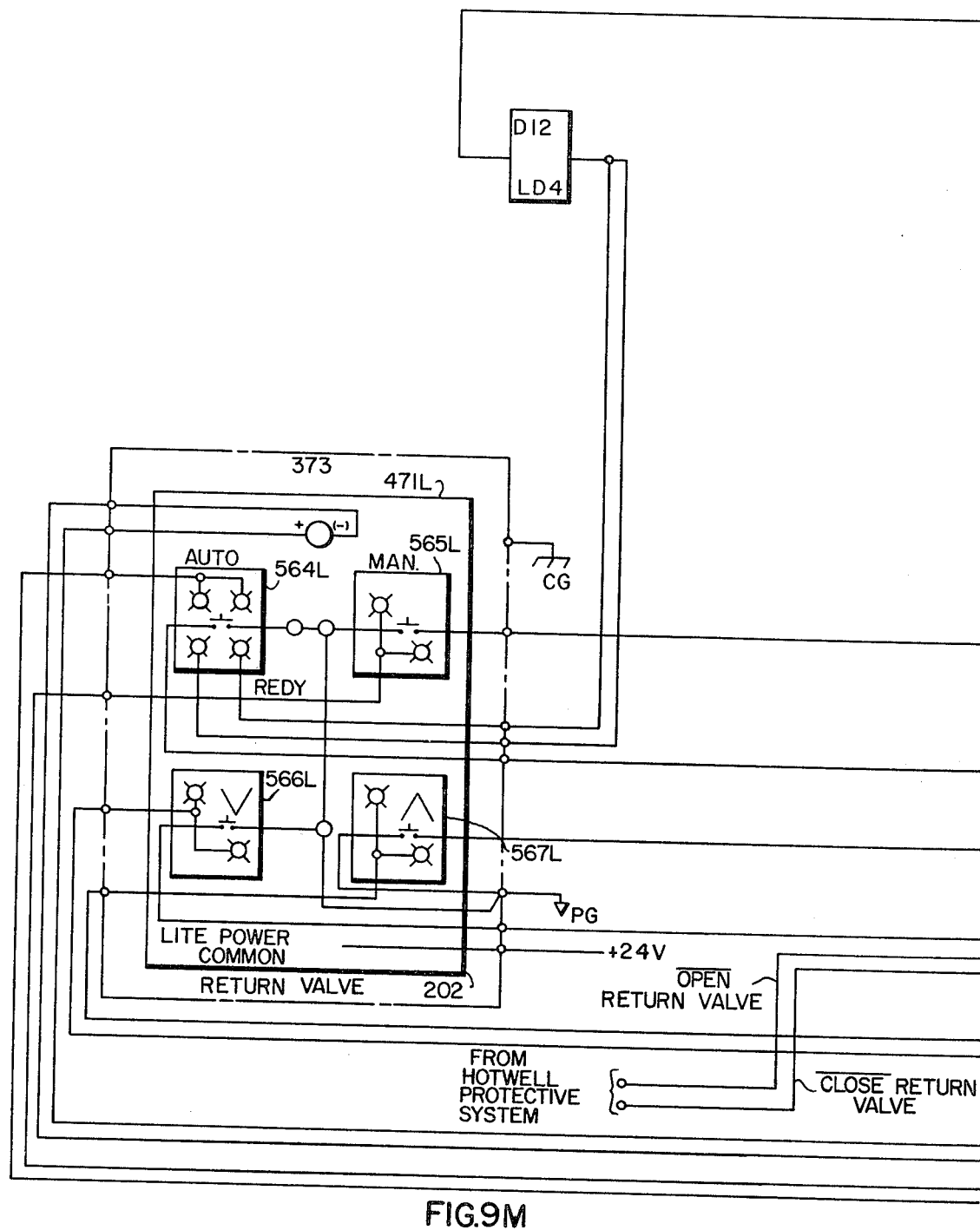
Figure 9N:
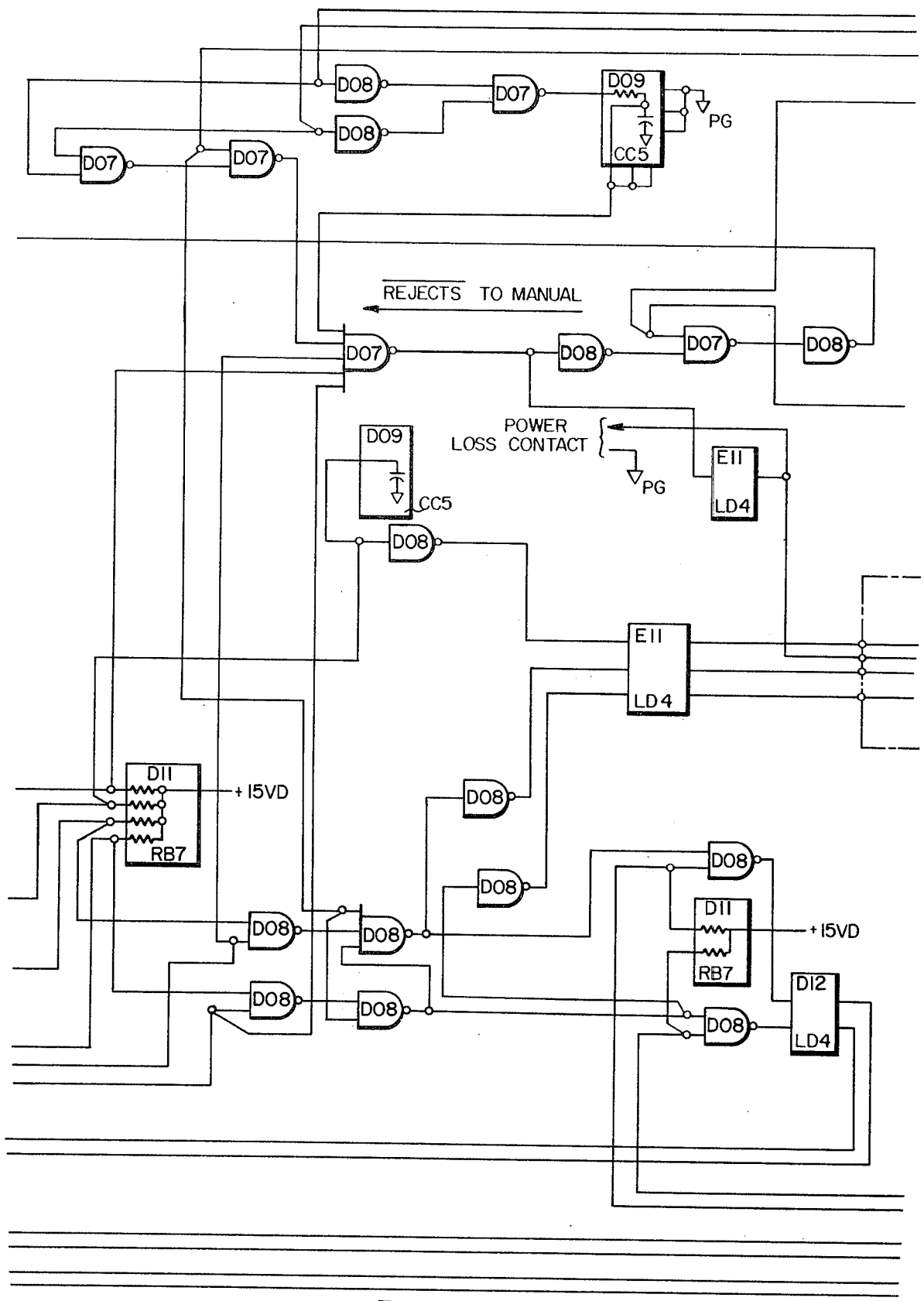
Figure 90:
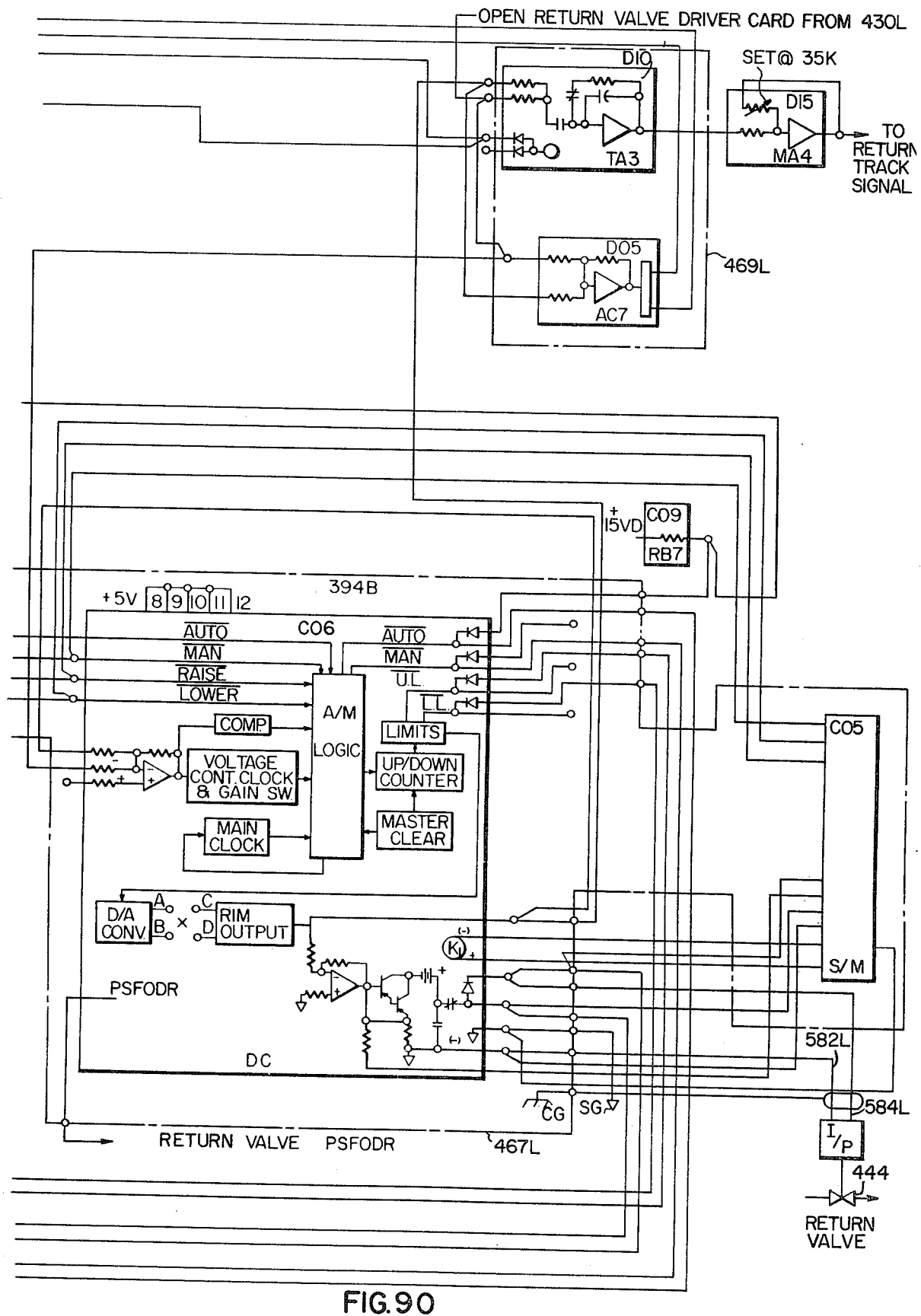
Figure 9P:
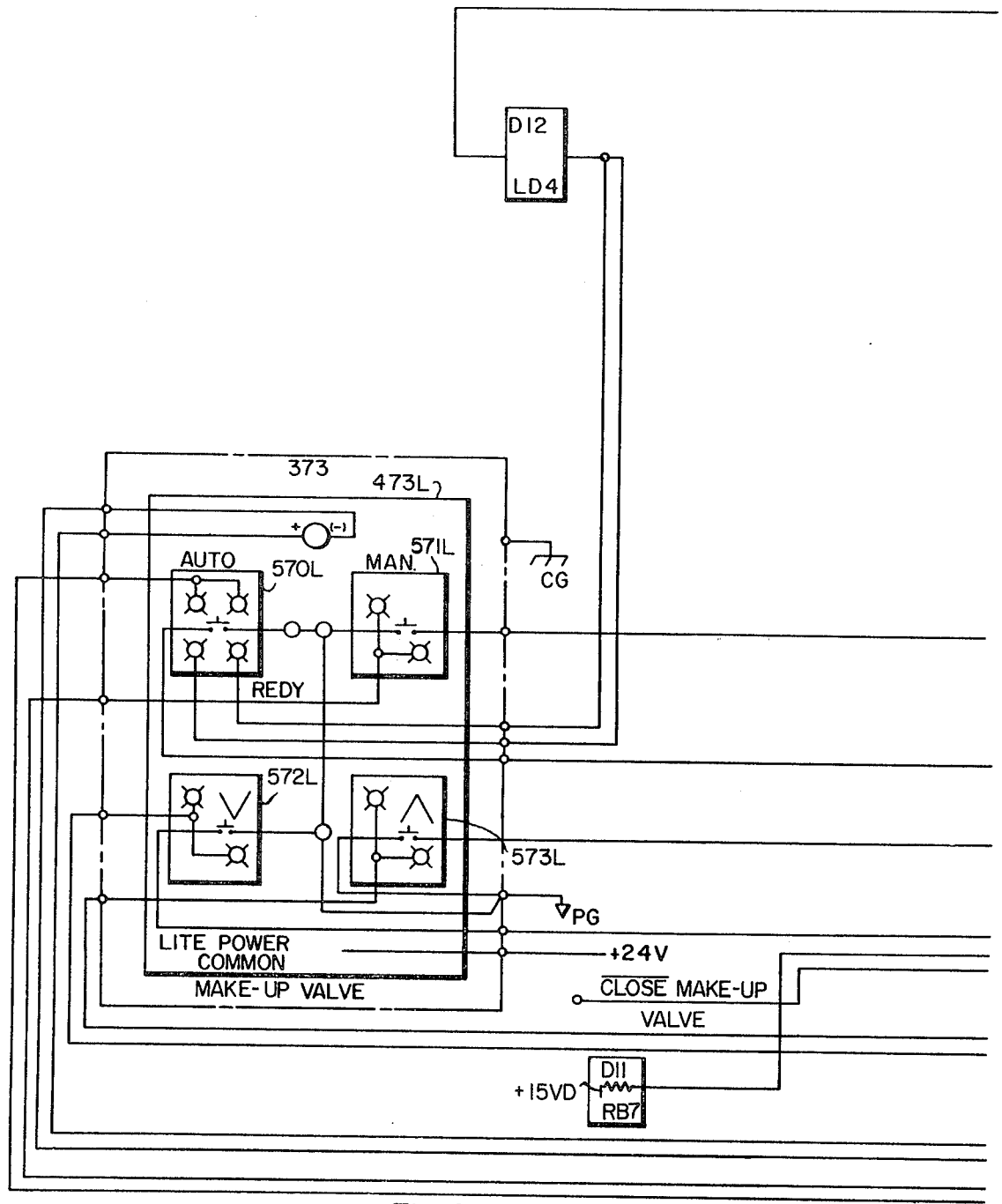
Figure 9Q:
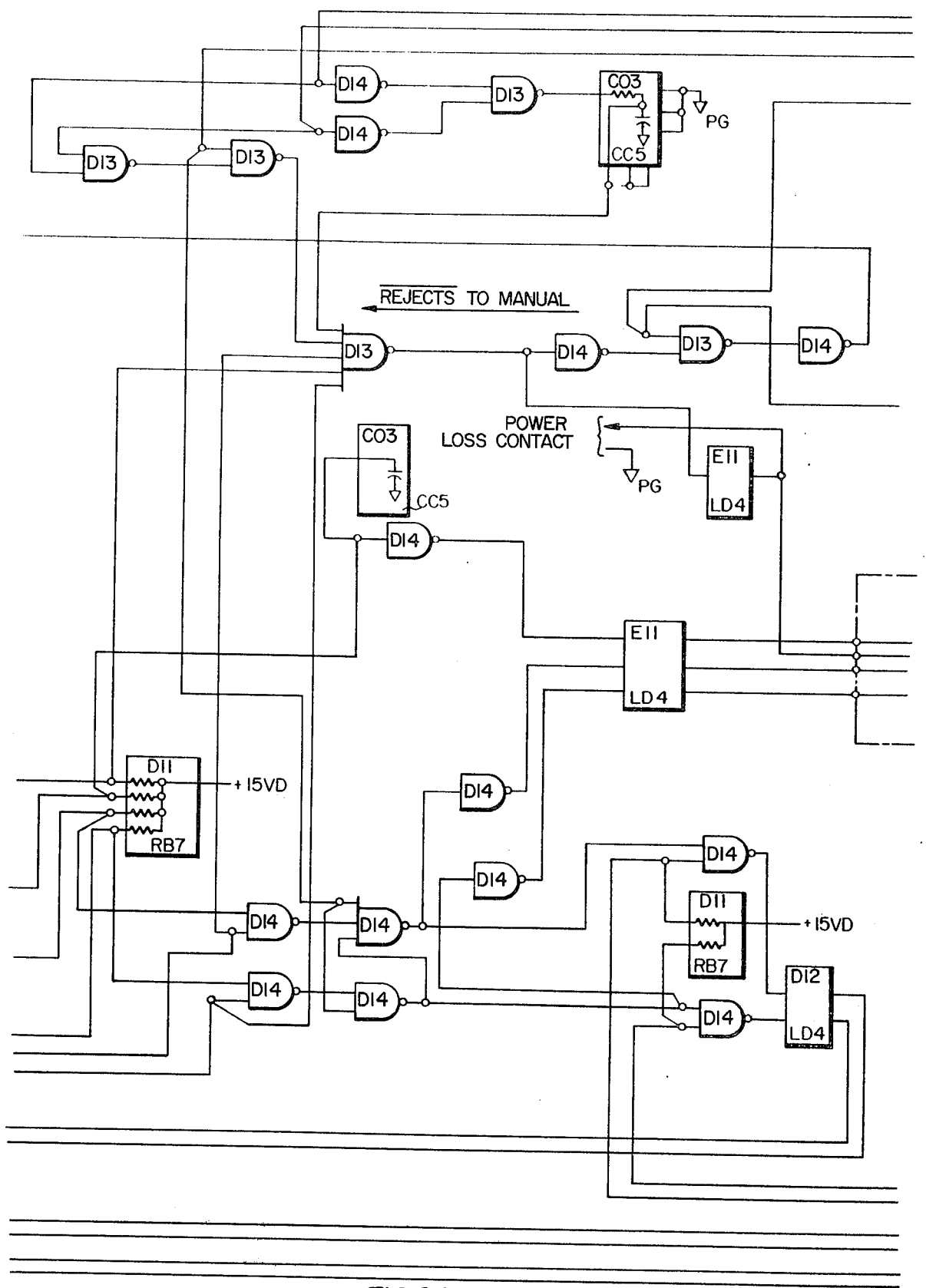
Figure 9R:
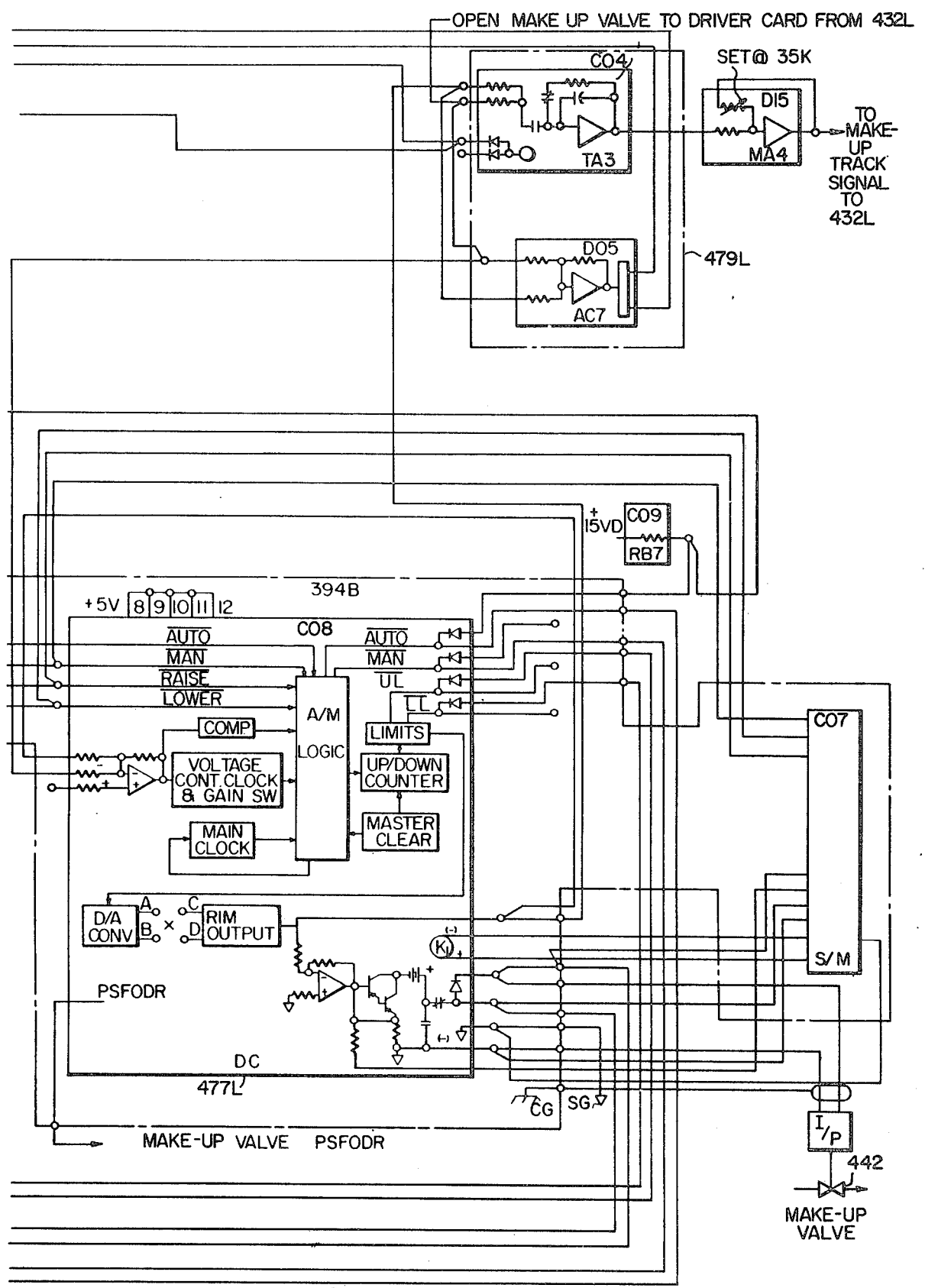

In FIGS. 9A to 9R, there is shown detailed circuitry preferably employed to implement the functions described in connection with FIGS. 8A, B and C. With respect to FIG. 9A, signals indicative of the condensate flow as derived from the flow transmitters 503 and 603 are applied to each of the summing circuits 414L and the subtraction circuit 416L to derive respectively the total condensate flow signal $C_T$ and the difference signal C1–C2. Further, a signal indicative of the superheated steam flows as derived from the flow transmitters 686 and 586 are each applied to the summing circuit 410L and the difference circuit 412L to generate as indicated the total superheated steam signal $S_T$ and the difference signal S1–S2. Further, signals indicative of the fluid level within sections 335a and b of the hotwell are derived respectively from level transducers 429 and 428 and applied to the low select signal 471L. As shown in FIG. 9B, the difference signals C1–C2 and S1–S2 are applied to the summing circuits 418L whose summed output is in turn applied to the proportional plus integral circuit 506L whose output is limited by the absolute value limit circuit 508L. Further, the signals $C_T$ and $S_T$ are applied to the subtraction circuit 408L whose difference output is in turn applied to the summing circuit 402L. Further, the selected hotwell level signal as derived from the low selector circuit 471 is applied to the subtraction circuit 400L to be compared with a hotwell normal level setpoint; the output of the subtraction circuit 400L is in turn applied to the summing circuit 402L along with the output of the subtraction circuit 408L.

As seen in FIG. 9B, the output of the summing circuit 402L is applied by way of a circuit combining the functions of the summing circuit 472L and the proportional plus integral circuit 474L, to the run amplifier 404L associated with the first steam generator. As shown in FIG. 9B, the output of the proportional plus integral circuit 474L is limited by the high limiting circuit 476L. As seen in FIG. 9C, the output of the run amplifier 404L is applied to the transfer function block 478 taking the form of a relay, whose selected output is applied by way of a connector 479L to the driver circuit 486L. A further input is made to the standby transfer function block 478L from the standby amplifier 482L associated with the first steam generator.

Further, as shown in FIG. 9B, the flow and deaerator balance controller comprises the summing circuit 418L whose output is applied to the proportional plus integral circuit 506L whose output is limited by the high low limiter 508L. In turn, the limited output of the proportional plus integral circuit 506L is applied by way of the transfer function block 510L, comprising a balance relay, to the one input of the run amplifier 422L associated with the second steam generator. Further, the output of the transfer block function block 510L is inverted by the inversion circuit 465L to be applied to a second input of the run amplifier 404L, whereby the effect of the flow in the deaerator balance controller upon the first condensate valve 32 is opposite to that upon the second condensate valve 33. As shown in FIG. 9C, the output of the run amplifier 422L associated with the second steam generator is applied by way of the transfer function block 516L to the driver card 522L by connector 477L; as will be explained, the driver card 522L serves to position the condensate valve 33.

As seen in FIG. 9C, the control system is commanded to operate in a manual mode of operation whereby a tracking signal is applied to the tracking amplifier 504L to compare the position of the valve 32 when operating its manual mode to that as commanded by the controller to provide an output by connector 505L to the summing amplifier 402L, whereby its output is influenced to effect a bumpless transfer from a manual to a run mode of operation.

In FIG. 9D, there is shown the transfer function block 532L for selectively applying one of the first deaerator level signals as derived from the level transducers 523 or 528 to the subtraction circuit 424L (see FIG. 9E). Similarly, the transfer function block 534L responds to the throwing of a switch upon the operator's hotwell selector panel whereby either of the level signals as derived from the level transducers 623 and 530L is applied to the standby relay. Further, the selected output of the transfer block 532L is supplied by connector 535L first to the subtraction circuit 424L and then to the transfer function block i.e., standby relay, 536L. As shown in FIG. 9H, the outputs of the transfer function blocks 536L and 538L are applied to the average level error amplifier designated by the numbers 539L and 540L. In turn, the high average level signal output is applied by way of the transfer function block 542L to the summing amplifier 543L. As indicated in FIG. 9F, the output of the high level amplifier or summing circuit 430L is applied to the driver card 467L whereby the return valve 444 is opened. Similarly, the output of the transfer function block 542L is applied through the inversion circuit 540L whereby an opposite effect is carried out by way of the low level amplifier or summing circuit 432L, whose output is applied to driver card 477L.

FIGS. 9G, 9H and 9I generally show the detailed circuitry of the driver card 486L and the logic circuit for controlling the manual/automatic operation of the condensate valve 32. In particular, the operator can enter through the manual/auto control 490L, AUTO and MANUAL commands by actuating pushbuttons 550L and 552L, respectively, as well as decrease or increase commands in the setpoint to which the condensate valve 32 may be set, by actuating pushbuttons 554L and 556L, respectively. Further, signals from the hotwell protective system are applied to the OR gate 942L whereby a signal output is derived and applied to a further OR gate 557L which generates a reject to manual signal to be applied to the driver circuit 486L. Further, it is noted that the actuation of the MANUAL pushbutton 552L also causes an input to be applied to the OR gate 557L, whereby a corresponding reject to manual signal is applied to the driver circuit 486L. Further, there is illustrated a portion of the tracking amplifier 504L which responds to outputs of the driver card 486L and of the controller as derived from block 476L to generate Bup and Bdn signals to be applied through suitable logic circuitry to cause the OR gate 557L to generate a reject to manual signal. The output of the driver circuit 486L is applied by connectors 553L and 555L to drive the condensate valve 32 associated with the first steam generator 18.

In a similar manner, FIGS. 9J, 9K and 9L show the detailed circuitry of the driver circuit 522L and the manual/auto control block 518L. In particular, the manual/auto control block 518L includes pushbuttons 557L, 558L, 559L and 560L whereby AUTO, MANUAL, DECREASE and INCREASE signals upon operator actuation may be applied to the driver circuit 522L. Further, in response to signals from the hotwell protective circuit, the OR gate 524L causes a second OR gate 562L to generate a reject to manual signal to be applied to the driver circuit 522L. The output of the transfer function block 516L is applied by connector 447L to the driver card 522L, whereby a corresponding output is applied by connectors 580L and 581L to drive the condensate valve 33 associated with the second steam generator 86.

FIGS. 9M, 9N and 9O show in detail the driver card circuit 467L associated with the return valve 444, as well as the manual/auto control block 471L, whereby pushbuttons 564L, 565L, 566L and 567L may be actuated to supply an AUTO, a MANUAL, a DECREASE and an INCREASE command signal to the driver circuit 467L. A signal tending to drive the return valve 444 open is derived from the summing circuit 430L and is applied to the driver card 467L whereby an output is applied by connectors 582L and 584L to the return valve 444. Further, there is shown the detailed circuitry of the tracking amplifier 469L which compares an output of the driver card and an output as derived from the summing circuit 430L to generate an output to be applied to the summing circuit 430L tending to drive its output toward a valve corresponding to the position of the return valve 444, when operated in a MANUAL mode of operation. In a similar manner, FIGS. 9P, 9Q and 9R show the detailed circuitry of the driver circuit 477L associated with the makeup valve 442. Associated therewith is the manual/auto control block 473L including pushbuttons 570L, 571L, 572L and 573L for applying, when actuated, an AUTO, a MANUAL, a DECREASE or an INCREASE command signal to the inputs of the driver card circuit 467L. An input is derived from the summing or low level amplifier circuit 432L and applied to the driver circuit 477L, whereby an output is applied by connectors 486L and 487L to open the make-up valve 442. Further, there is shown the tracking amplifier 479L which responds to inputs from the driver card 477L and the output of the summing circuit 432L to drive the output of the summing circuit 432L toward a value corresponding to the position of the make-up valve 442, when the system disposed in its manual mode of operation.

E-3. Simplified, Alternative Embodiment of Liquid Level Control

Figure 10:
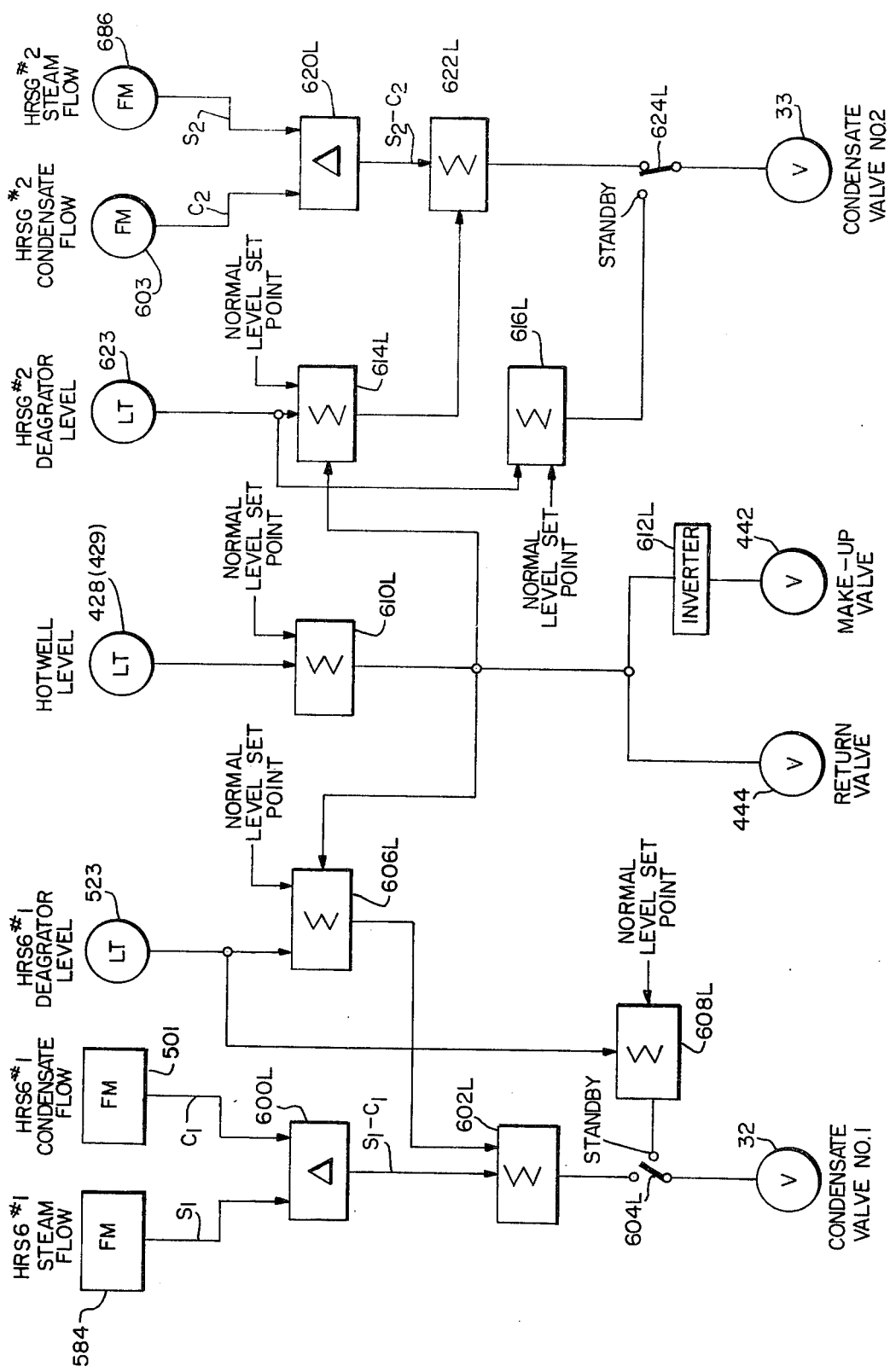
FIG. 10 is a simplified, schematic diagram of an alternative embodiment of the fluid level control of this invention.

There is shown in FIG. 10, a simplified, alternative embodiment of an electrical circuit for controlling the fluid levels in the storage tanks 69 and 91 and the hotwell 335 of the combined cycle electric power plant as shown generally in FIG. 7A. The condensate valve and in particular the condensate valve 32 regulating the flow of condensate to the first deaerator 68, is controlled in response to a signal indicative of the difference between the condensate flow $C_1$ and the flow $S_1$ of superheated steam to the gas turbine 36. In particular, signals $S_1$ and $C_1$ are derived from flowmeters 584 and 501, respectively, to be applied to the subtraction circuit 600L whose difference output $S_1 - C_1$ is applied by way of the summing circuit 602L and switch 604L to control the position of the condensate valve 32. For example, if the steam flow $S_1$ is greater than the condensate flow $C_1$, the subtraction circuit 600L will generate a difference signal of such polarity to increase the position of the condensate valve 32. Conversely, if the condensate flow $C_1$ is greater than the steam flow $S_1$, the subtraction circuit 600L will generate a difference signal of appropriate polarity to close the condensate valve 32.

As indicated in FIG. 10, measurements of the fluid level as derived from the level transducer 523 as well as of the fluid level within the hotwell 335 are used to provide a trim signal to be applied to the summing circuit 602L to adjust the effect of the difference signal $S_1 - C_1$ upon the operation of the condensate valve 32. In particular, the level signal indicative of the fluid level within the storage tank 69 is applied by level transducer 523 to the summing circuit 606L. A signal indicative of the fluid level within the hotwell 335 is derived from the level transducer 428 (or 429) and is applied to the summing circuit 610L. Further, a normal level setpoint indicative of the desired fluid level within the hotwell 335 is applied to the summing circuit 610L, to produce a signal indicative of the output difference between the measured value and the set or predetermined value of the fluid level within the hotwell 335, to be applied to the second input of the summing circuit 606L. A third input is applied to the summing circuit 606L indicative of the predetermined or set level of the fluid within the storage tank 69. Thus, the output of the summing circuit 606L is indicative of the difference between the measured and desired values of fluid level within the storage tank 69 as trimmed by the difference signal derived from the summing circuit 610L, and is applied to the summing circuit 602L to trim the influence of the difference signal $S_1 - C_1$. Thus, the water level control drives the condensate valve 32 to a position dependent primarily upon the difference in condensate flow $C_1$ to and superheated steam flow $S_1$ from the first steam generator 18 as trimmed by measurements of the fluid levels in the storage tank 69 and the hotwell 335.

The control of the second condensate valve 33 for regulating the flow of condensate into the second deaerator 90 is similar to that of the first condensate valve 32. In particular, electrical signals indicative of the condensate flow to the second steam generator 86 and superheated steam flow therefrom are derived from flowmeters 603 and 686 and applied to a subtraction circuit 620L for providing a difference output $S_2 - C_2$ to be applied to the summing circuit 622L. A second input is applied to the summing circuit 622L which is derived from the output of the summing circuit 614L having a first input to which a setpoint signal is applied indicative of the desired normal level of the fluid within the storage rank 91, a second input difference which is applied the output of the level transducer 623 indicative of the fluid level within the storage tank 91, and a third input derived from the summing circuit 610L indicative of the difference between the measured and desired levels of fluid within the hotwell 335. Thus, the position of the condensate valve 33 is determined primarily by the difference between the condensate flow to and the superheated steam flow from the second steam generator 86 as modified by the measurements of the fluid levels within the storage tank 91 and the hotwell 335.

The return valve 444 and the makeup valve 442 of the makeup water system are controlled in response to measurements of the fluid level within the hotwell 335 as derived from level transducers 428 (or 429). In particular, an output indicative of the hot water level as derived from level transducer 428 is applied to the summing circuit 610 to be compared with a desired or normal fluid level within the hotwell to provide a difference signal to be applied directly to control the return valve 444 and through an inverter 612L to control the position of the makeup valve 442. Thus, if the level of fluid within the hotwell 335 becomes too great, the output of the summing circuit 610L serves to open the return valve 444, whereby water is removed from the condensate steam closed loop thus tending to reduce the water level within the hotwell 335. Conversely, if the water level as measured by the level transducer 428 and compared with the normal level setpoint is too low, the output of the summing circuit 610L as inverted by the inverter 612L causes the makeup valve 442 to open and to inject water into the condenser 31 whereby the fluid level within its hotwell increases.

As shown in FIG. 10, the water level control system measures the flow of the superheated steam to the gas turbine 36 as derived from each of the steam generators 18 and 86 to control the operation of the condensate valves 32 and 33. Thus, as indicated in FIGS. 13B and 13C, when a sudden increase in steam demand is effected as a time $T_1$, the steam flow rises quickly and as a result, the condensate flow as controlled by the condensate valve 32 (or 33), opens so that the condensate flow into the storage tank 69 (or 91) follows closely the flow of the steam output from the corresponding steam generator. The increase in the steam flow out is effected in response to an increased load demand upon the combined cycle electric power generating plant whereby an increased amount of heat is directed into the steam generator by the exhaust gases of the associated gas turbine. As steam is generated within the superheater and high pressure coils 260 and 261, the fluid level within the main drum 70 gradually increases due to the swell effect of steam being introduced into the drum. As a result, the feedwater required into the main drum does not follow the steam taken therefrom, as indicated by the dotted line in FIG. 13B. Thus, a net loss in fluid weight occurs within the system. Further, the feedwater flow out of the storage tank 69, as shown in dotted lines in FIG. 13C, is less generally than the condensate flow in. Thus, for an increase in steam pressure, more condensate flow is put into the storage tank 69 than is taken out, with a resulting increase in the storage level as indicated in FIG. 13A. This operation does not cause undue problems within the storage tank 69 due to the sudden introduction of relatively cold condensate water in that the pressure drop is offset by the increase in heat supply and steam generation, whereby the pressure is maintained within the storage tank 69 and upon the feedwater pump 524 to a degree that the pump is not damaged.

Figure 13F:
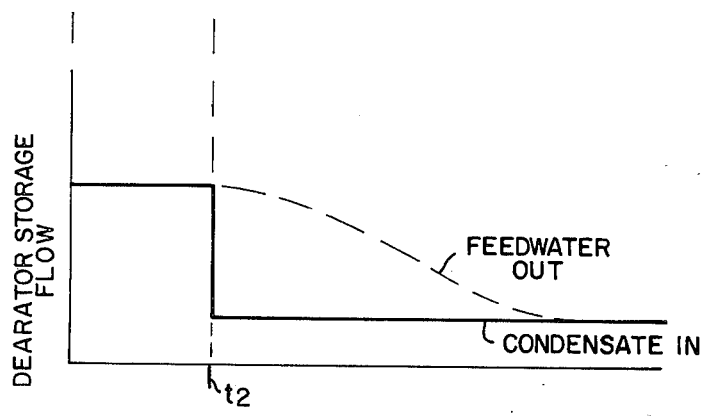

On the other hand, a more serious problem may occur when the load placed upon the combined cycle electric power plant decreases rapidly with a corresponding decrease in the demand of steam from the steam generator, as shown in FIG. 13E. Thus, as less steam is required, a corresponding reduction in the heat supplied to the steam generator is effected with a subsequent, rapid drop in the flow of the steam from the generator. As seen in FIG. 13F, a corresponding decrease in the condensate flow into the storage tank 69 is effected in accordance with the fluid level control system of this invention. As shown in FIG. 13E, the feedwater directed into the main drum 70 continues at a rather high flow rate, decreasing toward a level corresponding to that of the steam flow out. As a result, an additional quantity of water is introduced into the condensate steam loop indicative of the area between the feedwater in and steam out curves in FIG. 13E. As shown in FIG. 13F, there is a reduction in the condensate flow into the storage tank 69 with respect to the feedwater out therefrom. As a result, as shown in FIG. 13D, an immediate decrease in the fluid level within the storage tank occurs that is gradually brought back up to the desired value. Significantly, there is a reduction in the condensate flow into the storage tank, thus avoiding possible damage to the feedwater pump 524 due to a pressure drop within the storage tank. In other words, the amount of condensate flow into the storage tank is reduced whereby the pressure within the storage tank and upon the feedwater pump 524 is maintained to prevent damage thereto.

Figure 11A:
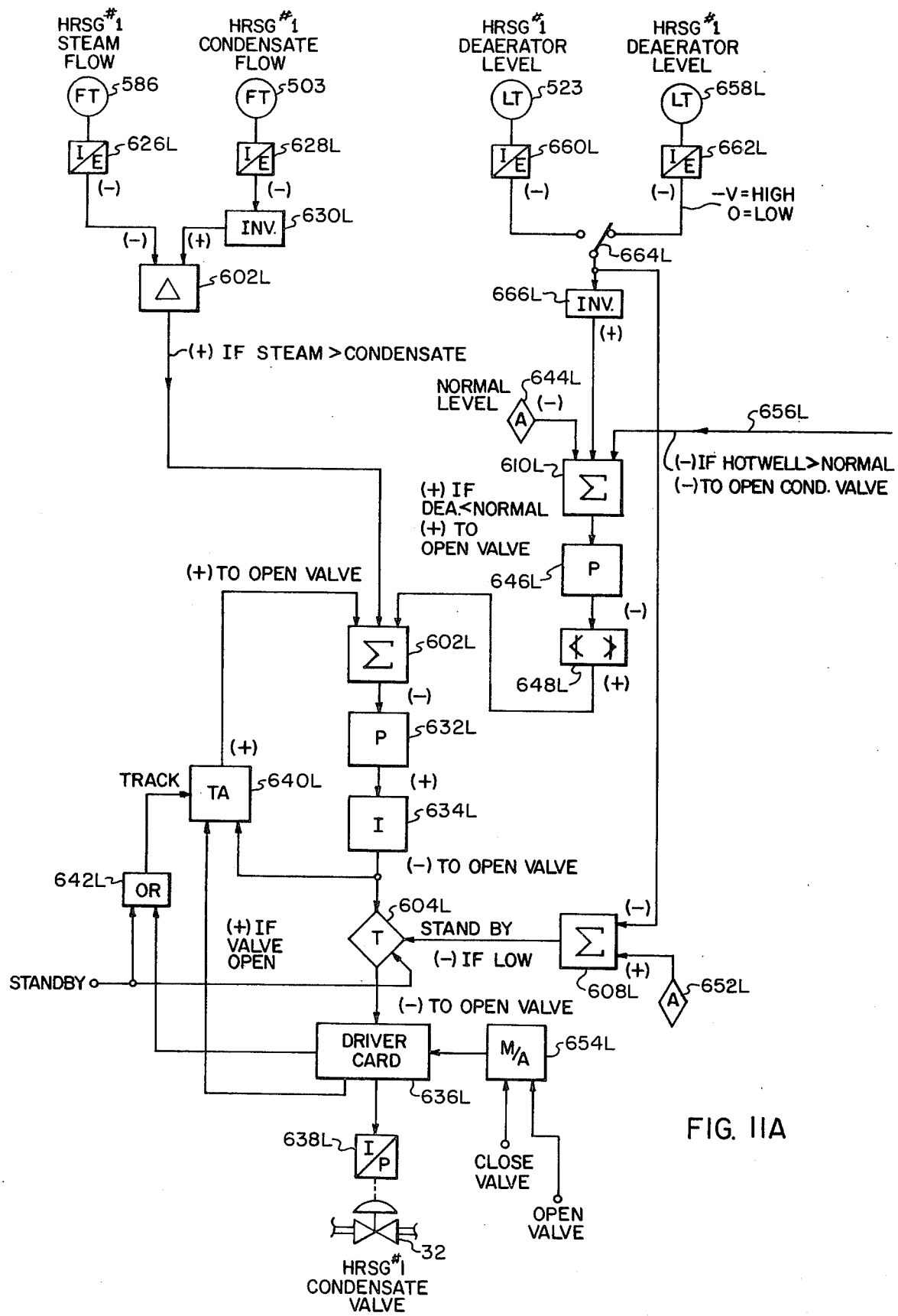
FIGS. 11A, 11B and 11C show a functional diagram of the fluid level control generally shown in FIG. 10.
Figure 11B:
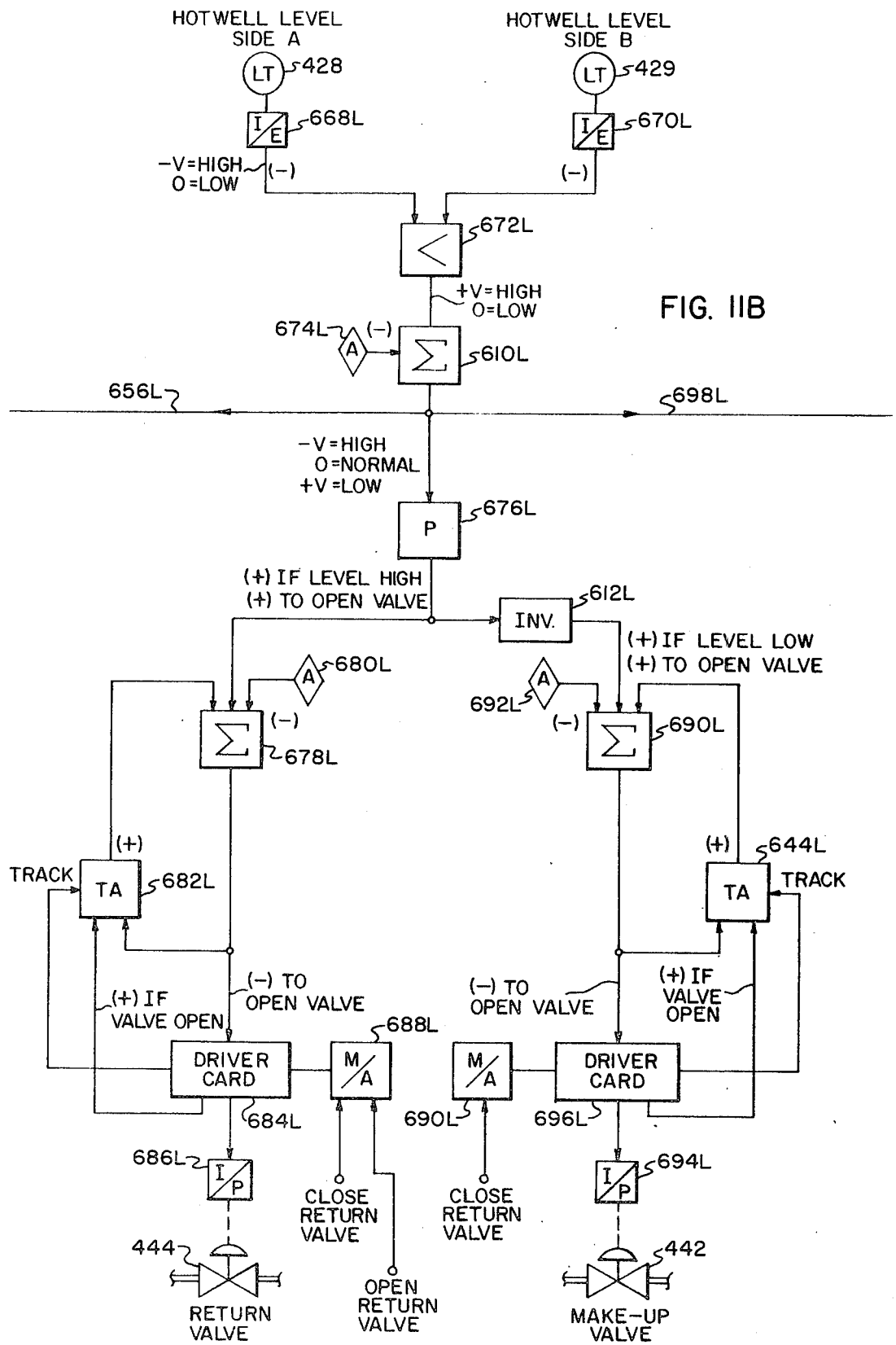
Figure 11C:
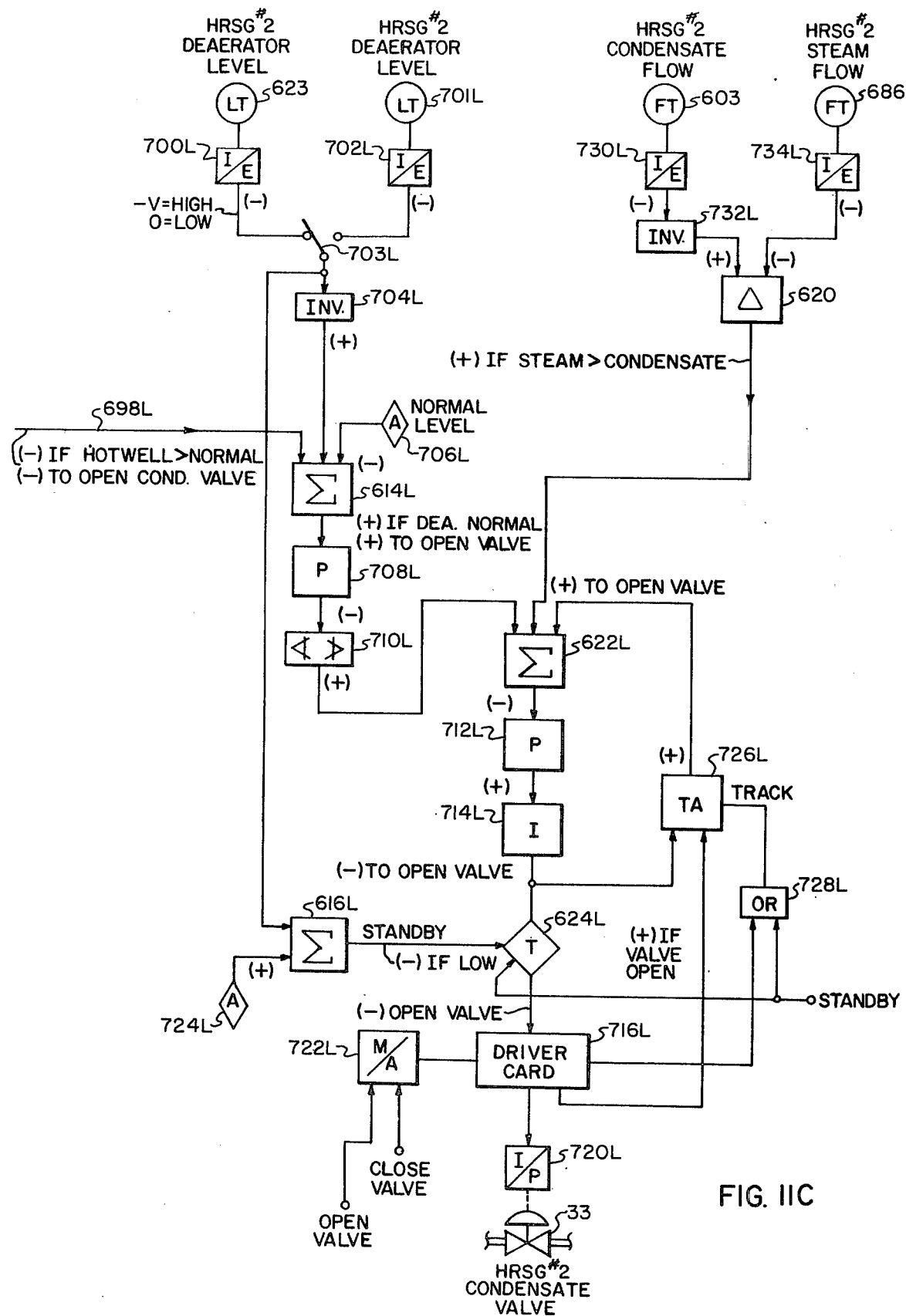

E-4. Control Functions of an Alternative Embodiment of Fluid Level Control System There is shown in FIGS. 11A, 11B and 11C, in more functional detail, an electrical diagram of an alternative embodiment of the fluid level control system as generally shown in FIG. 10. With respect to FIG. 11A, signals indicative of the condensate flow into and the superheated steam flow from the first generator 18 are derived from flow transducers 503 and 586, respectively, and applied through corresponding current-to-voltage converters 628L and 626L to the first and second inputs of the subtraction 602L. The difference signal therefrom is applied by way of the summing circuit 602L, the proportional circuit 632L, an integral circuit 634L, and a transfer function block 604L to the driver card 636L, whose output as converted by the current-to-voltage converter 638L to drive the first condensate valve 32. A trim signal is developed dependent upon the fluid level of the storage tank 69 associated with the first deaerator 68 as derived from the level transducers 523 and 658L. In particular, the outputs of the level transducers 658L and 523 are applied by current-to-voltage converters 662L and 660L to a switch 664L set to apply one input by way of an inverting circuit 66L to an input of the summing circuit 606L. Typically, the operator determines which of the level transducers whose output is to be applied to the summing circuit 606L. The summing circuit 606L includes a second input to which is applied a setpoint by way of block 644L indicative of the normal fluid level within the storage tank 69, and a third input to which is applied the output of the summing circuit 610L. In particular, the output signals as derived from the level transducers 428 and 429 indicative of the fluid level within sides 335a and 335b of the hotwell are applied by way of current-to-voltage converter 668L and 670L to a high select circuit 672L. The high select circuit 672L selects and applies the higher of its two input signals to the summing circuit 610L. The summing circuit 610L compares the selected hotwell level signal with respect to a normal value thereof entered by way of set block 674L to provide a difference output to be applied to the proportional amplifier 676L and to the third input of the summing circuit 606L. Thus, the output of the summing circuit 606L represents a difference between the measured and desired value of the fluid level within the storage tank 69 as trimmed by a difference signal indicative of any difference between the measured and set values of the hotwell fluid level. In turn, the output of the summing circuit 606L is applied by the proportional amplifier 646L, and the high-low limiting circuit 648L to an input of the summing circuit 602L to effect a trim of the difference signal between the steam and condensate flows.

As indicated in FIG. 11A, the condensate valve 32 is capable of being operated in a MANUAL mode, thereby suitable closed and open signals may be set into the manual/auto control block 654L to regulate the position of the condensate valve 32. Further, a bumpless transfer from a manual to an AUTOMATIC mode of operation is ensured by a tracking amplifier 640L enabled by an output derived from the manual/auto control block 654L by way of the driver card 636L, to compare the position of the condensate valve 32 as derived from the driver card 636L while operating in a MANUAL mode, with respect to that position as controlled by the output of the controller, i.e. the output of the integral circuit 634L. A difference signal is developed therebetween by the tracking amplifier 640L and applied to the summing circuit 602L to drive the controller output toward a value corresponding to that of the position of the condensate valve 32 when operating in its MANUAL mode.

Further, a standby command signal is applied to the transfer function block 604L when the steam generator 18 is to be operated in its STANDBY mode. In particular, the transfer function block 604L applies a command signal as derived from the summing circuit 608L to the driver card 636L to control the position of the condensate valve 32. As shown in FIG. 11A, the summing circuit 608L compares a measured value of the storage tank fluid with respect to a set normal level applied to the summing circuit 608L by way of setpoint block 652L. The difference signal therefrom is applied by the transfer function block 604L to the driver card 636L to control the position of the condensate valve solely dependent upon the level of the fluid within the storage tank 69.

The control of the condensate valve 33 for regulating the condensate flow into the deaerator 90 associated with the second steam generator 86 is similar to that associated with the condensate valve 32. In particular, signals indicative of the condensate flow to and the superheated steam flow from the steam generator 86 are applied by a current-to-voltage converter 730L and inverter circuit 532L, and a current-to-voltage converter 734L to the two inputs of a subtraction circuit 620L, whose output is applied to one input of the summing circuit 622L. Further, signals indicative of the fluid level in the storage tank 91 are derived from level transducers 623 and 701L by way of current-to-voltage converters 700L and 702L, and a switch 703L which selects one of the storage tank level signals to be applied by an inverting circuit 704L to one input of the summing circuit 614L. The summing circuit 614L includes a second input to which the output of the summing circuit 610L indicative of the difference between the desired and measured values of the hotwell fluid level, and a third input to which the normal or predetermined level of the fluid within the storage tank 91 is applied by setpoint block 706L. In turn, the output of circuit 614L is applied by the proportional amplifier 708L and the high-low limiting circuit 710L to a second input of the summing circuit 622L. The output of the summing circuit 622L reflects the difference between the condensate flow to and the superheated steam flow from the steam generator 86 as trimmed or modified in accordance with the difference between the desired or set and measured values of fluid level within the storage tank 91 and with the difference between the desired or set and the measured fluid levels within the hotwell, and is applied by way of the proportional circuit 712L, the integral circuit 714L and a transfer function block 624L to a driver card 716L, whose output signal is applied by way of the current-to-potential converter 720L to drive the condensate valve 33 to the controlled position.

Further the fluid level control associated with the condensate valve 33 may be operated in a MANUAL mode of operation whereby command signals to open and close the valve are entered through a manual/auto control block 722L to the driver card 716L. When the water level control for the condensate valve 33 is operated in its MANUAL mode, a tracking amplifier 726 is enabled by a track signal applied by way of an OR gate 728L, to compare the output of the integral circuit 714L indicative of the position to which the automatic controller would drive the condensate valve 33 with respect to the position of the condensate valve in a MANUAL mode as derived from the driver card 716L, to provide a difference signal therebetween to be applied to a third input of the summing circuit 622L. In this manner, the output of the summing circuit 622L and the water level controller is driven toward a value corresponding to the position of the condensate valve 33 in its MANUAL mode of operation. FUrther, when the steam generator 86 is operated in its STANDBY mode, a standby command signal is applied by way of the OR gate 728L to place the tracking amplifier in its TRACKING mode and also to the transfer function block 624L, whereby a command signal reflecting solely the fluid level within the storage tank 91 is used to control the position of the condensate valve 33. In particular, the selected fluid level signal as determined by the position of the switch 703L is applied to a first input of a summing circuit 616L to be compared with a desired fluid level while in the STANDBY mode, as applied through the setpoint block 724L; the resulting difference signal is provided from the summing circuit 616L by way of the transfer function block 624L, as switched by the standby signal, to the driver card circuit 616L to dispose the condensate valve 33 to a position to maintain the desired fluid level within the storage tank 91. In the STANDBY mode of operation, the measurements of condensate flow, superheated steam flow and the fluid level within the hotwell are ignored.

Figure 12:
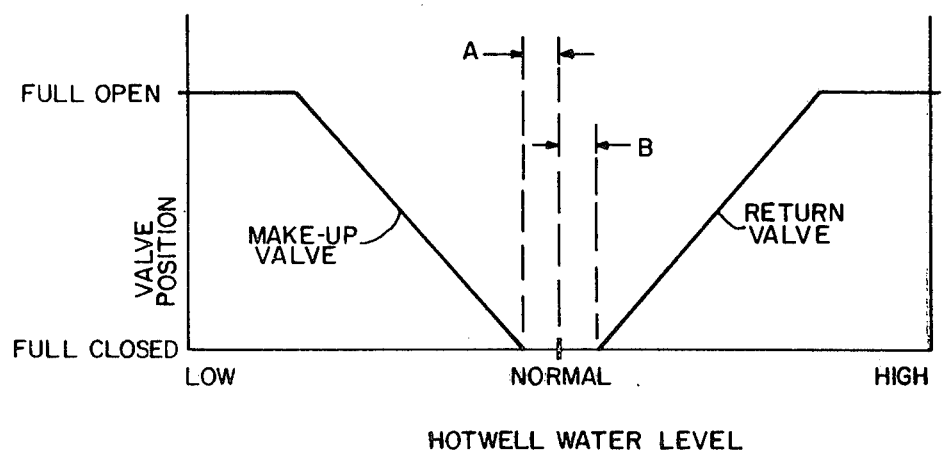
FIG. 12 is a graph of the hotwell water level versus the valve position as effected by the fluid level control as shown in FIGS. 10, and 11A, 11B and 11C.

Referring now to FIG. 11B, the return valve 444 and the makeup valve 442 of the makeup water system are operated in response to a measurement of the fluid level within the hotwell 335. In particular, one of the fluid level signals as derived from the level transducers 428 and 429 is selected by the high select circuit 672L and applied to the summing circuit 610L to provide a difference signal with respect to a desired or set value of the hotwell fluid level as entered through the setpoint block 674L. In turn, the difference signal output of the summing circuit 610L is applied through a proportional amplifier 676L, first by way of the summing circuit 678L to the driver card 684L, whose output control by way of the current-to-voltage converter 686L to the return valve 444, and secondly by way of an inverting circuit 612L and a summing circuit 690L to the driver card 696L, whose output is applied by way of the current-to-voltage converter 694L to drive the make-up valve 442 open. In particular, the output of the summing circuit 610L is negative if the measured fluid level within the hotwell is too high, i.e a level "A" above the normal level as indicated in FIG. 12, and is a negative voltage if the fluid level is below the normal level "B" as indicated in FIG. 12. The output of the proportional amplifier 676L is reversed with respect to that of the summing circuit 610L, whereby the output is positive if the voltage level is too high. As shown in FIG. 12, the setpoint as entered by setpoint block 680L corresponds to that level marked "B" in FIG. 12; thus, if the output of the proportional amplifier 676L exceeds the high limit value indicated by the letter "B", a negative output is derived from the summing circuit 678L, whereby the driver card 684L gradually opens to return valve 444 along a ramp-like curve marked "return valve", as shown in FIG. 12, dependent upon the voltage output of the proportional amplifier 676L and therefore the fluid level within the hotwell 335. In a similar manner, the proportional amplifier 676L produces a negative output if the level goes too low which is inverted by the inverting circuit 612L to be compared by the summing circuit 690L with a minimum level limit as entered by the setpoint block 692L. In particular, if the fluid level within the hotwell is less than the limit, the output derived from the inverting circuit 612L exceeds the setpoint indicated by the letter "A" in FIG. 12 whereby a negative output is derived from the summing circuit 690L and applied to the driver card 696L to gradually open up the makeup valve 442 along a ramp curve marked "makeup valve" in FIG. 12 dependent upon the fluid level within the hotwell and therefore the voltage output of the inverting circuit 612L. In this manner, if the fluid level within the hotwell exceeds a level "B" as shown in FIG. 12, the return valve 444 is opened to extract water from the condensate steam closed loop. On the other hand, if the water level falls below the level "A", the makeup valve 442 is opened whereby water is reintroduced by way of the condenser 31 into the condensate steam closed loop.

What is claimed is:

1. A combined cycle electric power plant comprising:
   a. at least one gas turbine including an exit through which heated exhaust gases pass;
   b. means for generating steam coupled to said gas turbine exit for transferring heat from the exhaust gases to a fluid passing through said steam generating means;
   c. a steam turbine coupled to said steam generating means and driven by the steam supplied thereby;
   d. means for generating electric power by the driving power of said turbines;
   e. condenser means for receiving and converting the spent steam from said steam turbine into condensate, said condenser means including a hotwell storage portion for receiving and storing the condensate;
   f. said steam generating means including a deaerator for receiving condensate from said condenser and storing the received condensate in a storage portion thereof, a feedwater pump for directing the stored fluid from said deaerator storage portion to a first heat exchange tube, a main drum associated with said first heat exchange tube for receiving the heated fluid therefrom, and a second heat exchange tube associated with said main drum for receiving fluid therefrom and for heating the fluid by the exhaust gases from said gas turbine into superheated steam to be directed to said steam turbine;
   g. condensate valve means for controlling the flow of condensate from said condenser hotwell storage portion to said deaerator; and
   h. means for controlling the operation of said turbines and said steam generating means comprising fluid level control means responsive to the flow of superheated steam to said steam turbine for regulating the flow of condensate into said deaerator storage portion in accordance therewith.

2. The combined cycle electric power plant as claimed in claim 1, wherein said water level control means is responsive to the difference between the flow of superheated steam to said steam turbine and the flow condensate to said deaerator for controlling the flow of the condensate to said deaerator storage portion.

3. The combined cycle electric power plant as claimed in claim 1, wherein said water level control means comprises means for measuring and providing a signal indicative of the condensate flow to said deaerator storage portion, means for measuring and providing an output signal indicative of the flow of superheated steam of said steam turbine, and substraction means responsive to the aforementioned outputs to provide a signal indicative of the difference between the condensate and superheated flows for controlling the position of said condensate valve means.

4. The combined cycle electric power plant as claimed in claim 3, wherein said fluid level control means comprises means for measuring the fluid level within said hotwell storage portion to provide a hotwell fluid level signal, subtraction means for providing a difference signal indicative of the difference between the hotwell fluid level signal and a normal value thereof, and trim means for trimming the effect of the condensate superheated steam difference signal upon the control of said condensate valve means.

5. The combined cycle electric power plant as claimed in claim 4, said fluid level control means includes means for measuring the fluid level within said deaerator storage portion to provide a deaerator fluid level signal, and said trim means responsive to the deaerator fluid level signal for trimming the effect of the condensate superheated steam difference signal upon the control of said condensate valve means.

6. The combined cycle electric power plant as claimed in claim 1, wherein there is included a second gas turbine; second steam generating means comprising a second deaerator for receiving the flow of condensate from said condenser and storing it in a storage portion thereof, a second feedwater pump for directing water from said second deaerator storage portion into a third heat exchange tube whereby the fluid passing therethrough is heated by the exhaust gases from said second gas turbine, a second main drum for receiving and storing the heated fluid from said third heat exchange tube, and a fourth heat exchange tube for receiving and heating the fluid derived from said second main drum by the exhaust gases from said second turbine and supplying superheated steam to said steam turbine; second condensate valve means for controlling the flow of condensate to said second deaerator; said fluid level control means comprising means for measuring the flows of condensate to said first-mentioned and second steam generating means and providing signals indicative thereof and for measuring the flows of superheated steam from said first-mentioned and second steam generators to said steam turbine and for providing signals thereof, summing means responsive to the first and second condensate flow signals to provide a total condensate flow signal and responsive to the steam flow signals to provide a total steam flow signal, and subtraction circuit means responsive to the total condensate flow and superheated steam flow signals to provide a difference signal for the control of said first-mentioned and second condensate valve means.

7. The combined cycle electric power plant as claimed in claim 6, wherein said fluid level control means comprises means for measuring the fluid level within said hotwell storage portion to provide a signal indicative thereof, subtraction means responsive to the hotwell fluid level signal and a signal indicative of a normal value within said hotwell storage portion to provide a difference signal indicative thereof, and trim means for trimming the condensate superheated steam difference signal in accordance with the hotwell difference signal, whereby said first and second condensate valves tend to restore the fluid level within said hotwell storage portion.

8. The combined cycle electric power plant as claimed in claim 7, wherein said fluid level control means comprises subtraction means responsive to the flow signals corresponding to the flows of superheated steam to said steam turbine, for providing a difference signal therebetween.

9. The combined cycle electric power plant as claimed in claim 8, wherein said fluid level control means comprises subtraction means responsive to the flow signals of condensate to said first and second steam generating means for providing a difference signal therebetween, and trim means responsive to the superheated steam and condensate flow difference signals for providing a summed output thereof and for applying the summed output to said trim means for modifying the effect of the superheated steam-condensate difference signal on the control of said first-mentioned and second condensate valve means.

10. The combined cycle electric power plant as claimed in claim 9, wherein said fluid level control means comprises means for measuring the fluid level within said first-mentioned and second deaerator storage portions for providing signals indicative thereof, and subtraction means responsive to the deaerator storage portion fluid level signals to provide a difference signal therebetween to be applied to said trim means for effecting a trim of the influence of the condensate superheated steam difference signal upon the control of said first-mentioned and second condensate valve means.

11. The combined cycle electric power plant as claimed in claim 9, wherein said fluid level control means comprises first and second summing means whose outputs are applied to control, respectively, the positions of said first-mentioned and second condensate valve means, said first and second summing means each having a first input for receiving the condensate superheated steam difference signal and a second input, said trim means applying its output to said second input of said first and second summing circuits in a manner to have an opposite effect upon the control of said first mentioned and second condensate valve means.

12. The combined cycle electric power plant as claimed in claim 11, wherein said fluid level control means is operative in a first mode for applying, respectively, the output of said first and second summing circuits for the control of said first and second condensate valve means, and in a second mode for applying the first and second deaerator fluid level signals for the control of said first and second condensate valve means, respectively.

13. The combined cycle electric power plant as claimed in claim 12, wherein there is included third switch means operative in a first mode for applying the output of said trim means to each of said first and second summing means, and in a second mode for disconnecting the output of said trim means therefrom.

14. The combined cycle electric power plant as claimed in claim 6, wherein there is included a makeup water system comprising a makeup water storage tank, a return valve actuatable to extract condensate from the flow to said first-mentioned and second deaerators and for supplying it to said makeup water storage tank, and a makeup valve for permitting a flow of the condensate within said makeup water storage tank to said condenser means, and said fluid level control means responsive to a fluid level within at least one of said deaerator storage portions in excess of that of a predetermined maximum limit, for opening said return valve to extract water from the condensate and responsive to a fluid level within said one deaerator storage portion below a minimum level for opening said makeup valve to return condensate to said condenser.

15. The combined cycle electric power lant as claimed in claim 14, wherein said fluid level control means comprises first means responsive to the higher of the deaerator fluid level signals for applying same to control said return valve, and second means responsive to the deaerator level signals for applying the lesser of the two input signals to control said makeup valve.

16. The combined cycle electric power plant as claimed in claim 2 wherein said fluid level control means comprises means for measuring the fluid level within said deaerator storage portion for providing an output indicative thereof, and trim means responsive to the deaerator fluid level signal and to a normal level value of the fluid level within said deaerator storage portion for providing a difference output therebetween for trimming the effect of the steamcondensate difference signal upon the control of said condensate valve means.

17. The combined cycle electric power plant as claimed in claim 16, wherein said fluid level control means comprises means for measuring the fluid level within said hotwell storage portion and for providing a signal corresponding thereto, and summing means responsive to the hotwell fluid level signal and to a normal level value of the fluid within said hotwell storage portion to provide a difference output signal therebetween, said trim means responsive to the hotwell difference signal to trim the effect of the steam condensate difference signal upon the control of said condensate valve.

18. The combined cycle electric power plant as claimed in claim 17, wherein there is further included a makeup water system comprised of a makeup water storage tank, a return valve for extracting condensate from the flow to said steam generating means for storage within said makeup water storage tank, and a makeup valve for returning water from said makeup water storage tank to said condenser, said fluid level control means comprising means for measuring the fluid level within said hotwell storage portion for providing a signal indicative thereof, summing means responsive to the hotwell fluid level signal and to a normal level value thereof for providing a difference signal, and a makeup water level controller responsive to the hotwell fluid level signal above a predetermined maximum limit for opening said return valve and responsive to the hotwell fluid level signal below a minimum limit for opening said makeup valve.

19. The combined cycle electric power plant as claimed in claim 2 wherein there is further included a second gas turbine; a second condensate valve means; second steam generating means comprised of a second deaerator having a second deaerator storage portion, a second feedwater pump for directing fluid from said second deaerator storage portion to a third heat transfer tube whereby the fluid therein is heated by the exhaust gases from a second gas turbine, a second main drum for receiving and storing the heated fluid from said third heat exchange tube, and a fourth heat exchange tube for heating the fluid by the exhaust gases from said second gas turbine into superheated steam to be supplied to said steam turbine, and said fluid level control means comprising means for measuring the condensate flow to and the superheated steam flow from said second steam generating means for providing signals indicative thereof, and subtraction means responsive to the second condensate flow and superheated steam flow signals for providing a second difference output for controlling said second condensate valve means to regulate the flow of condensate to said second steam generating means.

20. The combined cycle electric power plant as claimed in claim 19, wherein said fluid level control means comprises means for measuring the fluid level within said second deaerator storage portion for providing an output indicative thereof and trim means responsive to the second fluid level deaerator signal and a value of the normal fluid level therein for providing a difference signal and for using same to trim the influence of the second superheated steam condensate flow difference signal upon the control of said second condensate valve means.

21. The combined cycle electric power plant as claimed in claim 19, wherein said fluid level control means comprises means for measuring the fluid level within said hotwell storage portion and providing an output indicative thereof, and summing means responsive to the fluid level signal and to a normal level value thereof for providing a difference signal, said trim means responsive to the output of said aforementioned summing means for trimming the influence of the second superheated steam condensate flow difference signal upon the control of said second condensate valve means.

22. The combined cycle electric power plant as claimed in claim 19, wherein either one of said first-mentioned and said second steam generating means is capable of being operated in a STANDBY mode, wherein said fluid level control means comprises summing means responsive to the deaerator fluid level signal corresponding to said one steam generating means and to a second fluid level signal indicative of the normal level in a STANDBY mode, said summing circuit providing an output indicative of the difference therebetween, and transfer function means operative in a first normal mode for applying the superheated steam condensate flow difference signal for the control of said condensate valve means coupled to said one steam generating means, and in a second mode responsive to the output of said summing circuit for controlling thereby the position of said condensate valve means coupled to said one steam generating means.

23. A fluid level control system for a combined cycle electric power plant comprising at least one gas turbine including an exit through which heated exhaust gases pass, means for generating steam coupled to said gas turbine exit for transferring heat from the exhaust gases to a fluid passing through said steam generating means, a steam turbine coupled to said steam generating means and driven by the steam supplied thereby, means for generating electric power by the driving power of said turbines, condenser means for receiving and converting the spent steam from said steam turbine into condensate, said condenser means including a hotwell storage portion for receiving and storing the condensate, said steam generating means including a deaerator for receiving condensate from said condenser and storing the received condensate in a storage portion thereof, a feedwater pump for directing the stored fluid from said deaerator storage portion to a first heat exchange tube, a main drum associated with said first heat exchange tube for receiving the heated fluid therefrom, and a second heat exchange tube associated with said main drum for receiving fluid therefrom and for heating the fluid in the exhaust gases from said gas turbine into superheated steam to be directed to said steam turbine, and condensate valve means, for controlling the flow of condensate from said condenser hotwell portion to said deaerator, said fluid level control means responsive to the flow of superheated steam to said steam turbine for controlling the position of said condensate valve means to regulate the flow of condensate into said deaerator storage portion in accordance therewith.

24. The fluid level control system as claimed in claim 23, wherein said system is responsive to the difference between the flow of the superheated steam to said steam turbine and the flow condensate to said deaerator for controlling the flow of the condensate to said deaerator storage storage portion.

25. The fluid level control system as claimed in claim 23, comprising means for measuring and providing a signal indicative of the condensate flow to said deaerator storage portion, means for measuring and providing an output signal indicative of the flow of superheated steam to said steam turbine, and subtraction means responsive to the aforementioned outputs to provide a signal indicative of the difference between the condensate and superheated flows for controlling the position of said condensate valve means.

26. The fluid level control system as claimed in claim 25, wherein said system comprises means for measuring the fluid level within said hotwell storage portion to provide a hotwell fluid level signal, subtraction means for providing a difference signal indicative of the difference between the hotwell fluid level signal and a normal value thereof, and trim means for trimming the effect of the condensate superheated steam difference signal upon the control of said condensate valve means.

27. The fluid level control system as claimed in claim 26, wherein said system comprises means for measuring the fluid level within said deaerator storage portion to provide a deaerator fluid level signal, and said trim means responsive to the deaerator fluid level signal for trimming the effect of the condensate superheated steam difference signal upon the control of said condensate valve means.

28. A fluid level control system for an electric power plant comprising a heat source, means for generating steam coupled to said gas turbine exit for transferring heat from said source to a fluid passing through said steam generating means; a steam turbine coupled to said steam generating means and driven by the steam supplied thereby, means for generating electric power by the driving power of said turbine, condenser means for receiving and converting the spent steam from said steam turbine into condensate, said condenser means comprising a hotwell portion for receiving and storing the condensate, said steam generating means including a deaerator for receiving condensate from said condenser and storing the receiver condensate in a storage portion thereof, a feedwater pump for directing the stored fluid from said deaerator storage portion to a first heat exchange tube, a main drum associated with said heat exchange tube for receiving the heated fluid therefrom, and a second heat exchange tube associated with said main drum for receiving fluid therefrom and for heating the fluid by the heat supplied from said source into superheated steam to be directed to said steam turbine, and condensate valve means for controlling the flow of condensate from said condenser hotwell storage portion to said deaerator, said fluid level control system responsive to the flow of superheated steam to said steam turbine for controlling the position of said condensate valve means to regulate the flow of condensate into said deaerator storage portion in accordance therewith.

29. The fluid control system as claimed in claim 28, wherein said fluid level control system in responsive to the difference between the flow of superheated steam to said steam turbine and the flow condensate to said deaerator for controlling the flow of the condensate to said deaerator storage portion.

30. The fluid level control system as claimed in claim 28, wherein said fluid level control system comprises means for measuring and providing a signal indicative of the condensate flow to said deaerator storage portion, means for measuring and providing an output signal indicative of the flow of superheated steam to said steam turbine, and subtraction means responsive to the aforementioned outputs to provide a signal indicative of the difference between the condensate and superheated flows for controlling the position of said condensate valve means.

31. The fluid level control system as claimed in claim 30, wherein said fluid level control system comprises means for measuring the fluid level within said hotwell storage portion to provide a hotwell fluid level signal, subtraction means for providing a difference signal indicative of the difference between the hotwell fluid level signal and a normal value thereof, and trim means for trimming the effect of the condensate superheated steam difference signal upon the control of said condensate valve means.

32. The fluid level control system as claimed in claim 31, wherein said fluid level control system comprises means for measuring the fluid level within said deaerator storage portion to provide a deaerator fluid level signal, and said trim means responsive to the deaerator fluid level signal for trimming the effect of the condensate superheated steam difference signal upon the control of said condensate valve means.

* * * * *